(12) United States Patent
Nakanishi et al.

(10) Patent No.: US 8,270,817 B2
(45) Date of Patent: Sep. 18, 2012

(54) RECORDING APPARATUS, RECORDING MEDIUM, REPRODUCTION APPARATUS, PROGRAM, AND METHOD

(75) Inventors: Nobuo Nakanishi, Kadoma (JP); Tomotaka Yagi, Nishinomiya (JP); Wataru Ikeda, Osaka (JP); Kazuhiko Nakamura, Hirakata (JP)

(73) Assignee: Panasonic Corporation, Osaka (JP)

( * ) Notice: Subject to any disclaimer, the term of this patent is extended or adjusted under 35 U.S.C. 154(b) by 1423 days.

(21) Appl. No.: 10/432,227

(22) PCT Filed: Jun. 3, 2002

(86) PCT No.: PCT/JP02/05412
§ 371 (c)(1),
(2), (4) Date: May 22, 2003

(87) PCT Pub. No.: WO02/099804
PCT Pub. Date: Dec. 12, 2002

(65) Prior Publication Data
US 2004/0027890 A1    Feb. 12, 2004

(30) Foreign Application Priority Data

Jun. 4, 2001 (JP) ............... 2001-167965
Jul. 19, 2001 (JP) ............... 2001-219371

(51) Int. Cl.
*H04N 5/93* (2006.01)
*H04N 5/78* (2006.01)
*H04N 5/84* (2006.01)
*H04N 5/92* (2006.01)
*H04N 5/765* (2006.01)
*H04N 5/783* (2006.01)
*H04N 5/928* (2006.01)
*H04N 7/173* (2011.01)
*H04N 9/80* (2006.01)
*G11B 7/24* (2006.01)
*G11B 19/02* (2006.01)
*G11C 7/00* (2006.01)

(52) U.S. Cl. ........ 386/280; 386/231; 386/239; 386/241; 386/262; 386/324; 386/327; 386/328; 386/334; 386/337; 386/338; 386/343; 386/345; 386/353; 360/72.1; 365/202; 369/275.1; 725/109; 725/119

(58) Field of Classification Search .............. 386/52, 386/55, 124, 60, 96, 98, 111, 126, E5.043, 386/E9.013, E9.036, 95, 125, E5.001, E5.0002, 386/E5.064, 231, 239, 241, 262, 327, 328, 386/343, 353; 348/E5.108, E7.071, E5.007; 365/202; 725/88, 89, 134, 142, 109, 119; 369/275.1; 360/72.1; 375/E7.024; 707/E17.028; G9B/19.001, 20.015, 27.011, 27.012, 27.019, G9B/27.021, 27.033, 27.044, 27.05, 27.051, G9B/27.001, 27.029
See application file for complete search history.

(56) References Cited

U.S. PATENT DOCUMENTS

| | | | | |
|---|---|---|---|---|
| 5,371,792 A | * | 12/1994 | Asai et al. | 705/59 |
| 6,169,879 B1 | * | 1/2001 | Perlman | 725/119 |
| 6,215,746 B1 | | 4/2001 | Ando et al. | |
| 6,263,152 B1 | | 7/2001 | Hisatomi et al. | |
| 6,269,216 B1 | * | 7/2001 | Abecassis | 386/55 |
| 6,334,022 B1 | * | 12/2001 | Ohba et al. | 386/231 |
| 6,393,196 B1 | * | 5/2002 | Yamane et al. | 386/281 |
| 6,470,140 B1 | | 10/2002 | Sugimoto et al. | |
| 6,570,837 B1 | * | 5/2003 | Kikuchi et al. | 369/275.1 |
| 6,580,872 B1 | * | 6/2003 | Kikuchi et al. | 386/248 |
| 7,039,295 B1 | | 5/2006 | Moon et al. | |
| 7,099,239 B2 | * | 8/2006 | Ogikubo | 386/E9.013 |
| 7,123,818 B2 | * | 10/2006 | Nakatani et al. | 386/97 |
| 7,269,840 B2 | * | 9/2007 | Crinon et al. | 725/92 |
| 7,359,620 B2 | * | 4/2008 | Morinaga et al. | 386/239 |
| 7,391,958 B2 | * | 6/2008 | Murakami et al. | 386/278 |
| 2001/0017975 A1 | * | 8/2001 | Ando et al. | 386/96 |
| 2003/0142958 A1 | | 7/2003 | Matsunaga et al. | |
| 2003/0163823 A1 | * | 8/2003 | Logan et al. | 725/89 |
| 2007/0133610 A1 | | 6/2007 | Shikatani | |

FOREIGN PATENT DOCUMENTS

| | | |
|---|---|---|
| EP | 0 967 609 A2 | 12/1999 |
| EP | 1091577 | 4/2001 |
| JP | 02-185781 | 7/1990 |
| JP | 07-226062 | 8/1995 |
| JP | 8-111843 | 4/1996 |
| JP | 10-106118 | 4/1998 |
| JP | 11-126463 | 5/1999 |
| JP | 11-136463 | 5/1999 |
| JP | 11-144441 | 5/1999 |
| JP | 11-213628 | 8/1999 |
| JP | 2000-270290 | 9/2000 |
| JP | 2000-324444 | 11/2000 |
| JP | 2001-76474 | 3/2001 |
| JP | 2001-238176 | 8/2001 |
| WO | 01-31815 | 5/2001 |

OTHER PUBLICATIONS

Supplementary European Search Report issued Jul. 14, 2010 in corresponding European Application No. 02 73 3273.

Office Action issued May 19, 2008 in corresponding Philippine Application No. 1-2003-501241.

\* cited by examiner

*Primary Examiner* — Thai Tran
*Assistant Examiner* — Syed Hasan

(74) *Attorney, Agent, or Firm* — Wenderoth, Lind & Ponack, L.L.P.

(57) ABSTRACT

A recording apparatus is for a DVD on which a TS-VOB, and pieces of playback path information each showing a playback path of the TS-VOB are recorded. When extended control with various contents can be executed by an apparatus at the time of playback, an extended attribute section in which extended control is valid is specified in accordance with the contents of the extended control. When an extended attribute section is to be uniformly specified for playback paths of the TS-VOB, a section marker for specifying a location of the extended attribute section of the TS-VOB is generated in VOB information. When an extended attribute section is to be individually specified for one playback path, a section marker specifying a location of the extended attribute section of the playback path is generated in PGC information. The generated VOB information and PGC information are written to the DVD.

10 Claims, 54 Drawing Sheets

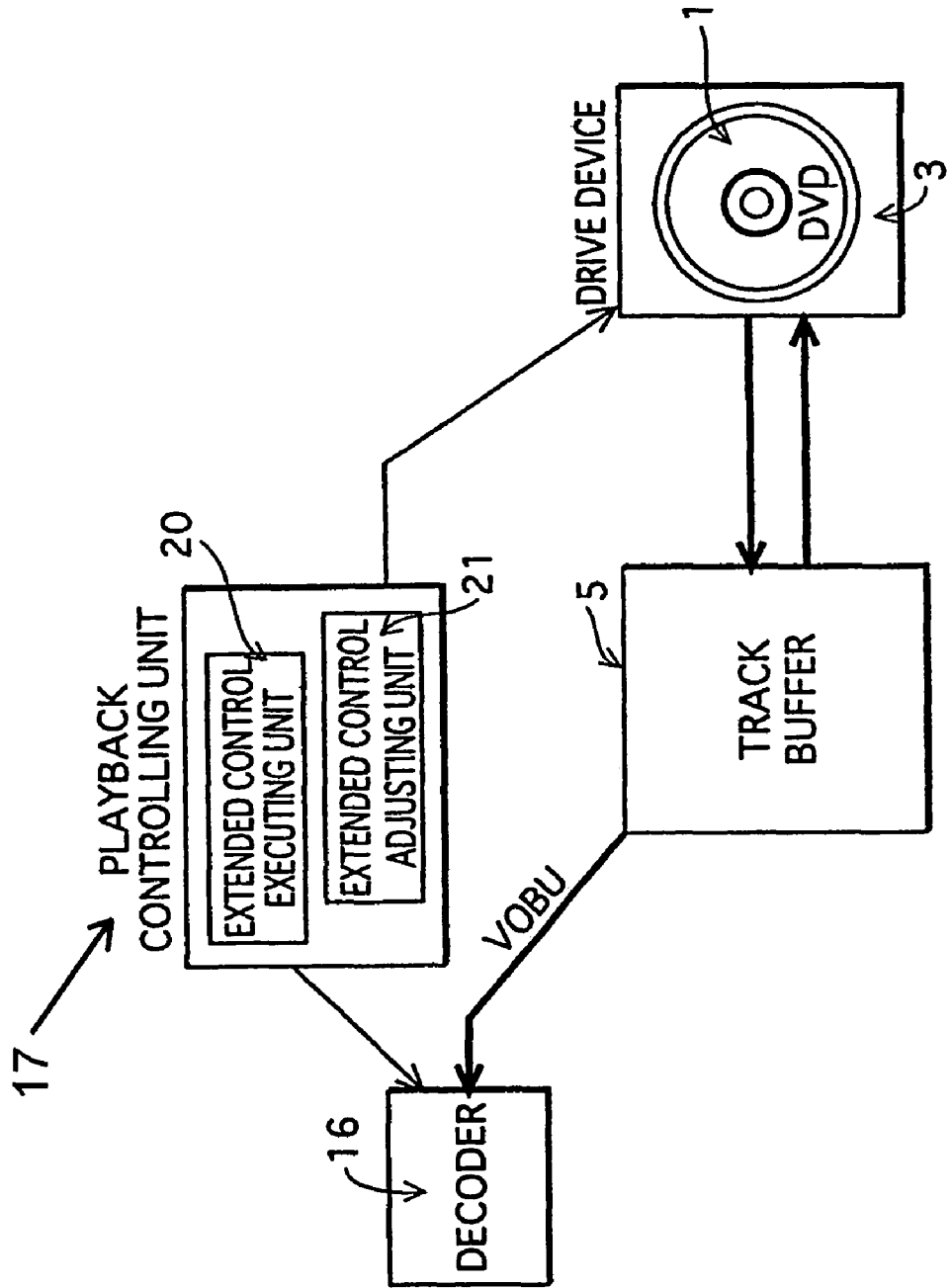

FIG.22
SECTION MARKER IS VALID FOR PLURALITY OF MAKERS
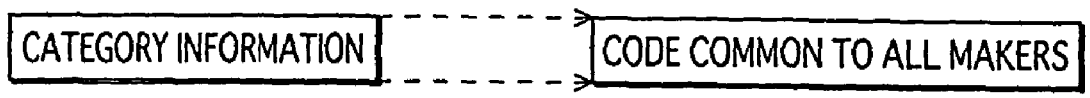
WHEN SECTION MARKER IS VALID ONLY FOR SINGLE MAKER
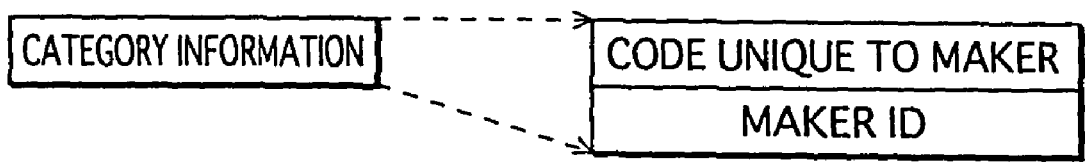

FIG.25B

PAT

| PROGRAM 1 | PMT # 1 |
| PROGRAM 2 | PMT # 2 |
| .... | .... |
| PROGRAM n | PMT # n |

FIG.25A

PMT#1

| Video | PID= 001 |
| Audio | PID= 002 |

PMT#2

| Video | PID= 002 |
| Audio | PID= 001 |

⟨case1⟩

⟨case2⟩

⟨case3⟩

⟨case4⟩

⟨case5-1⟩

⟨case5-2⟩

⟨case5-3⟩

(case6-1)

(case6-2)

⟨case6-3⟩

⟨case7⟩

⟨case7-1⟩

⟨case7-2⟩

⟨case8⟩

EXTENDED ATTRIBUTE SECTION
←→

⟨case9-1⟩

⟨case9-2⟩

EXTENDED ATTRIBUTE SECTION

| CELL # 1 | CELL # 2 | CELL # 3 |
|---|---|---|
| EDGE PART | | |

| TS-VOB # 1 | TS-VOB # 2 | TS-VOB # 3 |
|---|---|---|

EXTENDED ATTRIBUTE SECTION

| DELETED | | | |
|---|---|---|---|
| DELETED | CELL # 1 | CELL # 2 | CELL # 3 |

| DELETED | TS-VOB#1 | TS-VOB # 2 | TS-VOB # 3 |
|---|---|---|---|

⟨case10⟩

⟨case10-1⟩

⟨case10-2⟩

⟨case10-3⟩

RECORDING APPARATUS, RECORDING MEDIUM, REPRODUCTION APPARATUS, PROGRAM, AND METHOD

BACKGROUND OF THE INVENTION

1. Field of the Invention

The present invention relates to a recording apparatus that records a digital stream onto a recording medium such and relates to a playback apparatus and a recording medium.

2. Description of the Related Art

In the commercialization of the above recording apparatus, maintaining compatibility with digital streams recorded on recording mediums is the important responsibility for makers of such recording apparatuses. To ensure the compatibility, each maker has been actively engaged in standardization of recording formats employed for the recording mediums. As their achievements, various unified standards including the DVD-Video recording standard have been established.

While the makers keep step with one another, each maker tries to differentiate their products from other makers' products. In such efforts, each maker tends to commercialize recording apparatuses featuring "extended control". The "extended control" featured by recording apparatuses is playback control whose contents can be freely determined by the maker of the recording apparatuses. A format defined by the DVD-Video recording standard or the like has universal values, and so does not allow any makers to define contents of playback control that do not comply with the format. On the other hand, universal values are not required for extended control, and therefore, makers can define commercially strategic contents, fashionable contents, and the like, as the contents of extended control unique to the makers.

With the widespread use of multi-user compatible optical discs, however, extended control alone may not truly satisfy users although differentiation of the products from others can be achieved by the extended control. A multi-user compatible optical disc is an optical disc shared by a plurality of users. An optical disc with a large capacity of 40 gigabytes or more is often designed as multi-user compatible. For such a multi-user compatible optical disc, it is not desirable to provide uniform playback control for all the users. In the present era of individuality, preference and convenience for each individual user should be highly respected. For playback of a multi-user compatible optical disc, too, such extended control that can satisfy preference and convenience for each individual user is highly desirable. However, providing individual extended control for each of a plurality of users sharing one recording medium inevitably complicates the data format of the recording medium and the processing of the apparatus side. The larger the number of users, the more they become complicated, thereby placing huge burdens on the makers.

BRIEF SUMMARY OF THE INVENTION

The object of the present invention is to provide a recording apparatus that realizes such extended control that can satisfy preference and convenience for the user side, while alleviating burdens on the maker side.

Here, the following describes how the above object can be achieved. For a multi-user compatible recording medium, typical extended control to be provided individually for each user is to access the start location of an unviewed part. An unviewed part differs depending on each user, and therefore, it is meaningful to start playback from a different location depending on each user. On the other hand, typical extended control to be provided uniformly for a plurality of users is to skip a commercial (CM) section. All the users who share the recording medium often uniformly want playback of a CM section to be skipped. Whether to provide extended control uniformly for a plurality of users or to provide extended control individually for each user depends on the contents of the extended control. Also, the start point at which extended control is to be started and the end point at which the extended control is to be ended at the time of playback of a digital stream depend on the contents of the extended control.

Conventionally, a "location", i.e., a "point", on a digital stream at which extended control is to be executed is specified using information called "entry point information". However, such a conventional method of specifying the "point" has a limit on determining the contents of the extended control in detail. By combining a plurality of pieces of location information, a section in which extended control is to be executed can be specified. However, such a conventional method of specifying a section fails to indicate whether the extended control is to be provided uniformly for a plurality of users or the extended control is to be provided individually for one user, thereby failing to respond to diversification of extended control along with the multi-user compatibility.

To respond to the diversification of extended control along with the multi-user compatibility, and to achieve the above object, the recording apparatus of the present invention includes: a specifying unit operable to, (1) if content of extended control is valid only for one of a plurality of playback paths, specify a section in which the extended control is to be executed individually for the one playback path, and (2) if content of extended control is valid for a plurality of playback paths, specify a section in which the extended control is to be executed uniformly for the plurality of playback paths; and a writing unit operable to write one of first-type marker information and second-type marker information to the recording medium, the first-type marker information showing a location of the individually specified section on the one playback path, the second-type marker information showing a location of the uniformly specified section on the digital stream.

When one piece of playback path information is assigned to a particular user, a section in which extended control is to be executed can be specified for each user, by individually specifying such a section for each playback path. By doing so, an unviewed section can be set individually for each user. Also, by individually specifying a section for each playback path, such extended control that satisfies preference, convenience, etc. for each individual user can be executed.

Also, by uniformly specifying a section for a plurality of playback paths, executed control to skip a sexual scene or a violent scene, extended control to skip a CM section, and the like can be uniformly executed at the time of playback for a plurality of users. By doing so, the recording apparatus is not required to store a section individually for each user where extended control is to be executed, and therefore, its processing can be simplified. By appropriately using extended control to be executed individually for one user and extended control to be executed uniformly for a plurality of users, a maker of the recording apparatus can manufacture and commercialize recording apparatuses with higher user needs.

Here, a playback apparatus for playing the recording medium may be constructed, the playback apparatus including: a reading unit operable to read the first-type marker information and the second-type marker information from the recording medium; and a controlling unit operable to (1) execute, in a section whose location is shown by the first-type marker information on the one playback path shown by the one piece of playback path information, extended control unique to the one playback path, and (2) execute, in a part of the section whose location is shown by the first-type marker information overlapping with a section whose location is shown by the second-type marker information, extended control unique to the digital stream, instead of or in addition to the extended control unique to the one playback path. This assumes a case where there are n-types of digital streams and m-pieces of playback path information for users. In this case, the controlling unit may execute extended control unique to each of the n-types of digital streams, and extended control unique to each of m-pieces of playback path information. By doing so, the number of variations of extended control that can be executed by the playback apparatus becomes "n×m". In other words, by executing the "n×m" extended controls, as many variations as "n×m" can be realized.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 17 shows an internal structure of a playback controlling unit relating to a fourth embodiment of the present invention;

FIG. 22 shows the contents of category information;

FIG. 25A shows one example of PMT;

FIG. 25B shows one example of PAT;

DETAILED DESCRIPTION OF THE INVENTION

First Embodiment

Figure 1:
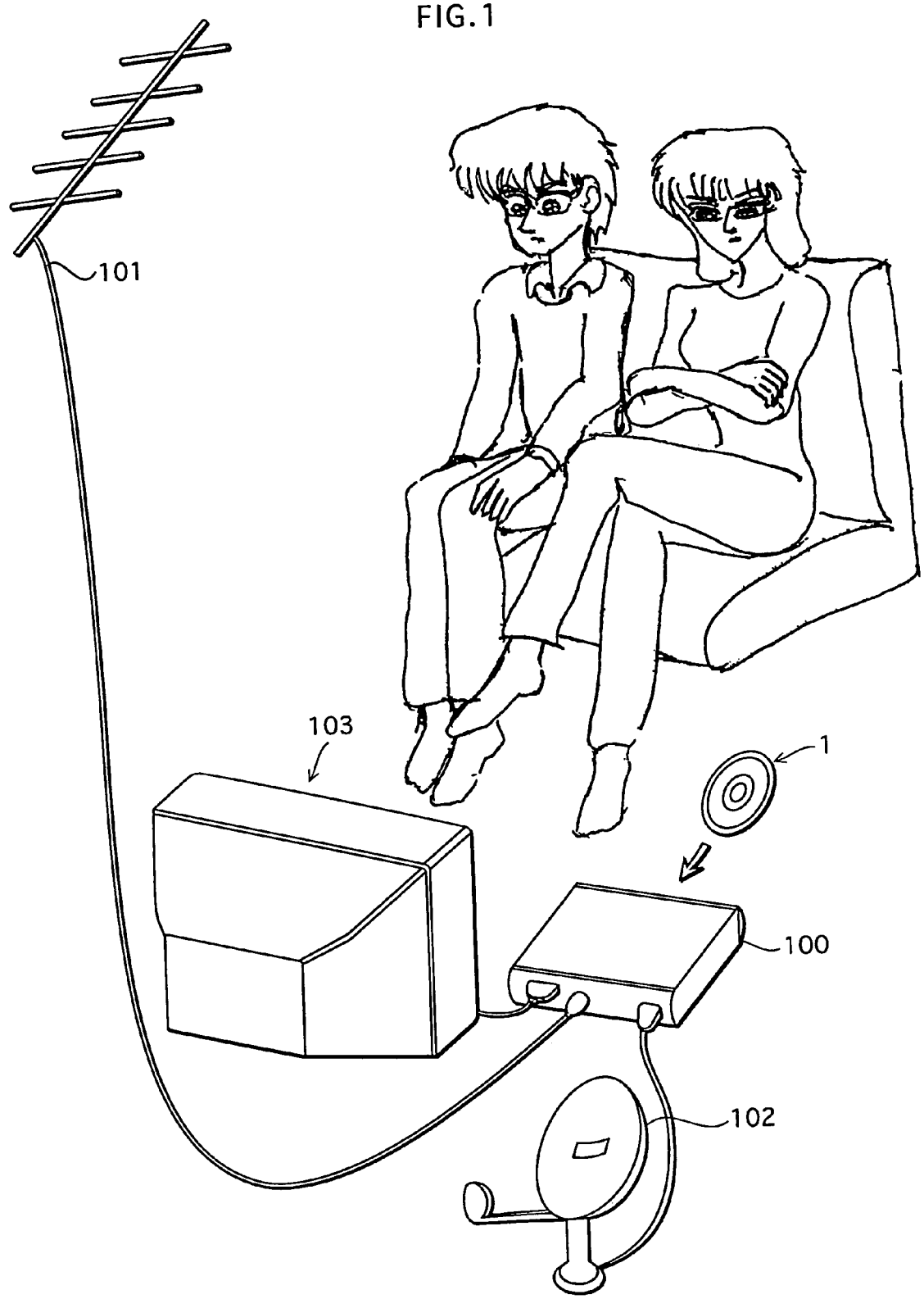
FIG. 1 shows a DVD relating to a first embodiment of the present invention, and a recording apparatus.

The following describes a first embodiment to which a recording medium of the present invention relates. The recording medium relating to the present embodiment is a rewritable DVD (hereafter simply, a "DVD") on which moving picture data can be recorded in compliance with the DVD-Video recording standard. FIG. 1 shows a DVD 1 relating to the present embodiment, and a recording apparatus 100. The recording apparatus 100 encodes broadcast contents of a broadcast signal received via a terrestrial antenna 101 and a parabolic antenna 102, and writes the encoded broadcast contents to the DVD 1. The DVD 1 is a multi-user compatible DVD that is shared by two users (user A and user B) shown in the figure.

The DVD 1 has a layer hierarchy including a physical layer, a file system layer, an application layer, etc., and data in the form of a digital stream is recorded thereon by the recording apparatus 100.

Figure 2:
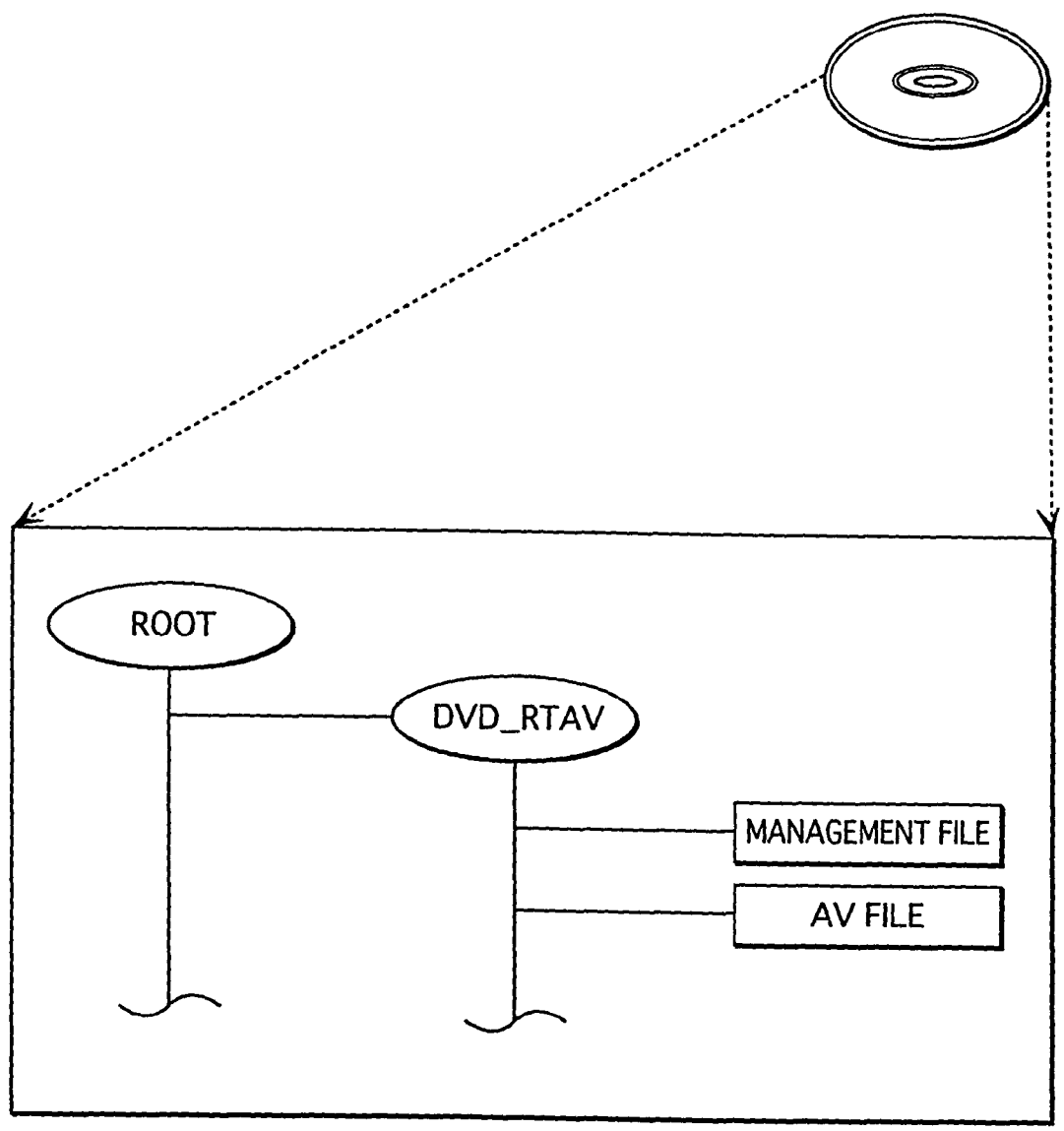
FIG. 2 shows a structure (file structure) of the DVD on a file system layer, indicated by arrows drawn with broken lines.

FIG. 2 shows a structure (file structure) of the DVD 1 on the file system layer, indicated by arrows drawn with broken lines. In the file structure shown in FIG. 2, the DVD_RTAV (Real Time Recording Audio Video) directory is located immediately below the ROOT directory, and an AV file storing several TS-VOBs and a management file storing various types of management information are located below the DVD_RTAV directory. A TS-VOB (Transport Stream-Video Object) is data that is recorded in the form of a transport stream, and is differentiated from a VOB that is in the form of a program stream. A digital stream referred to in the "claims" and the "Disclosure of the Invention" of the present application intends to mean such a TS-VOB.

Figure 3:
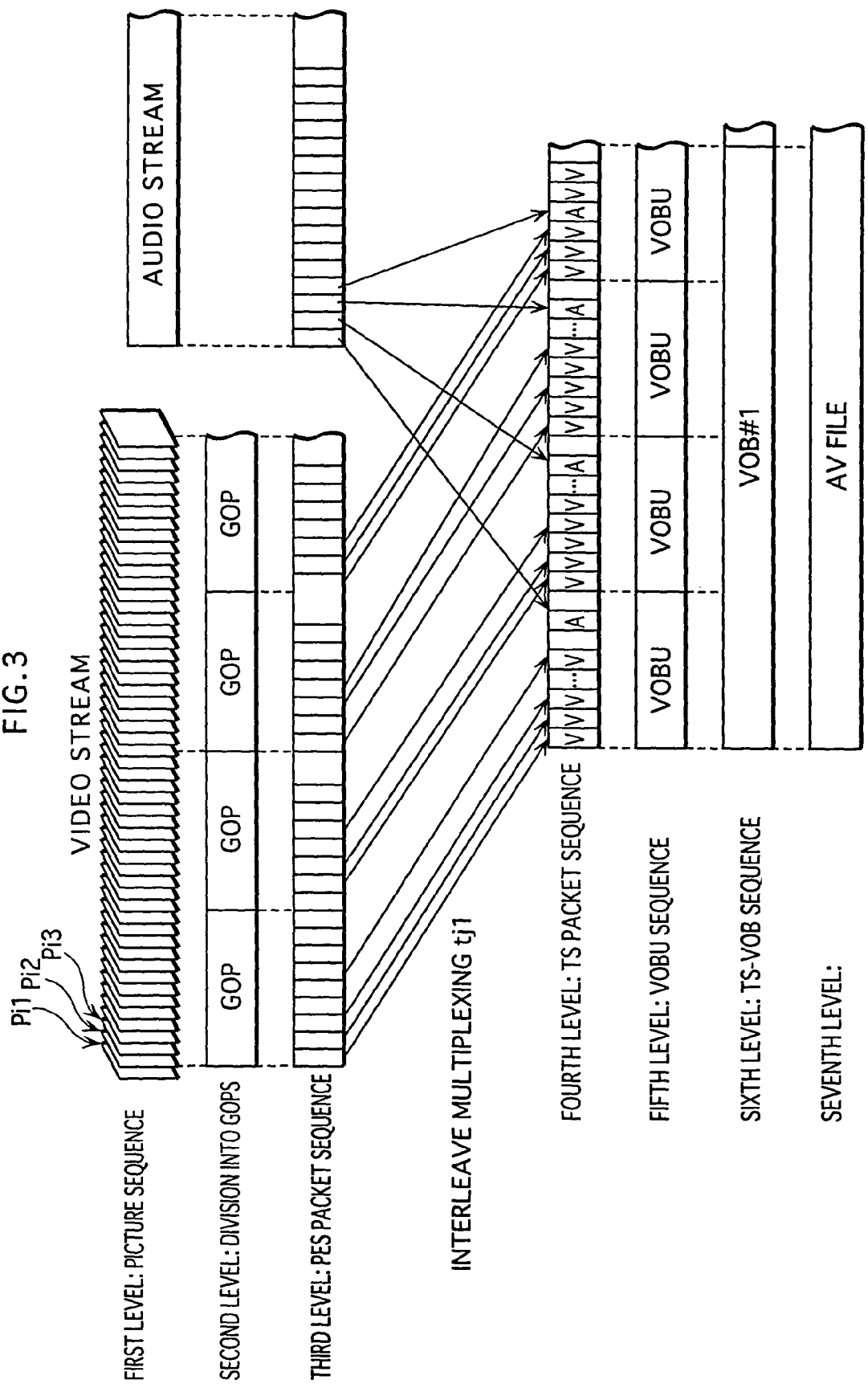
FIG. 3 shows a structure of a TS-VOB stored in an AV file and being detailed into levels.

FIG. 3 shows a structure of a TS-VOB stored in an AV file, being detailed into levels. In the figure, the AV file shown in FIG. 2 is shown at the seventh level that is the lowest level. A TS-VOB that is stored in the AV file is shown at the sixth level in FIG. 3. As shown in the figure, the TS-VOB is obtained by multiplexing a video stream and an audio stream shown at the first level. The video stream located at the first level is a sequence of a plurality of pieces of picture data ("pi1", "pi2", "Pi3" . . . ). These pieces of picture data are each displayed in one display period (also referred to as a "video frame"). In the case of display in the NTSC format, a video frame has approximately 33 msec. (precisely, $1/29.97$ sec.). In the case of display in the PAL format, a video frame has 40 msec. These pieces of picture data are compressed by encoding based on correlation between frames. Therefore, pieces of picture data that constitute the video stream can be categorized into three types of pictures, namely, "B (Bidirectionally Predictive) picture" that is compressed using correlations with an image to be played back in the past direction and with an image to be played back in the future direction, "P (Predictive) picture" that is compressed using correlation with an image to be played back in the past direction, and "I (Intra) picture" that is compressed without using correlation but using a spatial frequency characteristic in an image corresponding to one frame.

In the video stream, a minimum unit of decoding is referred to as a "GOP (Group Of Picture)". A GOP includes at least one I picture, and is a collection of pieces of picture data with a playback time period of approximately 1.0 sec. In FIG. 3, the video stream shown at the first level is divided into a plurality of GOPs at the second level. The encoding format used for picture data is a variable-length encoding format, and so the data length differs depending on each GOP. When data is recorded onto a DVD, a GOP sequence is divided into a plurality of parts regardless of the size of each GOP. The divided parts are stored in a PES packet sequence shown at the third level. On the other hand, the audio stream located at the right side of the first level is also divided into a plurality of parts, and the divided parts are stored in the PES packed sequence shown at the third level. As shown at the third level in the figure, PES packets store the divided parts of the video stream and the divided parts of the audio stream. In a header of each PES packet, a "DTS" showing the timing at which the divided part is to be decoded, and a "PTS" showing the timing at which the decoding result of the divided part is to be displayed are attached.

The PES packet sequence that stores the GOP sequence is multiplexed with the PES packet sequence that stores the audio stream ("tj1" in the figure), thereby constituting a TS packet sequence shown at the fourth level. Audio data that is multiplexed with at least one GOP and with pieces of picture data form a VOBU (Video Object Unit) as shown at the fifth level. A VOBU is a minimum unit for accessing a TS-VOB, and is formed by arranging video packs and audio packs defined by the MPEG standard. The TS-VOB shown at the sixth level has a structure in which a plurality of VOBUs are arranged in time series. The description given so far is on the internal structure of the TS-VOB.

Figure 4:
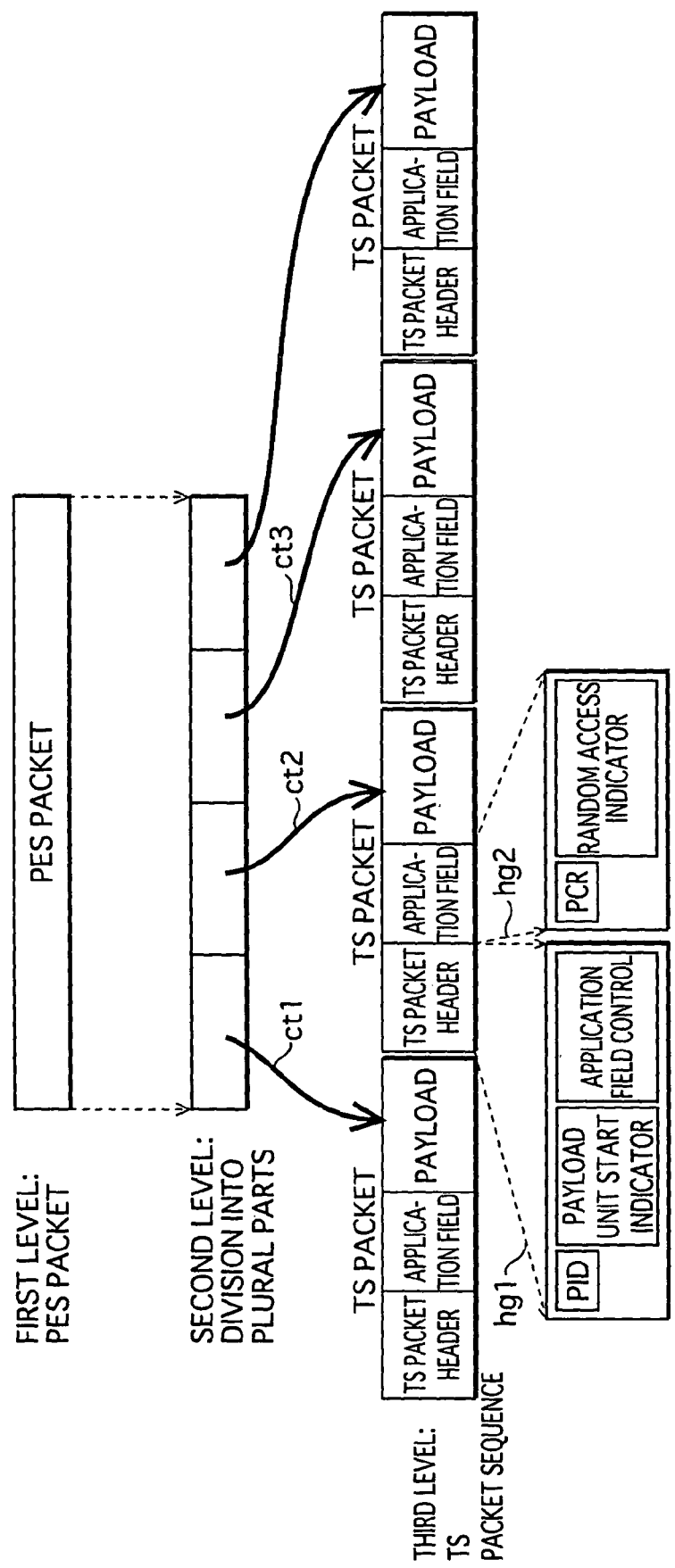
FIG. 4 shows how a PES packet is stored into TS packets.

The dividing and multiplexing shown at the third to fifth levels are features unique to a TS-VOB, and are not seen in a conventional DVD. A VOB to be recorded on a conventional DVD, i.e., a VOB in the form of a program stream is composed of a plurality of packs, and one PES packet is directly stored into each pack. On the other hand, for a TS-VOB in the form of a transport stream, a PES packet is stored into TS packets after being divided into a plurality of parts. FIG. 4 shows how a PES packet is stored into TS packets.

As shown at the third level in FIG. 4, a TS packet is composed of a TS packet header, an application field, and a payload. A TS packet has a size of 188 bytes. The data size of 188 bytes is the same size as an ATM packet that is transmitted on an ATM transmission path. The size of a TS packet is determined as such, so that a TS packet can be directly recorded together with a packet transmitted via an ATM transmission path.

A payload stores a divided part obtained by dividing a PES packet. When a PES packet is a part of a video stream, this payload corresponds to a video layer. In FIG. 4, a PES packet shown at the first level is divided into a plurality of parts as shown at the second level, and each divided part is stored in a payload of a TS packet shown at the third level, as indicated by the arrows "ct1", "ct2", and "ct3".

The structure of a TS packet header is indicated by the arrows "hg1" drawn with broken lines. As indicated by the arrows "hg1", the TS packet header stores a "PID (Packet Identifier)" for identifying a video stream to which the TS packet belongs, or an audio stream to which the TS packet belongs, and a "payload unit start indicator" for indicating the start location of the PES packet in the payload, and "application field control" for indicating whether an application field follows the TS packet header within the TS packet.

The "application field" stores information about a system layer of a video stream when a divided part of the video stream is stored in the payload. Such information about the system layer includes a "PCR (Program Clock Reference)" and a "random access indicator", as indicated by the arrows "hg2" drawn with broken lines. The PCR is a reference value for a reference clock "STC (System Time Clock)" of a device that decodes a stream. The reference value is used for the processing (1) for demultiplexing a transport stream, and the processing (2) for reconstructing various PES streams, such as a video stream, using a transport stream. The "random access indicator" indicates whether the PES packet in the payload includes the first frame of an access point of the video stream or not. The access point exists within a stream, and is a unit that can be decoded alone, and the random access indicator indicates whether the first frame (I picture) of a GOP exists or not.

The description given so far is on the difference between a TS-VOB and a VOB in the form of a program stream. The following describes how a TS-VOB is recorded onto a DVD. A DVD includes a plurality of ECC blocks that are recording areas where errors can be corrected. A plurality of TS packets that constitute a transport stream are converted into units called "capsules", and are recorded into the ECC blocks. A capsule is formed by arranging a plurality of TS packets each having an ATS attached thereto. The ATS (Arrival Time Stamp) is information about the timing at which a TS packet enters into the apparatus.

Figure 5:
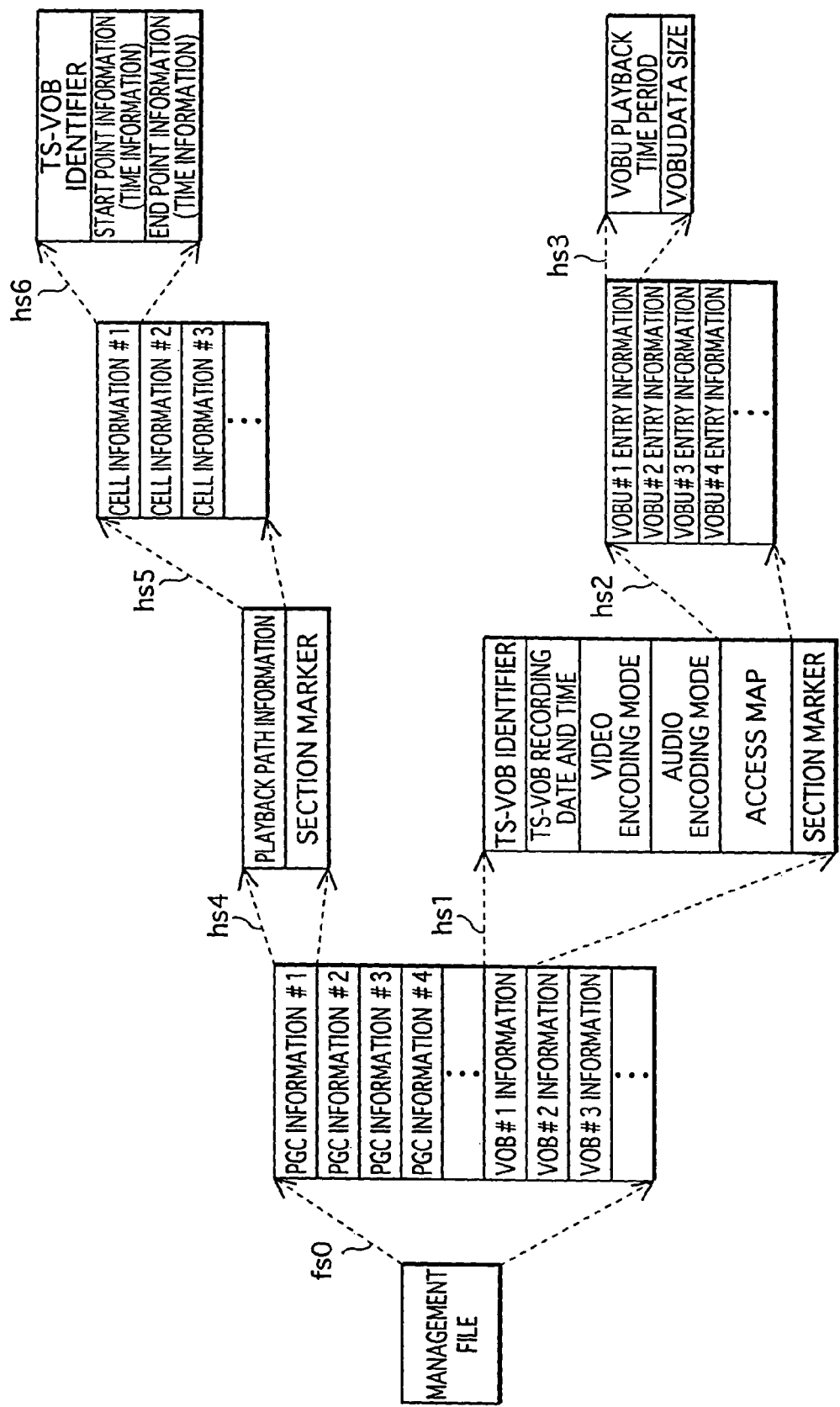
FIG. 5 shows an internal structure of a management file.

The following describes an internal structure of a management file. FIG. 5 shows the internal structure of the management file. As indicated by the arrows "fs0" drawn with broken lines in the figure, the management file is composed of a plurality of pieces of VOB information (VOB#1 information, VOB#2 information, VOB#3 information . . . ), and a plurality of pieces of PGC information (PGC information #1, PGC information #2, PGC information #3 . . . ).

The VOB information (#1, #2, #3 . . . ) is information showing details of each TS-VOB recorded on a DVD. In the figure, the VOB#1 information corresponding to the VOB#1 is detailed as indicated by the arrows "hs1" drawn with broken lines.

As indicated by the arrows "hs1", the VOB#1 information includes a "TS-VOB identifier" for uniquely identifying the corresponding TS-VOB, a "TS-VOB recording date and time" showing the date and time at which the TS-VOB is recorded, a "video encoding mode" showing the format in which a video stream to be multiplexed into the TS-VOB is encoded, an "audio encoding mode" showing the format in which an audio stream to be multiplexed into the TS-VOB is encoded, an "access map" and a "section marker" for the TS-VOB.

The "access map" is a reference table for indirectly referencing addresses of a plurality of start locations that can be accessed in the TS-VOB, using time information. By tracing the arrows "hs2" and "hs3" drawn with broken lines, the access map is detailed further. As indicated by the arrows "hs2", the access map is composed of pieces of entry information each of which corresponds to one VOBU. As indicated by the arrows "hs3", the entry information associates a "VOBU playback time period" showing a time period required for playing back the corresponding VOBU, with a "VOBU data size" showing a data size of the VOBU. With the variable-length encoding format being employed, each VOBU including a GOP may have a different size and a different playback time period. By referring to the "entry information", however, a freely-chosen playback time can be converted into an address of the start of a piece of picture data within a VOBU corresponding to the chosen playback time, so that the start of the piece of picture data can be accessed.

The following describes an internal structure of PGC information. As indicated by the arrows "hs4" drawn with broken lines, the PGC information includes "playback path information" showing a playback path for a TS-VOB via an access map, and a "section marker". The playback path information is characterized by its way of description. To be more specific, because the management information includes an access map, the playback path information is described in the form of indirect referencing using the access map as a reference table. The playback path information is described in the form of indirect referencing for the purpose of eliminating the burden of updating the playback path information when the TS-VOB is edited. The following describes the playback path information in detail. As indicated by the arrows "hs5" drawn with broken lines, the playback path information is composed of a sequence of a plurality of pieces of cell information (cell information #1, cell information #2, cell information #3 . . . ). As indicated by the arrows "hs6" drawn with broken lines, the cell information includes a "TS-VOB identifier" for identifying the corresponding TS-VOB, "start point information" that is time information showing a playback start location in the TS-VOB, and "end point information" that is time information showing a playback end location in the TS-VOB. A section whose start and end points are specified by the start point information and the end point information is referred to as a "cell". The sequence of pieces of cell information in the playback path information indicates the order in which cells corresponding to these pieces of cell information are to be played back. Playback path information described in such a way can be categorized into two types, one being generated automatically by the recording apparatus 100 at the time of recording the TS-VOB, and the other being recorded in accordance with an editing operation of the user. Playback paths shown by such playback path information aim at playing back the TS-VOB on various different paths.

Figure 6:
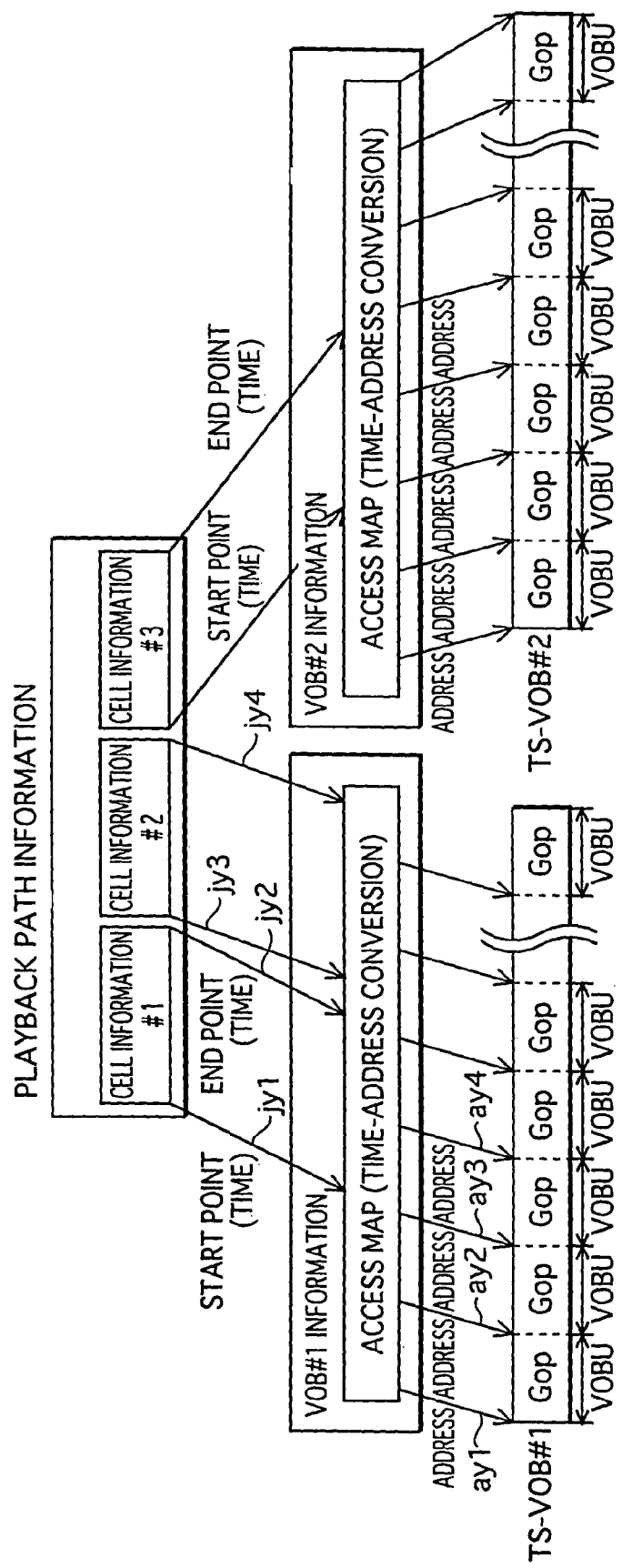
FIG. 6 schematically shows indirect referencing using playback path information.

FIG. 6 schematically shows indirect referencing using playback path information. In the figure, the TS-VOB#1 and the TS-VOB#2 each are composed of a plurality of VOBUs. Each VOBU includes a GOP. An access map included in each of two pieces of VOB information specifies sector addresses of these plurality of GOPs as indicated by the arrows "ay1", "ay2", "ay3", and "ay4". These sector addresses are indirectly referenced via the access map. The arrows "jy1", "jy2", "jy3", and "jy4" in the figure schematically show specification of GOPs by way of time information. To be more specific, the specification of the GOPs by way of the time information (indicated by the arrows "jy1", "jy2", "jy3", and "jy4") is realized by specifying addresses of GOPs included in the TS-VOB via the access map. The playback path information in the figure expresses a playback path by a combination of pieces of time information indicated by the arrows "jy1", "jy2", "jy3", and "jy4".

Figure 7:
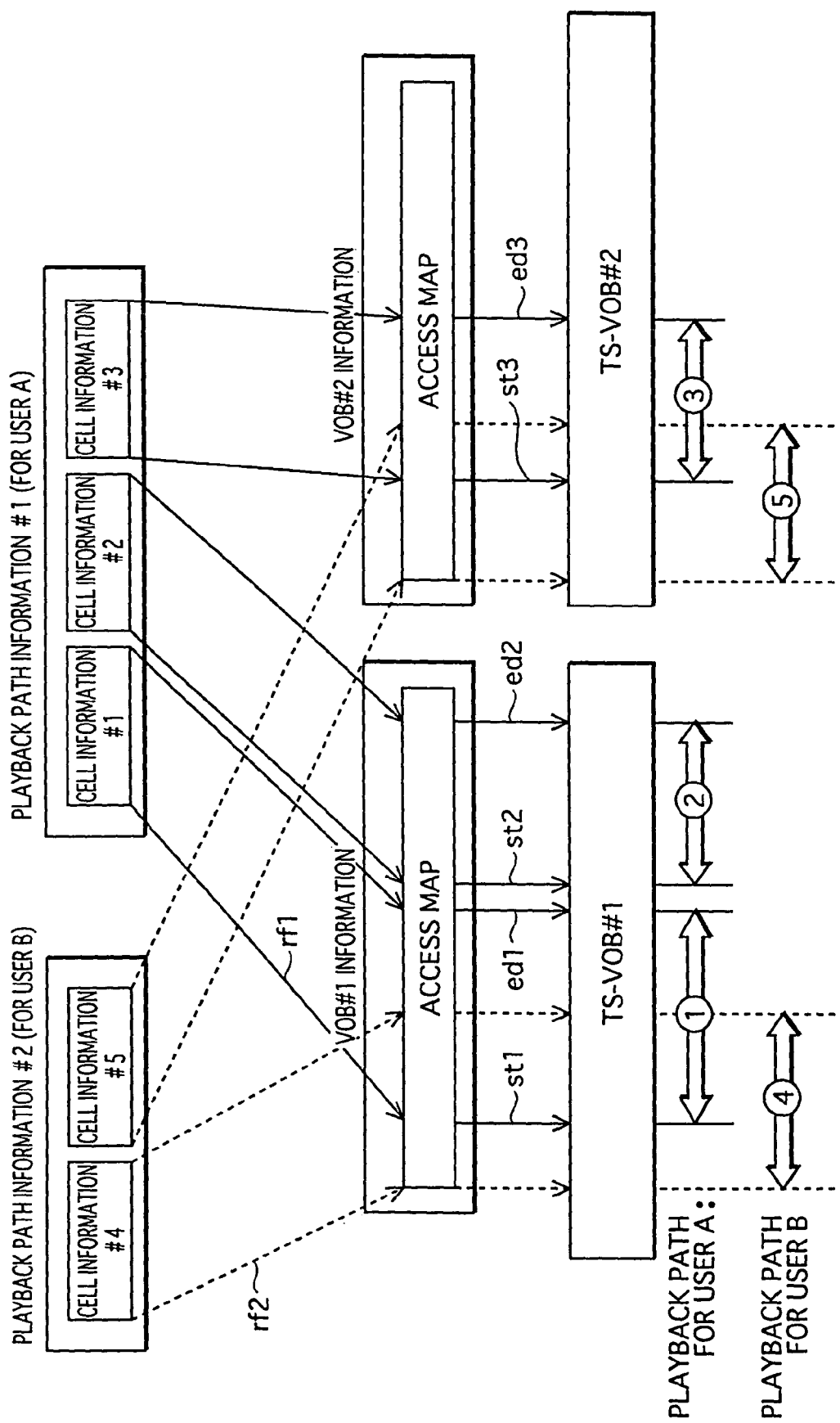
FIG. 7 shows a data structure of a DVD for realizing multi-user compatibility.

The following describes an example case where various types of information described above are applied to a multi-user compatible DVD. FIG. 7 shows a data structure of a DVD for realizing the multi-user compatibility. In FIG. 7, two TS-VOBs, namely the TS-VOB#1 and the TS-VOB#2 are recorded on the DVD, and VOB#1 information and VOB#2 information are respectively assigned to these TS-VOBs. The playback path information #1 (PGC information #1) and the playback path information #2 (PGC information #2) recorded with being included in the VOB#1 information and the VOB#2 information define playback paths assigned respectively to the two users (user A and user B) shown in FIG. 1. The playback path desired by user A is to play back a part ① and a part ② of the TS-VOB#1, and a part ③ of the TS-VOB#2 in the stated order. The playback path desired by user B is to play back a part ④ of the TS-VOB#1 and a part ⑤ of the TS-VOB#2 in the stated order. The PGC information #1 assigned to user A includes cell information #1, cell information #2, and cell information #3, whereas the PGC information #2 assigned to user B includes cell information #4 and cell information #5.

These pieces of cell information #1 to #5 respectively, specify the start and end points of the parts ① to ⑤ by indirect referencing. Being specified by the pieces of cell information, the parts ① to ⑤ are handled as cells.

In the figure, the arrows "rf1" and "rf2" symbolically represent the indirect referencing. As can be understood from the arrows "rf1" and "rf2", the start points "st1", "st2", and "st3", and the end points "ed1", "ed2", and "ed3" of the parts ① to ⑤ of the TS-VOB#1 and the TS-VOB#2 are specified by indirect referencing via the corresponding access maps.

Figure 8:
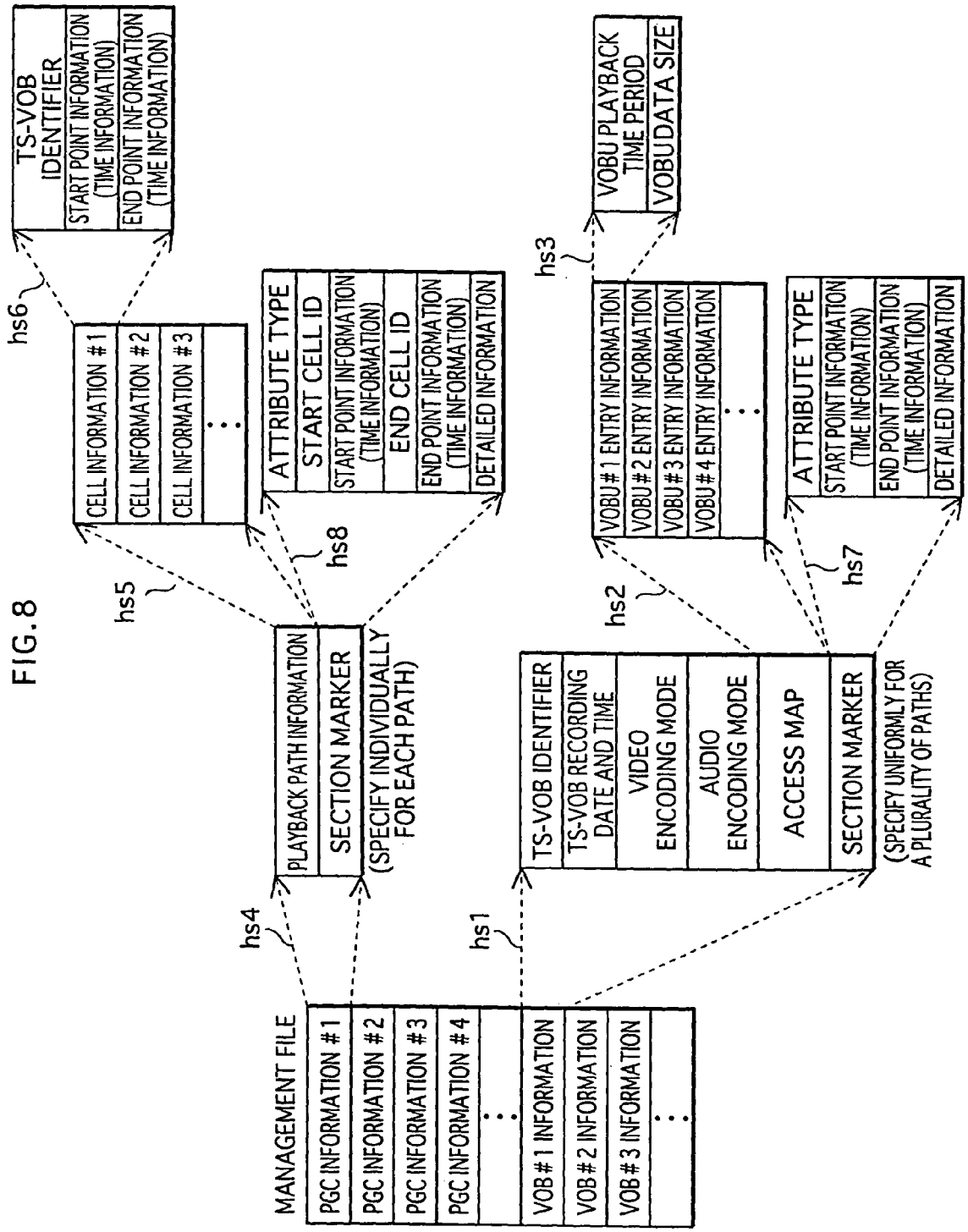
FIG. 8 shows section markers that are set in VOB information and in PGC information.

The description given so far is on the VOB information and the PGC information. The characteristic of the present embodiment lies in that a section marker is set within VOB information and a section marker is set within PGC information in the hierarchical structure as described above. FIG. 8 shows a section marker set within VOB information and a section marker set within PGC information.

Each of these section markers occupies a part of a playback path shown by playback path information. Specifically, the section marker is information for marking a section that is recognized by the recording apparatus 100 as having an extended attribute. The "extended attribute" is an attribute that makes extended control valid. At the time of playback via a playback path, extended control is to be executed in accordance with the extended attribute, in a section of the playback path specified by the section marker. An internal structure of the section marker set within VOB information is as indicated by the arrows "hs7" drawn with broken lines in FIG. 8. The section marker includes an "attribute type" indicating a type of an extended attribute of an extended attribute section whose location is specified by the section marker, "start point information" that is time information indicating the start point of the extended attribute section in a plurality of playback paths that refer to the TS-VOB, "endpoint information" that is time information indicating the end point of the extended attribute section in a plurality of playback paths that refer to the TS-VOB, and "detailed information" showing details of extended control to be executed in the extended attribute section and a reference used to recognize the extended attribute section.

An internal structure of the section marker set within the PGC information is as indicated by the arrows "hs8" drawn with broken lines. The section marker includes an "attribute type" indicating a type of an extended attribute of the section marker whose location is specified by the section marker, a "start cell ID" identifying a cell including the start point of the extended attribute section, out of a plurality of cells included in the playback path corresponding to the playback path information, "start point information" that is time information indicating the start point of the extended attribute section within the cell, an "end cell ID" identifying a cell including the end point of the extended attribute section, out of the plurality of cells included in the playback path corresponding to the playback path information, "end point information" that is time information indicating the end point of the extended attribute section within the cell, and "detailed information" showing details of extended control to be executed in the extended attribute section and a reference used to recognize the extended attribute section.

Such section markers set in VOB information and PGC information have the following significance. A section marker set in VOB information is utilized in the following case. When a TS-VOB corresponding to the VOB information is referred to by a plurality of playback paths, the section marker in the VOB information is used to uniformly specify an extended attribute section for the plurality of playback paths.

On the other hand, a section marker set in PGC information is utilized in the following case. When a TS-VOB corresponding to VOB information is referred to by a plurality of playback paths, the section marker in the PGC information is used to individually specify an extended attribute section for a particular one of the plurality of playback paths.

Figure 9:
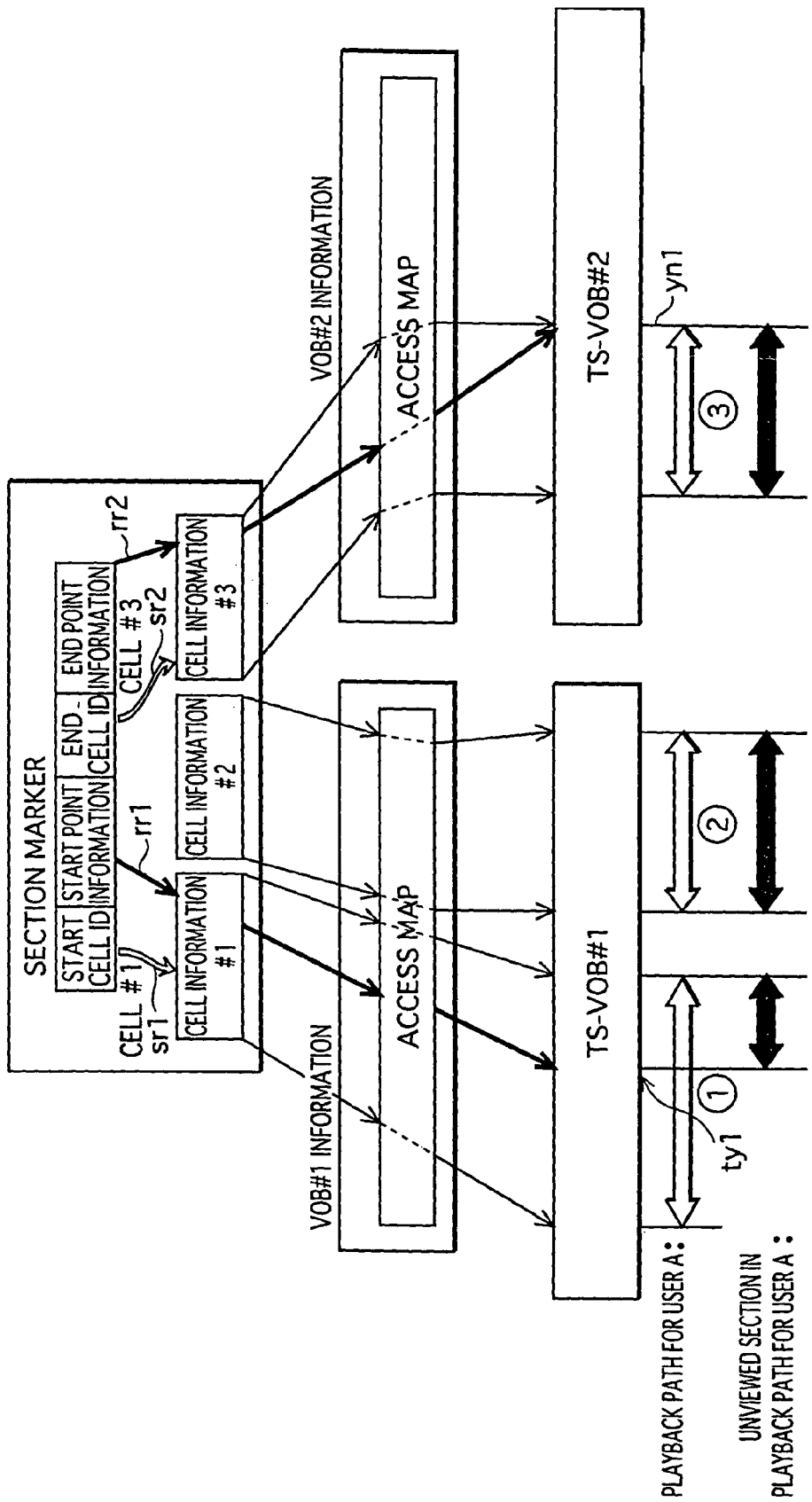
FIG. 9 shows an extended attribute section that exists in a playback path for user A.

The following describes how an extended attribute section having an attribute "unviewed" can be specified for playback paths for two users, when such an extended attribute section exists in each of the playback paths for the two users shown in FIG. 7. FIG. 9 shows the extended attribute section that exists in the playback path for user A. In the figure, it is assumed that a middle location "ty1" that is in the middle of the part ① and an end location "yn1" of the part ③ respectively correspond to the start point and the endpoint of an unviewed section that user A has not viewed yet. A section marker that is set in the PGC information #1 specifies the middle location "ty1" in the part ①  and the end location "yn1" in the part ③ by indirect referencing using the pieces of cell information and the access maps corresponding to the TS-VOB#1 and the TS-VOB#2. As described above, each piece of cell information itself indirectly references a location on the corresponding TS-VOB via the access map, and therefore, it can be said that the section marker specifies the start point and the end point of the extended attribute section having the attribute "unviewed", by so-called "indirect referencing to indirect referencing". The "start cell ID" and the "end cell ID" included in the section marker in FIG. 9 respectively identify the cell information #1 and the cell information #3 as indicated by the arrows "sr1" and "sr2". As can be seen from the figure, the start point and the end point of the extended attribute section are specified by the "indirect referencing to indirect referencing" using the cell information identified by the start cell ID and the cell information identified by the end cell ID, and the access maps. The arrows "rr1" and "rr2" in the figure symbolize the "indirect referencing to indirect referencing". To be more specific, it can be seen from the figure that the start point "ty1" and the end point "yn1" of the extended attribute section having the attribute "unviewed" are specified by the section marker, via the "indirect reference to indirect referencing".

Figure 10:
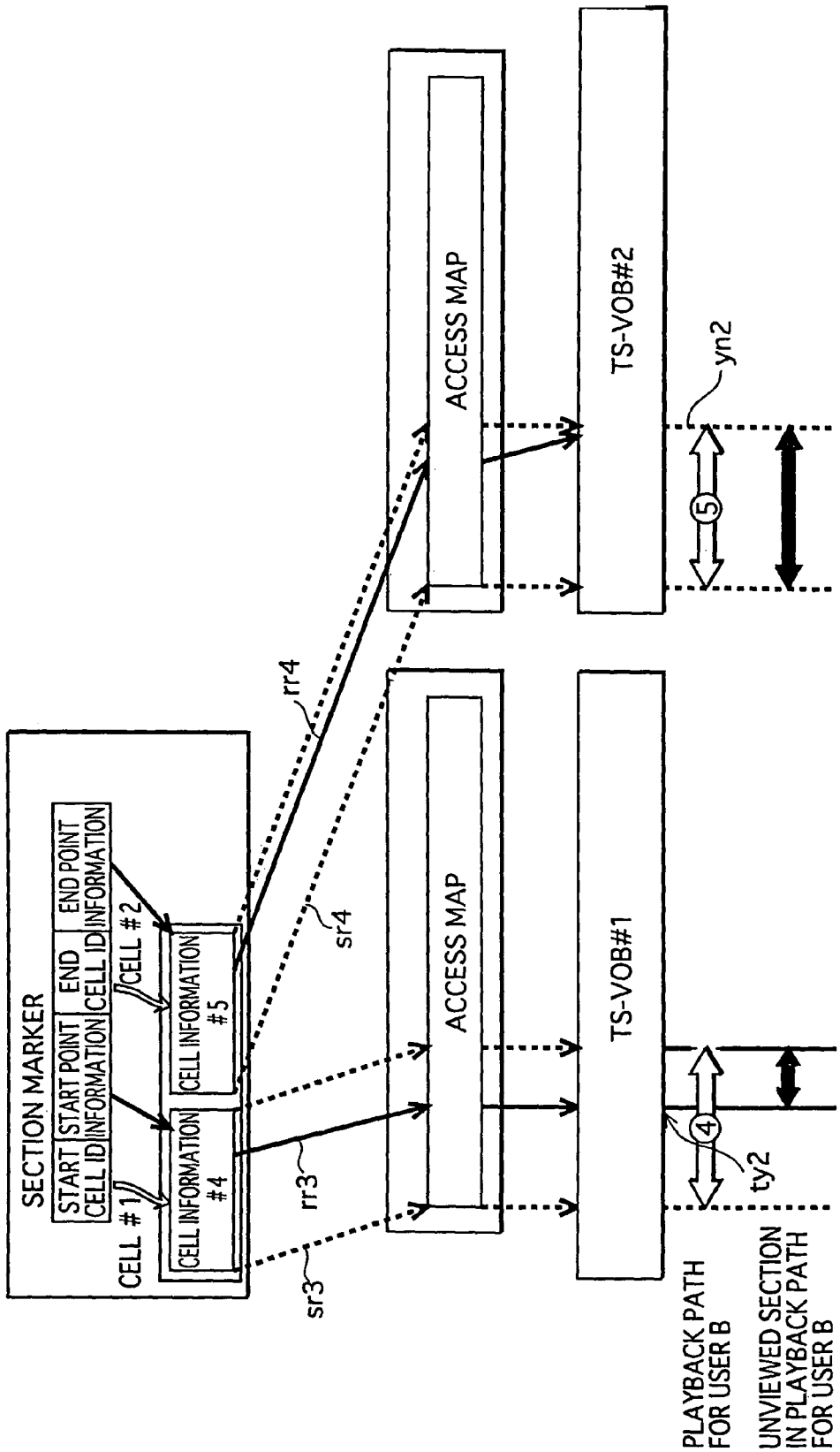
FIG. 10 shows a section marker that specifies an extended attribute section having an attribute "unviewed" that exists in a playback path for user B.

FIG. 10 shows the section marker that specifies the extended attribute section having the attribute "unviewed" that exists in the playback path for user B. In the figure, it is assumed that a middle location "ty2" that is in the middle of the part ④ and an end location "yn2" of the part ⑤ respectively correspond to the start point and the endpoint of an unviewed section that user A has not viewed yet. A section marker that is set in the PGC information #2 specifies the start point and the end point of the extended attribute section that user B has not viewed yet by "indirect referencing to indirect referencing". The "start cell ID" and the "end cell ID" included in the section marker in FIG. 10 respectively identify the cell information #4 and the cell information #5 included in the PGC information as indicated by the arrows "sr3" and "sr4". As can be seen from the figure, the start point and the end point of the extended attribute section are specified by the "indirect referencing to indirect referencing" using the cell information #4 and the cell information #5 included in the PGC information, and the access maps in the VOB information. The arrows "rr3" and "rr4" in the figure symbolize the "indirect referencing to indirect referencing".

By providing a section marker in PGC information, such an extended attribute section that satisfies individuality, preference, and convenience for each individual user can be set in a playback path for each user. The description given so far is on the application by providing a section marker in PGC information. It should be noted here that for a section marker within PGC information, end point information showing the end point of an extended attribute section and an end cell ID identifying a cell including the end point of the extended attribute section are not necessarily to be used. The end point information and the end cell ID may be omitted, or other parameters (equivalent parameters such as the number of VOBUs and the number of pieces of picture data) may be used to express the end point of the extended attribute section. This is due to the following reason. When a section that is yet to be viewed by a user is to be recognized as an extended attribute section, it is preferable to precisely specify the start point of the section that is yet to be played back, i.e., the point where the user stops viewing. On the other hand, the end point of the extended attribute section can often be automatically specified because it matches the end of the playback path defined by the user.

Figure 11:
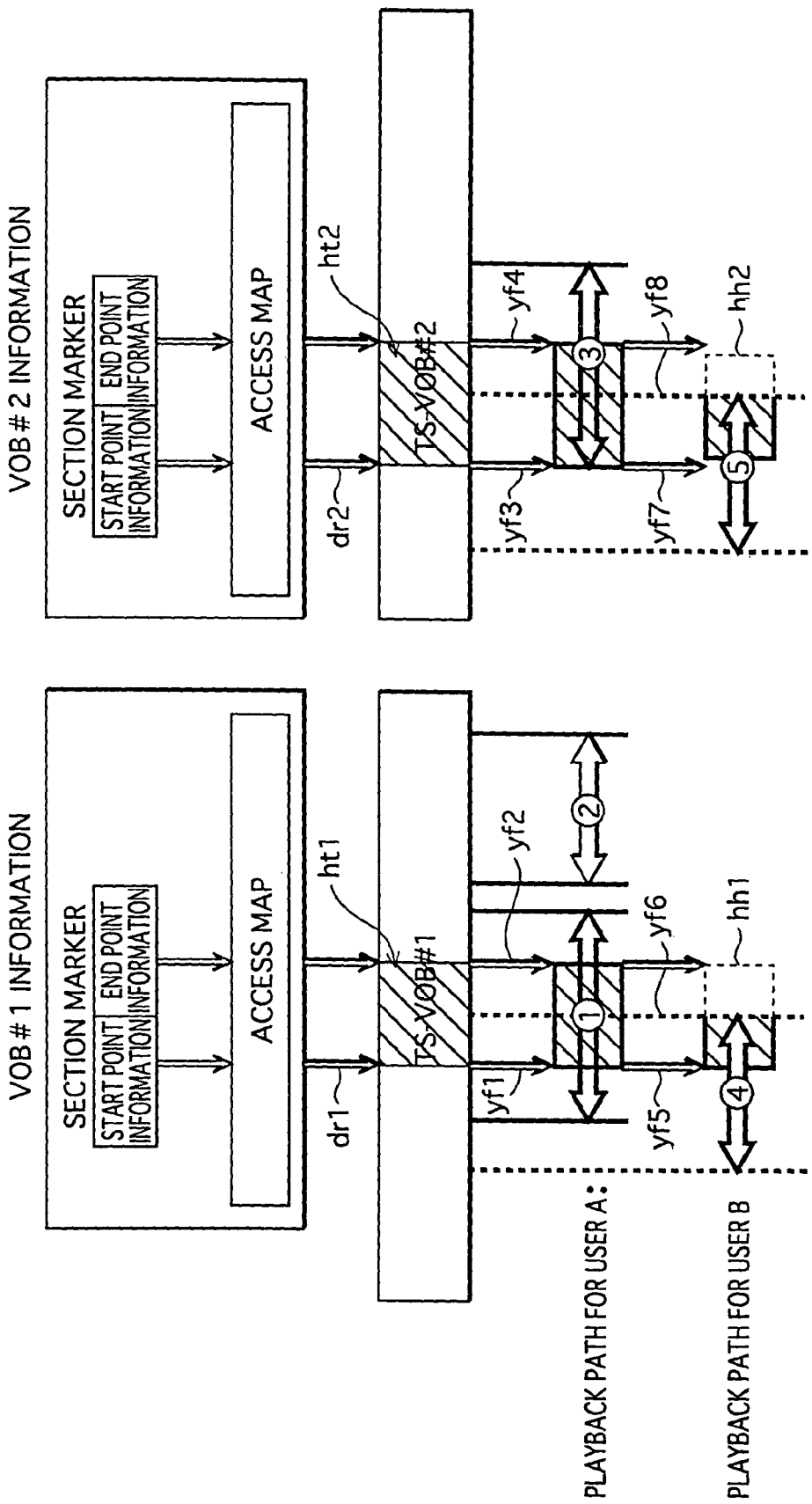
FIG. 11 shows VOB information in which a section marker is set.

The following describes an application of the case where a section marker is set in VOB information. FIG. 11 shows VOB information in which a section marker is set. In the figure, the hatched parts "ht1" and "ht2" are each a part of a TS-VOB that is recognized as an extended attribute section having an attribute "CM". Each of these parts may have been recognized as having the attribute "CM" using its audio attribute or user specification, or using any other means. When both users A and B uniformly want the recognized extended attribute sections to be skipped, these extended attribute sections having the attribute "CM" are to be specified in both the playback paths for users A and B. The arrows in the figure indicate locations of the CM sections in the playback paths for users A and B. In the playback path for user A, a section from the location "yf1" to the location "yf2", and a section from the location "yf3" to the location "yf4" are CM sections. In the playback path for user B, a section from the location "yf5" to the location "yf6", and a section from the location "yf7" to the location "yf8" are CM sections. The section marker set in the VOB information realizes uniform specification of an extended attribute section for all the users who refer to the TS-VOB#1. In the figure, the arrows "dr1" and "dr2" directly pointing to the TS-VOB symbolically show the uniform specification by the section marker set in the VOB information. To be more specific, these directly pointing arrows "dr1" and "dr2" show specification of both the extended attribute section in the playback path for user A and the extended attribute section in the playback path for user B. The arrows "yf1", "yf2", "yf3", and "yf4" show specification of extended attribute sections in the playback path for user A, whereas the arrows "yf5", "yf6", "yf7", and "yf8" show specification of extended attribute sections in the playback path for user B. The uniform specification symbolized by the arrows "dr1" and "dr2" has the same significance as specification of a collection of extended attribute sections for a plurality of playback paths. By realizing this uniform specification for playback paths for a plurality of users, section markers can be simplified and can be understood more easily.

Next, the following examines a part that is specified as being included in an extended attribute section by a section marker set in VOB information but is not defined as being included in a playback path shown by playback path information. In the example of FIG. 11, parts indicated by the broken lines "hh1" and "hh2" are specified as being included in the extended attribute sections specified by the section markers set in the VOB#1 information and in the VOB#2 information, but are not defined as being included in the playback paths shown by the VOB#1 information and the VOB#2 information. The specification of the sections by the section markers set in the VOB#1 information and the VOB#2 information does not cover the parts indicated by the broken lines "hh1" and "hh2". This means that a playback path shown by playback path information takes precedence over a section marker set in VOB information. To be more specific, even if a part is specified as being included in an extended attribute section by a section marker set in VOB information, if not defined as being included in a playback path shown by playback path information, neither playback control nor extended control is executed in this part.

Figure 12:
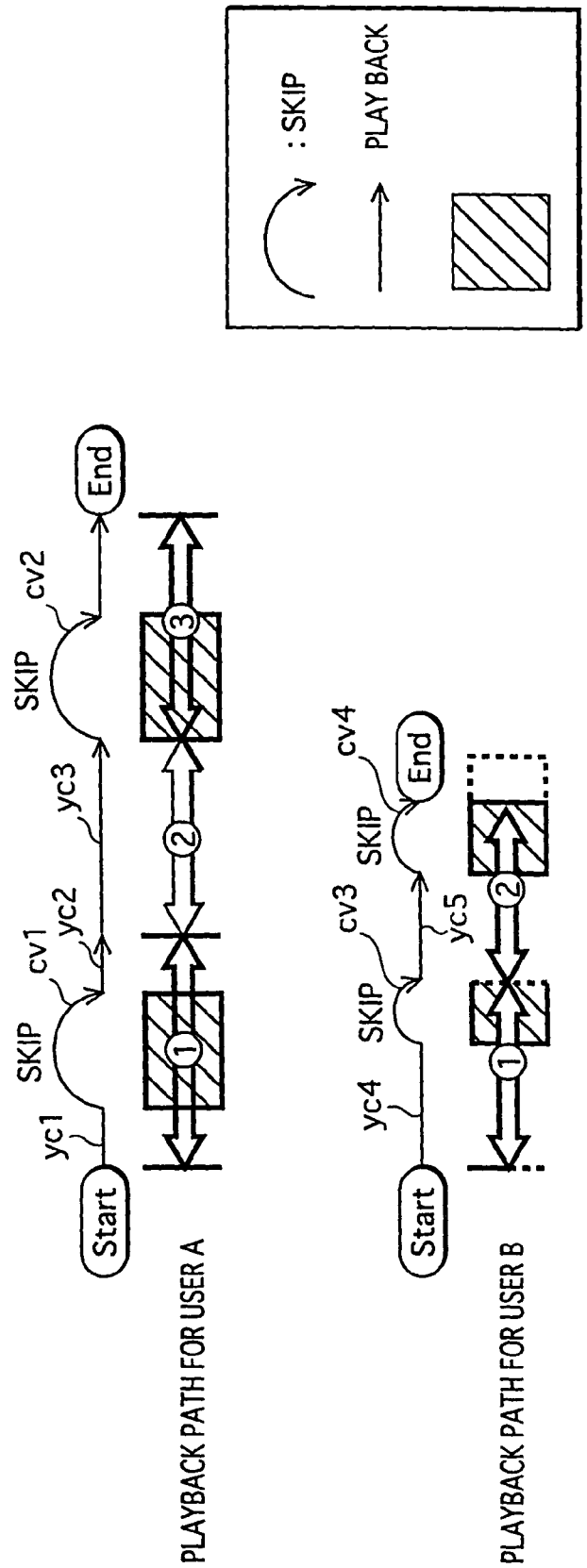
FIG. 12 shows extended control executed on a playback path for user A and extended control executed on a playback path for user B.

The following describes playback control executed on two playback paths for which an extended attribute section is uniformly specified. FIG. 12 shows extended control executed on the playback path for user A and extended control executed on the playback path for user B. In the figure, the arrows "yc1", "yc2", and "yc3" with straight lines symbolically show a normal playback process performed in accordance with the playback path. The arrows "cv1", "cv2", and "cv3" with curved lines symbolically show a skip playback process performed at the time of playback for users A and B. At the time of playback for users A and B, the skip playback process is performed in a CM section. By specifying an extended attribute section having the attribute "CM" using a section marker, skipping a CM section is uniformly performed at the time of playback for users A and B. As is the case with PGC information, it should be noted here that for a section marker set in VOB information, end point information showing the end point of an extended attribute section is not necessarily to be used. The end point information may be omitted, or other parameters (equivalent parameters such as the number of VOBUs and the number of pieces of picture data) may be used to express the end point of the extended attribute section.

The following describes how the start point of an extended attribute section is expressed by start point information included in the section marker. The start point information included in the section marker set in the VOB information shows the location of the start point of the extended attribute section using the time accuracy that is the same as or more accurate than the time accuracy of a video frame of picture data within a TS-VOB corresponding to the section marker. Due to this, the location where extended control is to be executed is expressed in detail by the section marker set in the VOB information.

Also, the start point information included in the section marker set in PGC information shows the location of the start point of the extended attribute section using the time accuracy that is the same as or more accurate than the time accuracy of a video frame of picture data within the corresponding TS-VOB. This TS-VOB corresponds to a cell identified by a start cell ID in the section marker. Due to this, the location where extended control is to be performed is expressed in detail by the section marker set in the PGC information.

To achieve the time accuracy that is the same as or more accurate than the time accuracy of a video frame, it is preferable to combine the time accuracy of $1/27,000,000$ sec. and the time accuracy of $1/90.000$ ($=300/27,000.000$) sec. The time accuracy of $1/90.000$ sec. is employed here by considering a common multiple of a frame frequency of an NTSC signal, a PAL signal, Dolby AC-3, and MPEG audio. The time accuracy of $1/27,000,000$ sec. is employed here by considering a clock frequency of the playback apparatus side being 27 MHz.

Although the present embodiment describes the case where the extended attribute section specified by the section marker set in the VOB information is a CM section in which extended control to skip the section is to be uniformly executed for every user, the extended attribute section may also be a section containing a sexual scene or a violent scene in which extended control to skip the section is to be executed. Assume, for example, that parents find a sexual scene and a violent scene when TS-VOBs are played back, and they do not want other members of the family to view these scenes. In such a case, these scenes can be set as an extended attribute section by setting a section marker in VOB information. By doing so, these scenes are skipped at the time of playback uniformly for all the users. Also, although the present embodiment describes the case where extended control to be executed in a CM section is to skip the section, the extended control may be to display a URL of a sponsor company relating to the CM section over the CM section, or may be to display thumbnail images of logos relating to the sponsor company.

Also, the present embodiment describes the case where the extended attribute section specified by the section marker set in the PGC information is an unviewed section in which extended control to access the start of the section is to be executed. Alternatively, a section in which fast-forward playback or fast-rewind playback was performed previously by users A or B may be specified as an extended attribute section. By doing so, extended control to execute the same processing as before can be easily realized in the extended attribute section in which such special playback was performed previously.

Further, although the present embodiment describes the case where one section marker is set in one piece of PGC information, a plurality of section markers may be set in one piece of PGC information. Extended attribute sections specified by the plurality of section markers may overlap with one another. In the same way, although the present embodiment describes the case where one section marker is set in one piece of VOB information, a plurality of section markers may be set in one piece of VOB information. Extended attribute sections specified by the plurality of section markers may overlap with one another.

Second Embodiment

Figure 13:
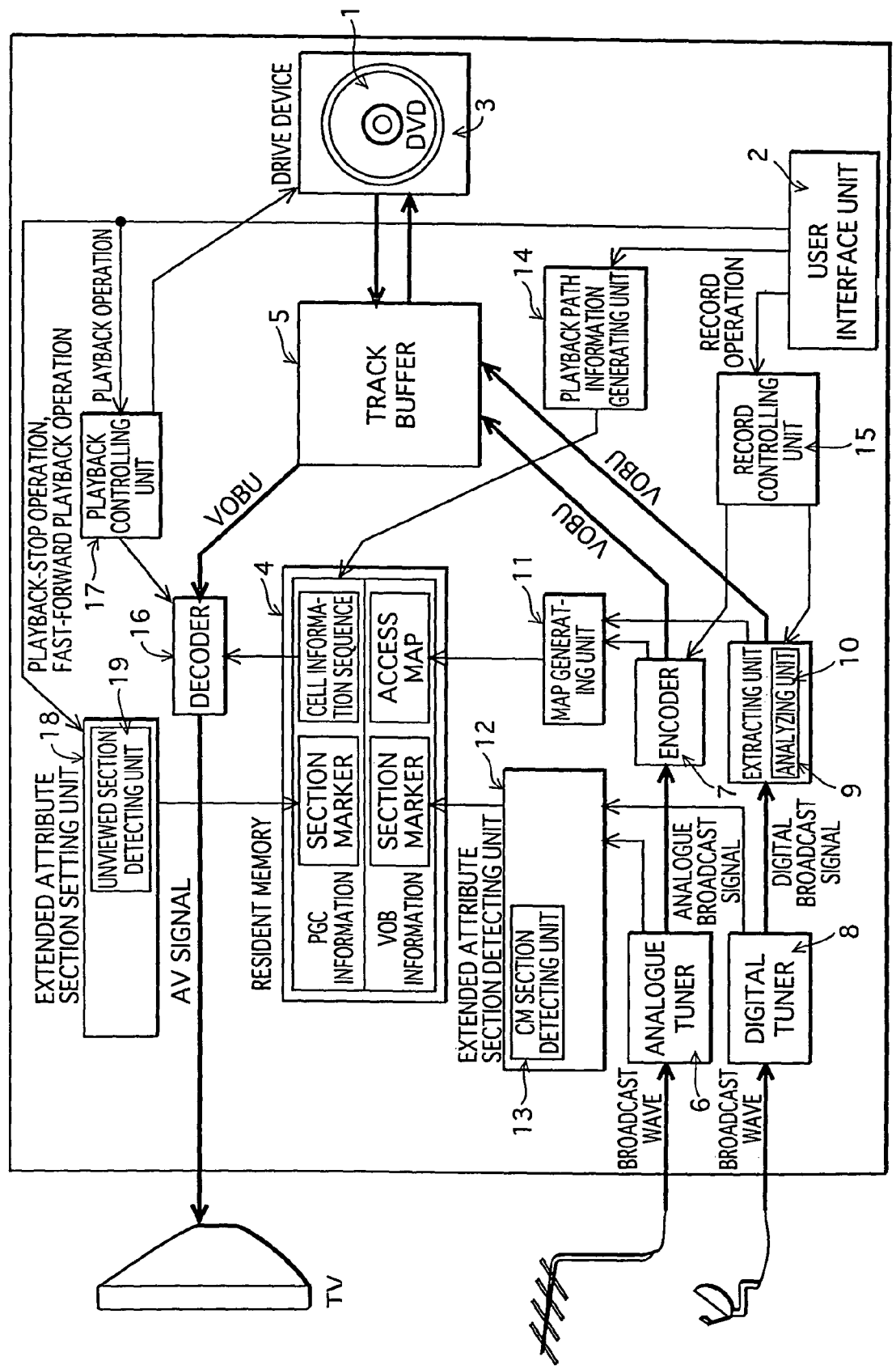
FIG. 13 shows an internal structure of a recording apparatus relating to a second embodiment of the present invention.

The present embodiment relates to the recording apparatus 100 for recording a TS-VOB relating to the first embodiment. The recording apparatus 100 mainly executes a recording process of a TS-VOB, but can also execute a playback process of a TS-VOB. As such, the recording apparatus 100 is of a hybrid type having functions of both a recording apparatus and a playback apparatus. FIG. 13 shows an internal structure of the recording apparatus 100. The components shown in the figure are categorized by their functions, into (i) components used both for the recording process and the playback process, (ii) components used only for the recording process, and (iii) components used only for the playback process.

First, the following describes the components used both for the recording process and the playback process. Such components include a user interface unit 2, a drive device 3, a resident memory 4, and a track buffer 5.

The user interface unit 2 receives, via a remote controller or panel buttons, user operations to record a broadcast program, select playback path information recorded on a DVD, perform normal playback, perform special playback such as fast-forward playback and fast-rewind playback, and the like.

The drive device 3 includes a base on which a DVD is set, a spindle motor for clamping the set DVD and driving and rotating the DVD, an optical pickup for reading a signal recorded on the DVD, and an actuator for the optical pickup. The drive device 3 is responsible for an access to the DVD. The access to the DVD includes writing of VOBUs to the DVD at the time of recording a program, and reading of VOBUs at the time of playing back the program.

The resident memory 4 is a memory for enabling VOB information and PGC information to be resident therein. The VOB information and the PGC information are to be resident in this memory for the purpose of avoiding collision between (a) a disc access for recording VOBUs and (b) a disc access for updating a management file. When the VOBU recording ends, the VOB information and the PGC information stored in the resident memory 4 are written back to the DVD.

The track buffer 5 is a buffer for temporarily storing VOBUs to be written to the DVD and VOBUs read from the DVD. The VOBUs to be written to the DVD and the VOBUs read from the DVD are temporarily stored in the track buffer 5, for the purpose of absorbing a difference between the decoding speed of the decoder 16 and the reading speed of the drive device 3 reading data from the DVD, and also for the purpose of absorbing a difference between the encoding speed of the encoder 7 and the writing speed of the drive device 3 writing data to the DVD.

The description given so far is on the components used both for the recording process and the playback process. The following describes the components used for the recording process. Such components include an analogue tuner 6, an encoder 7, a digital tuner 8, an extracting unit 9, an analyzing unit 10, a map generating unit 11, an extended attribute section detecting unit 12, a CM section detecting unit 13, a playback path information generating unit 14, and a record controlling unit 15.

The analogue tuner 6 modulates a broadcast wave transmitted from a broadcast station and selects a channel, to obtain an analogue broadcast signal corresponding to a single program.

The encoder 7 encodes a signal section of the analogue broadcast signal corresponding to the single program outputted from the analogue tuner, to obtain a VOBU. The encoder 7 includes a video encoder (1), an audio encoder (2), and a multiplexing unit (3). The video encoder (1) encodes a video signal in the analogue broadcast signal, to obtain a GOP. The audio encoder (2) encodes an audio signal in the analogue broadcast signal, to obtain an audio data sequence. The multiplexing unit (3) multiplexes the GOP and the audio data, to obtain a VOBU. Every time when a GOP is generated, the encoder 7 outputs a playback time period and a data length of the corresponding VOBU to the map generating unit 11.

The digital tuner 8 modulates a broadcast wave broadcasted from a broadcast station and selects a channel, to obtain a digital broadcast signal corresponding to a single program. In the present embodiment, the recording apparatus 100 is internally equipped with the digital tuner 8, which enables a digital broadcast signal to be obtained. Alternatively, a digital broadcast signal may be obtained from the digital tuner 8 equipped in another apparatus such as an STB (set top box). In this case, a digital interface for receiving a digital broadcast signal from the STB needs to be provided in the recording apparatus 100.

The extracting unit 9 extracts a TS packet sequence from a signal section of a digital broadcast signal, and adds an ATS to each TS packet, to obtain a VOBU.

The analyzing unit 10 is provided in the extracting unit 9, and judges which TS packet includes the start of an access point, by referring to a random access indicator in an application field of each TS packet. Further, the analyzing unit 10 detects an access point in the TS packet by referring to a payload unit start indicator in the TS packet. By repeatedly performing the judging process and the detecting process on a plurality of TS packets, the size and the playback time period of the corresponding VOBU are calculated. The size of the VOBU can be obtained by calculating a difference between the start location of the present access point and the start location of an access point following the present access point. The playback time period of the VOBU can be obtained by calculating a difference between a PTS attached at the start location of the present access point and a PTS attached at the start location of the following access point. The size and the playback time period of the VOBU calculated in this way are outputted to the map generating unit 11.

The map generating unit 11 associates the size and the playback time period of the VOBU outputted from the encoder 7 and the analyzing unit 10, with an identifier of the VOBU, obtains entry information for the VOBU, and writes them to the resident memory 4. An access map can be obtained by repeatedly performing a process of generating entry information for each VOBU included in the TS-VOB.

When the contents of extended control to be executed at the time of playback is to skip a CM section, and the extended control is valid uniformly for a plurality of playback paths, the extended attribute section detecting unit 12 uniformly specifies a section in which the extended control is to be executed for the plurality of playback paths shown by a plurality of pieces of playback path information as in FIG. 11. To realize this uniform specification, the extended attribute section detecting unit 12 generates a section marker specifying the location of the uniformly specified extended attribute section in the TS-VOB, and sets the section marker within the VOB information. Here, the section marker is generated in the following way. The extended attribute section detecting unit 12 monitors attributes of signal sections that constitute a digital broadcast signal and an analogue broadcast signal. When finding an attribute change, the extended attribute section detecting unit 12 detects a location corresponding to the change on the TS-VOB. It can be considered that such a change is at a location where extended control is to be started, i.e., at the start point of an extended attribute section. Therefore, a section marker specifying an extended attribute section with this detected change location being the start point is generated, and is set within the VOB information. For generating a section marker, the extended attribute section detecting unit 12 expresses the change location using a PTS attached to a PES packet inputted into the encoder 7 and the extracting unit 10 at the time when the attribute change is detected or a PTS attached to a PES packet outputted from the encoder 7 and the extracting unit 10 at the time when the attribute change is detected.

The CM section detecting unit 13 is provided in the extended attribute section detecting unit 12. When a signal section having a stereophonic audio attribute is inserted in a broadcast signal having a monaural audio attribute, the CM section detecting unit 13 detects a location corresponding to a change from analogue audio to stereo audio on a digital stream. It can be considered that the detected change location is where extended control to skip a CM section is to be started, i.e., the start point of an extended attribute section having the attribute "CM". Therefore, a section marker specifying an extended attribute section with this change location being the start point is generated, and is set within the VOB information.

When writing the TS-VOB to the DVD is completed, the playback path information generating unit 14 selects one of TS packets that constitute the TS-VOB as the start point of a cell, and selects another one of the TS packets that constitute the TS-VOB as the end point of the cell. Then, the playback path information generating unit 14 generates a piece of cell information having a PTS attached at the start point and a PTS attached at the end point respectively as start point information and end point information. By generating a plurality of pieces of cell information and arranging the generated pieces of cell information within the memory, the playback path information generating unit 14 obtains playback path information, and then generates PGC information including the obtained playback path information. It should be noted here that, for a user-defined playback path, the start and the end points of a cell are selected in accordance with a user operation received by the user interface unit 2.

The record controlling unit 15 realizes writing control, having buffering by the track buffer 5 as a precondition. This writing control is to wait for the track buffer 5 to be filled by TS packets outputted from the encoder 7 or the extracting unit 9, and to write, when the track buffer 5 is filled by TS packets, some of the TS packets within the track buffer 5 to an ECC block of the DVD. When a user operation to stop recording is given, TS packets accumulated in the track buffer 5 are written to the ECC block of the DVD and VOB information and PGC information stored in the resident memory 4 are written to the DVD. The recording process then ends.

The description given so far is on the components used for realizing the recording process in the recording apparatus 100. The following describes the components used for the playback process in the recording apparatus 100. Such components include a decoder 16, a playback controlling unit 17, an extended attribute section setting unit 18, and an unviewed section detecting unit 19.

The decoder 16 includes a demultiplexing unit (1), a video decoder (2), and an audio decoder (3). The demultiplexing unit (1) demultiplexes a VOBU that is read from the DVD by the drive device 3, into a video data sequence and an audio data sequence. The video decoder (2) decodes video data. The audio decoder (3) decodes audio data. The decoder 16 outputs an AV signal that is a multiplex signal of video and audio, onto a TV.

The playback controlling unit 17 calculates an address, on the DVD, of a TS packet that serves as the start point of a cell, by indirect referencing using an access map as a reference table. Also, the playback controlling unit 17 calculates an address, on the DVD, of a TS packet that serves as the end point of a cell, by the same indirect referencing. After calculating the addresses of the TS packets corresponding to the start and end points of the cell on the DVD, the playback controlling unit 17 instructs the drive device 3 to read TS packets that exist between these addresses, and instructs the decoder 16 to decode the read TS packets. By executing such playback control for a plurality of pieces of cell information that constitute playback path information, playback control in accordance with the playback path information can be realized. It should be noted here that the playback control described above is basic control. By irregularly reading VOBUs, the recording apparatus 100 can also realize special playback. For example, by reading a plurality of VOBUs with skipping some VOBUS, instead of playing back all TS packets, fast-forward playback can be realized. Also, by reading a plurality of VOBUs in the order reverse to the order in which the TS packets are arranged in the TS-VOB, fast-rewind playback can be realized.

When the contents of extended control to be executed at the time of playback is playback of an unviewed section or the like and the extended control is valid only for a playback path shown by one piece of playback path information, the extended attribute section setting unit 18 individually specifies the unviewed section in which the extended control is to be executed for the playback path. For realizing such individual specification, a section marker specifying the location of the section is generated, and is set within PGC information. The section marker is generated in the following way. The extended attribute section setting unit 18 detects user operations given during playback control executed based on the playback path. When a user operation is detected, a location at which the user operation is detected on a digital stream is considered as the location where the extended control is to be started. A section marker specifying an extended attribute section having the detected location being the start point is generated and set within the PGC information. For generating the section marker, the extended attribute section setting unit 18 expresses the detected location using a PTS attached to a PES packet inputted into the decoder 16 at the time when the user operation is detected.

The unviewed section detecting unit 19 is provided in the extended attribute section setting unit 18. The unviewed section detecting unit 19 detects user operations during the playback control executed based on the playback path. When an operation to stop playback is detected, a location at which the operation is detected on the digital stream is considered as the location where the extended control is to be started. A section marker specifying an extended attribute section having the detected location being the start point and the end of the playback path being the end point is generated and is set within the PGC information. The function of the unviewed section detecting unit 19 is to detect an unviewed section. Therefore, every time when playback of the playback path is started or stopped by the user, the unviewed section detecting unit 19 detects an extended attribute section and generates a section marker specifying the extended attribute section. In the present embodiment, the extended attribute section detected by the unviewed section detecting unit 19 is not an "un-played" section but is an "unviewed" section, with the intention of covering sections other than a section played back by the user. Assume here that the user is viewing a broadcast program while recording the program, and stops viewing it while continuing the recording. In such a case, a section starting from the location at which the user stops viewing to the end of the playback path is detected as an unviewed section. For example, when the user is viewing the program while recording it and stops viewing it while continuing the recording, the unviewed section detecting unit 19 may detect an operation to stop the user's viewing, such as an operation to cut off the power supply of the TV, and may detect, as an unviewed section, a section starting from the location where the operation is detected to the end of the TS-VOB.

Figure 14:
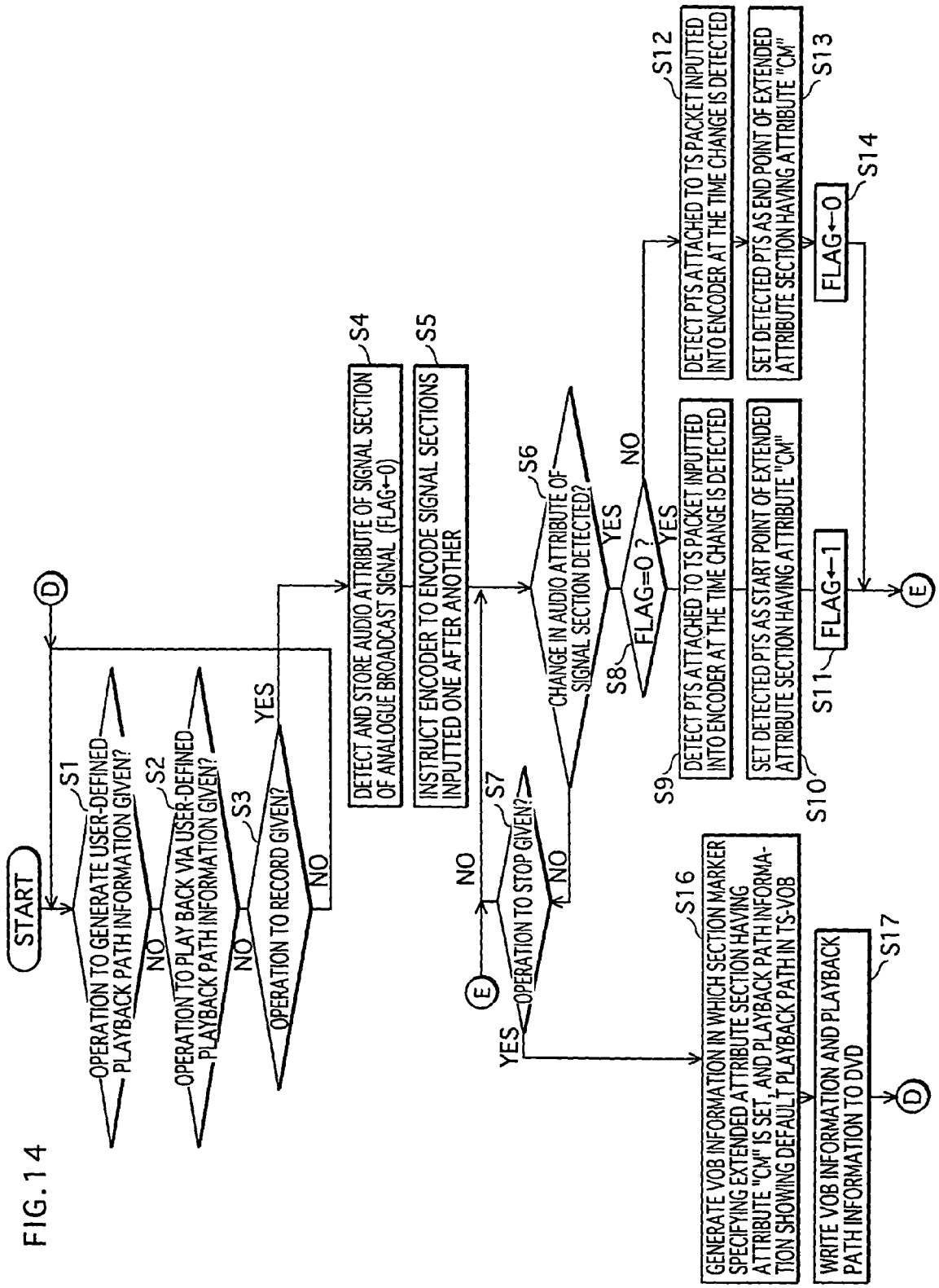
FIG. 14 is a flowchart showing a procedure of a program that constitutes functional characteristics of the recording apparatus.
Figure 15:
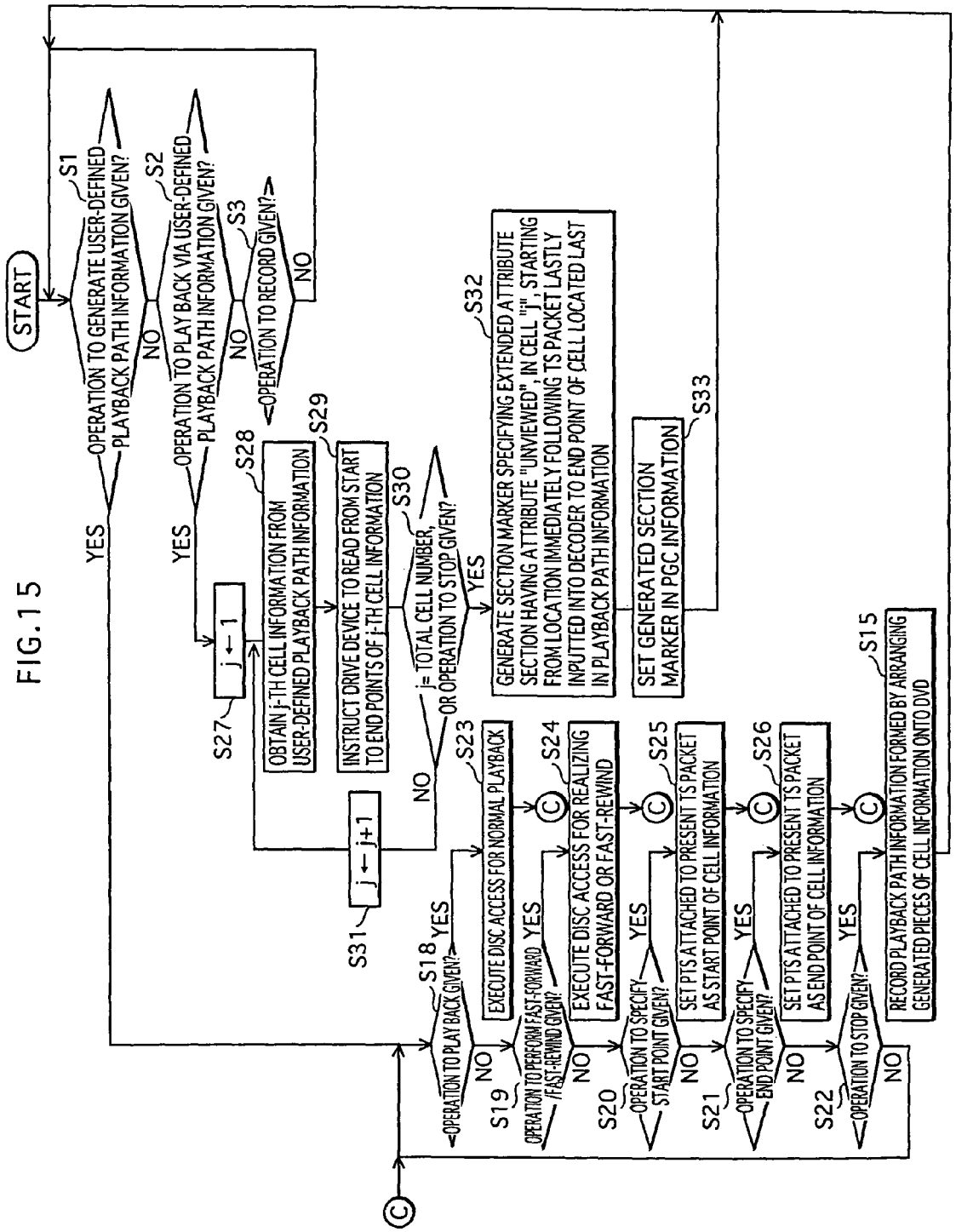
FIG. 15 is a flowchart showing a procedure of a program that constitutes functional characteristics of the recording apparatus.

The description given so far is on the components of the recording apparatus 100. These components are realized by a program, and a computer that decodes and executes the program. FIGS. 14 and 15 are flowcharts showing procedures of the program. The following describes the processing performed by the recording apparatus 100 in further detail, with reference to the flowcharts. For ease of explanation, the following assumes that only a CM section and an unviewed section are detected and set as an extended attribute section.

In the flowchart shown in FIG. 14, a loop process that is composed of steps S1 to S3 is located at the uppermost layer of the processing. This loop process is for assigning processing to the corresponding components, according to a user operation. When a user operation to start a recording process is given, the user operation is detected by the user interface unit 2, and the processing moves from step S3 to step S4. In step S4, the record controlling unit 15 detects and stores an audio attribute of a signal section of an analogue broadcast signal as a default audio attribute. Also, the record controlling unit 15 resets a flag that is described later, to "0". In step S5, the record controlling unit 15 instructs the encoder 7 to encode signal sections inputted one after another, and then moves the processing to a loop process that is composed of steps S6 and S7. This loop process is for making the CM section detecting unit 13 detect a change in an audio attribute of signal sections, in a period during which an analogue broadcast signal is continuously inputted. This loop process ends when judgment result in step S7 becomes "Yes". Also, every time when a change in an audio attribute of a signal section is detected, the processing in steps S6 and S7 is repeated after performing the processing in steps S8 to S14. The processing in steps S8 to S14 is to make the CM section detecting unit 13 set the detected change location as the start point or the end point of an extend attribute section. After the start point or the end point is set in steps S8 to S14, the processing returns to the loop process that is composed of steps S6 and S7. To be more specific, while an analogue broadcast signal is continuously inputted and the recording process is continued, the start point or the end point of an extended attribute section is set by the CM section detecting unit 13 every time when a change in an audio attribute is detected. In steps S9 and S12, the CM section detecting unit 13 detects a PTS attached to a TS packet inputted into the encoder 7 at the time when an audio attribute of an analogue broadcast signal is changed. The change location of the audio attribute is expressed by this PTS. The switch between the start point and the end point that the change location is to be set can be realized using a flag. When a value of the flag is "0", the CM section detecting unit 13 sets the detected PTS as the start point of an extended attribute section having the attribute "CM" in step S10. Then, the CM section detecting unit 13 sets the flag to "1" in step S11. When the value of the flag is "1", the CM section detecting unit 13 sets the detected PTS as the end point of the extended attribute section having the attribute "CM" in step S13. Then, the CM section detecting unit 13 resets the flag to "0" in step S14.

When a user operation to stop the recording process is given, the processing moves from step S7 to step S16. In step S16, the record controlling unit 15 generates, within the resident memory 4, VOB information in which a section marker specifying the location of an extended attribute section having the attribute "CM" is set, and PGC information including playback path information showing a default playback path in the TS-VOB. In step S17, the record controlling unit 15 writes the VOB information and the PGC information to the DVD.

The description given so far is on the recording process. With the recording process described above, the TS-VOB, the VOB information, and the PGC information are recorded onto the DVD.

When a user operation to execute a playback process is given, the processing moves from the loop process that is composed of steps S1 to S3, to a loop process that is composed of steps S18 to S22 shown in FIG. 15. The loop process that is composed of steps S18 to S22 is to receive various user operations for user-defining playback path information. When a user operation to perform normal playback is given (step S18: Yes), the playback controlling unit 17 instructs the drive device 3 to execute a disc access for normal playback in step S18. As a result, playback video of the TS-VOB is displayed on the TV. When a user operation to perform fast-forward playback or fast-rewind playback is given (step S19: Yes), the record controlling unit 15 instructs the drive device 3 to perform a disc access for realizing the fast-forward playback or the fast-rewind playback in step S24. With the processing described above, an access to the start of a part to be set as a cell can be realized at high speed. When a user operation to specify the start point of the cell is given (step S20: Yes), the playback path information generating unit 14 detects a PTS attached to a TS packet outputted from the decoder 16 in step S25, and sets the detected PTS as the start point of the cell information. On the other hand, when an operation to specify the end point of the cell is given (step S21: Yes), the playback path information generating unit 14 detects a PTS attached to a TS packet outputted from the decoder 16, and sets the detected PTS as the end point of the cell information in step S26. By repeating the processing described above, a plurality of pieces of cell information that constitute playback path information are generated within the resident memory 4. When an operation to stop the playback process is given, a judgment result in step S22 becomes "Yes". Then, the playback path information generating unit 14 writes PGC information including playback path information that is formed by arranging the generated pieces of cell information, onto the DVD in step S15.

The following describes the playback process of a TS-VOB executed based on user-defined playback path information. The user-defined playback path information is composed of a plurality of pieces of cell information, and therefore, the present piece of cell information to be subjected to the processing in steps S27 to S33 is identified using variable "j" (referred to as the "j-th cell information"). A loop process that is composed of steps S27 to S30 uses the variable "j" as its control variable. The playback controlling unit 17 obtains the j-th cell information from the user-defined playback path information (step S28), and instructs the drive device 3 to read VOBUs that exist between the start point to the end point of the j-th cell information (step S29). The decoder 16 decodes the read VOBUs, so as to output video. The control variable is incremented in step S31. This loop process ends when the control variable is judged to reach the total number of cells in step S30, or when a user operation to stop the playback is judged to be given.

When the user operation to stop the playback is given, the processing moves from step S30 to step S32. In step S32, the unviewed section detecting unit 19 generates a section marker specifying a section, in the cell "j", starting from a location immediately following a TS packet lastly inputted into the decoder to the end point of the cell information located last in the playback path information, as an extended attribute section having the attribute "unviewed". Then, the unviewed section detecting unit 19 sets the generated section marker within the user-defined PGC information in step S33. With the processing described above, an extended attribute section having the attribute "unviewed" is set for a user-defined playback path.

According to the present embodiment as described above, the recording apparatus 100 having the construction described in the present embodiment enables the DVD described in the first embodiment to be generated, and therefore, can promote the widespread of the DVD described in the first embodiment.

Third Embodiment

Figure 16A:
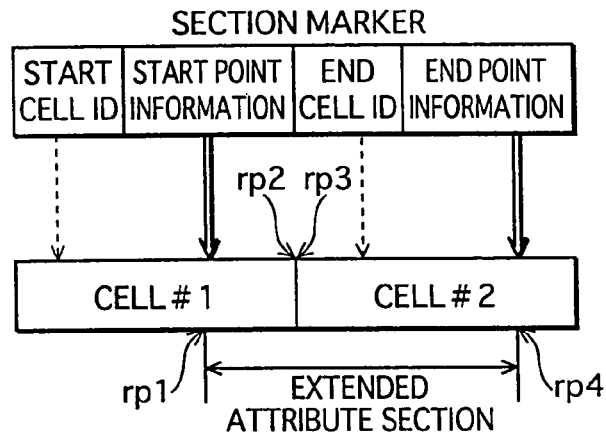
FIG. 16A shows an example where the start point and the end point of an extended attribute section are, respectively, included in two consecutive cells (cell#1 and cell#2)
Figure 16B:
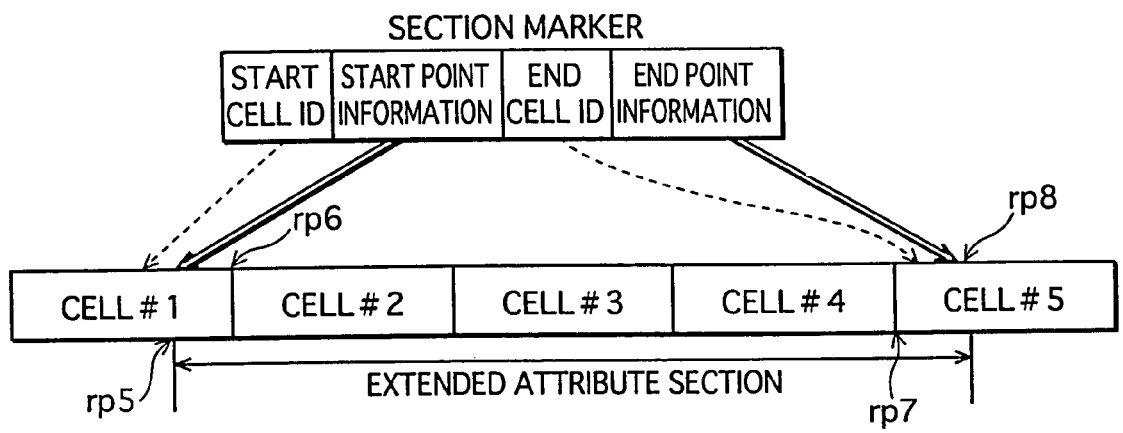
FIG. 16B shows an example where the start point and the end point of an extended attribute section are respectively included in first and last cells (cell#1 and cell#5) among three or more consecutive cells.

The present embodiment describes how the location of an extended attribute section can be specified on a DVD, when the extended attribute section having the attribute "unviewed" is specified by a section marker set in PGC information. An access map included in VOB information associates the playback time period and the size of each VOBU. Therefore, by summing up the addresses and playback time periods written in the access map, a VOBU that includes the start point of the extended attribute section and a VOBU that includes the end point of the extended attribute section can be identified. When the start point and the end point of the extended attribute section are included in the same cell, the VOBU including the start point and the VOBU including the end point and VOBUs that exist between these two VOBUS are simply to be read. Here, the processing becomes complicated when the start point and the end point are included in different cells. FIG. 16A shows an example where the start point and the endpoint of an extended attribute section are respectively included in two consecutive cells (cell#1 and cell#2). In this case, for the preceding cell#1, VOBUs that exist between the start point "rp1" of the extended attribute section and the end point "rp2" of the cell#1 are to be read. For the following cell#2, VOBUs that exist between the start point "rp3" of the cell#2 and the end point "rp4" of the extended attribute section are to be read. To be more specific, when the extended attribute section includes a boundary between two cells (a boundary between the two cells respectively including the end point and the start point of the extended attribute section), VOBUs that exist between the start point of the extended attribute section to the end point of the preceding cell are first to be read, and then, VOBUs that exist between the start point of the following cell to the end point of the extended attribute section are to be read. That is to say, reading of VOBUs is to be performed twice. FIG. 16B shows an example where the start point and the end point of an extended attribute section are respectively included in first and last cells (cell#1 and cell#5) among three or more consecutive cells. In this case, for the first cell#1, VOBUs that exist between the start point "rp5" of the extended attribute section and the end point "rp6" of the cell#1 are to be read. For the last cell#5, VOBUs that exist between the start point "rp7" of the cell#5 and the end point "rp8" of the extended attribute section are to be read. For the cell#2 to cell#4 that are sandwiched between the cell#1 and the cell#5, all VOBUs that exist between the start point to the end point of each cell are to be read. By reading the cell#1 to cell#5 in the above-described way, VOBUs included in the extended attribute section can be read.

According to the present embodiment as described above, even when the location of an extended attribute section is indicated by "indirect referencing to indirect referencing", the start and end locations of the TS-VOB to be played back can be easily specified.

Fourth Embodiment

The present embodiment discloses the processing performed when both extended control based on a section marker set in PGC information and extended control based on a section marker set in VOB information are to be executed at the same time. FIG. 17 shows an internal structure of the playback controlling unit 17 relating to the present embodiment. The playback controlling unit 17 in the present embodiment includes an extended control executing unit 20 and an extended control adjusting unit 21.

The extended control executing unit 20 executes, in an extended control attribute section specified by a section marker set in VOB information or in an extended control attribute section specified by a section marker set in PGC information, extended control unique to the extended attribute section.

The extended control adjusting unit 21 performs an adjustment process to solve collision between extended controls, which might occur in overlapping parts of two extended attribute sections. The adjustment process performed by the extended control adjusting unit 21 is to set a priority level for extended control to be performed in each extended attribute section, based on an extended attribute of the extended attribute section, and to exceptionally execute extended control having a high priority without executing extended control having a low priority.

Figure 18:
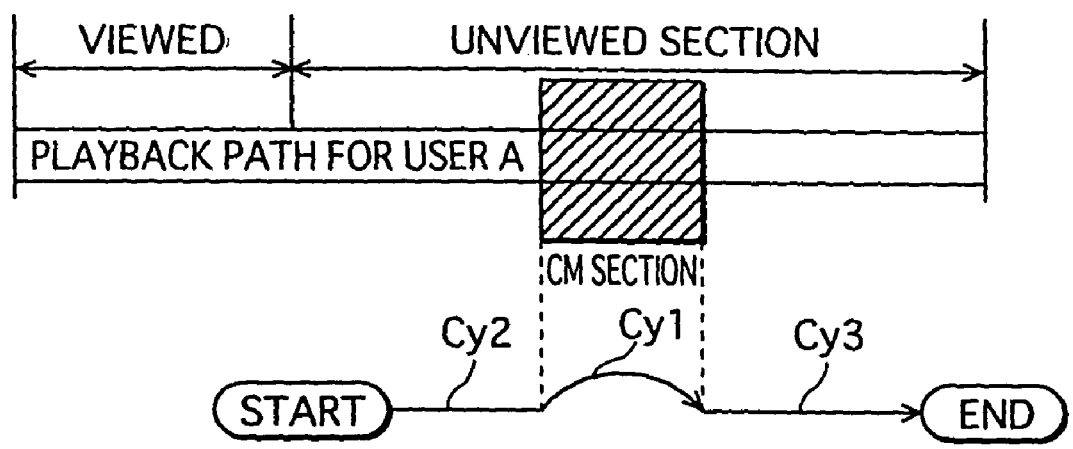
FIG. 18 shows a case where an unviewed section has its part overlapping with an extended attribute section having an attribute "CM" (a CM section)

FIG. 18 shows a case where an unviewed section has its part overlapping with an extended attribute section having the attribute "CM" (a CM section). In this case, the extended control adjusting unit 21 performs adjustment between extended controls to be executed in these two extended attribute sections in the following way. When an extended attribute section that is an unviewed section and an extended attribute section that is a CM section overlap with each other, the extended control adjusting unit 21 sets a priority level for extended control to be performed in the unviewed section and for extended control to be performed in the CM section. When the priority level set for the extended control "to play back the unviewed section" is higher than the priority level set for the extended control "to skip the CM section", the extended control "to skip the CM section" indicated by the arrow "cy1" is executed instead of the extended control "to play back the unviewed section", in the overlapping parts of these two extended attribute sections. On the other hand, for parts of the unviewed section that do not overlap with the CM section, the extended control to play back the unviewed section is executed as indicated by the arrows "cy2" and "cy3". The following describes how the priority level is set for each extended attribute section. In the present embodiment, the priority level for an extended attribute section specified by a section marker in VOB information is set higher than the priority level for an extended attribute section specified by a section marker in PGC information for the following reason. The extended attribute section specified by the section marker in PGC information is defined based on a user operation, and so its contents are often unique to the user. On the other hand, the extended attribute section specified by the section marker in VOB information often has universal values for all users. Such extended control having universal values for all users is given higher priority than extended control unique to one user, thereby realizing coordination of extended controls.

Such adjustment in overlapping parts of extended attribute sections by the extended control adjusting unit 21 becomes necessary when the extended controls in the overlapping extended attribute sections collide with each other. When the extended controls in the overlapping extended attribute sections can be executed in parallel, such adjustment by the extended control adjusting unit 21 is unnecessary. For example, when extended control to be executed in a CM section does not collide with extended control to be executed in the overlapping other extended attribute section, like when the contents of the extended control in the CM section is to display a URL over the CM section or to display thumbnail images of logos, the extended control in the CM section can be executed in parallel with the extended control in the other extended attribute section. By referring to category information of each section marker, the extended control adjusting unit 21 also judges whether extended controls can be executed in parallel or not (i.e., whether the adjustment is necessary or not).

Figure 19:
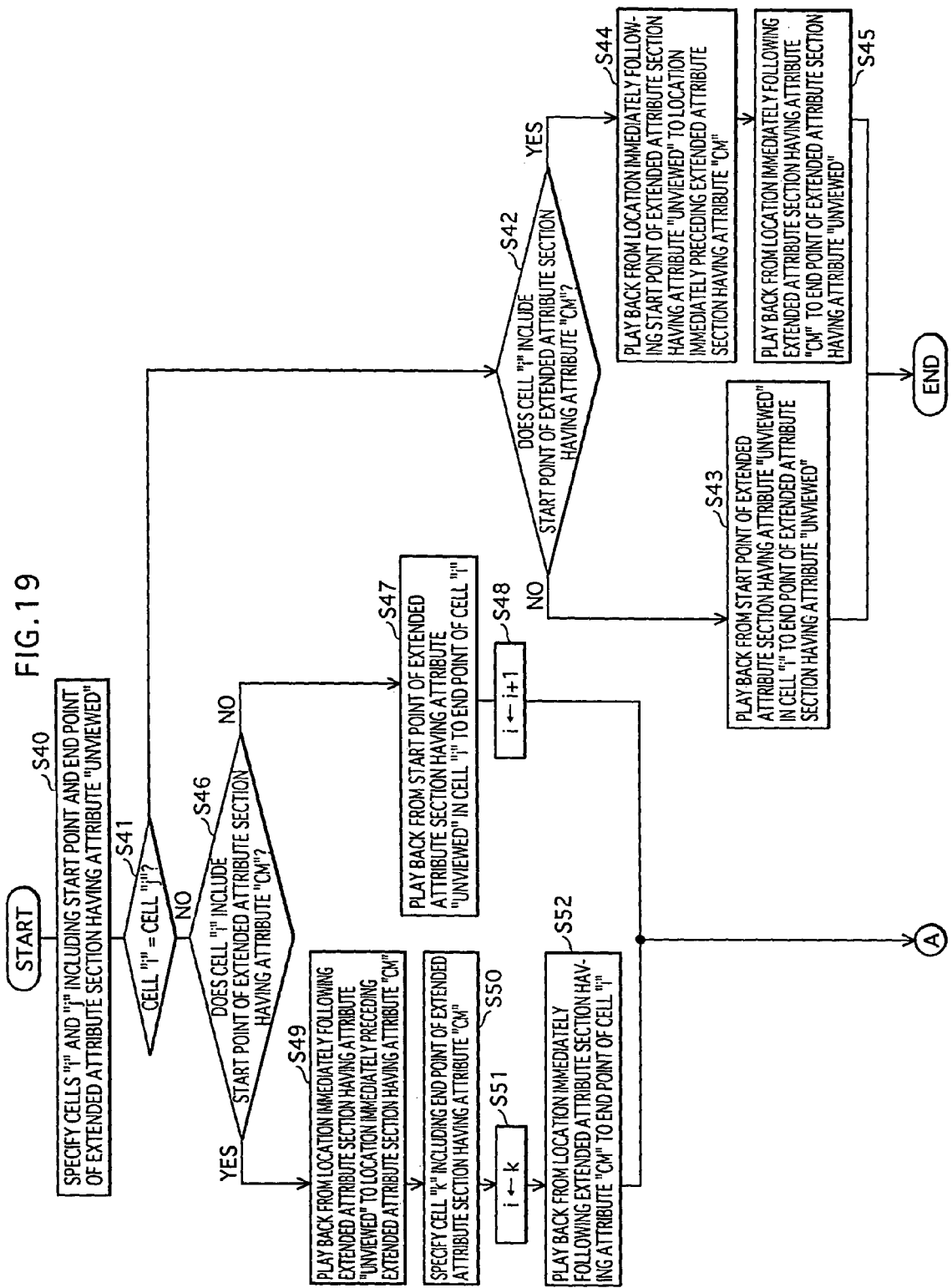
FIG. 19 is a flowchart showing an operational procedure of an extended control adjusting unit relating to a fourth embodiment of the present invention.
Figure 20:
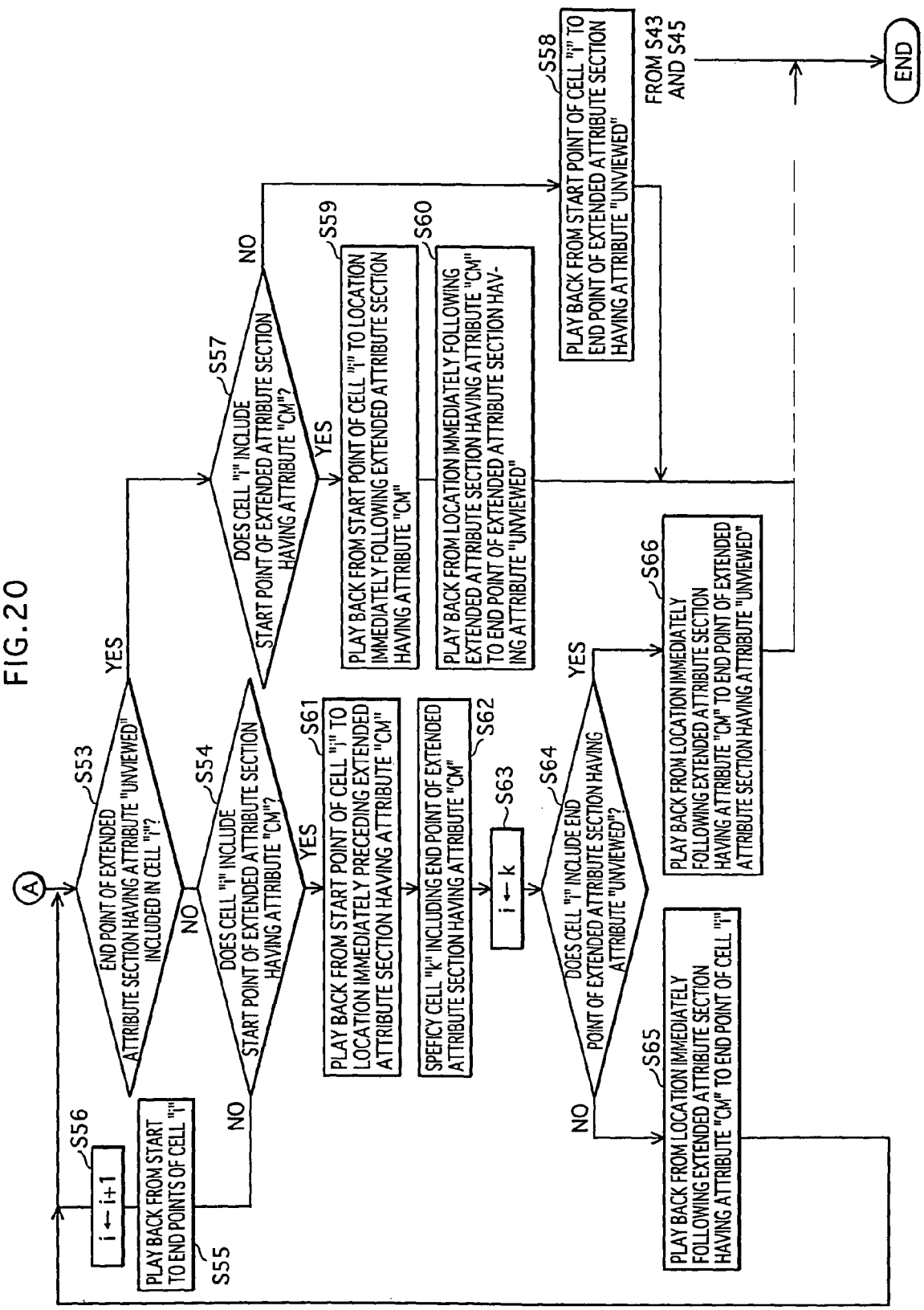
FIG. 20 is a flowchart showing an operational procedure of the extended control adjusting unit relating to the fourth embodiment.

The extended control adjusting unit 21 is composed of a program that realizes flowcharts shown in FIGS. 19 and 20, and a processor that decodes and executes the program. FIGS. 19 and 20 are the flowcharts showing an operational procedure of the extended control adjusting unit 21 relating the present embodiment. According to the flowcharts, it is a general rule to execute extended control to play back an unviewed section. However, when an unviewed section overlaps with a CM section, exceptional processing of skipping the CM section is performed. For ease of explanation, the following assumes that only a CM section and an unviewed section are detected and set as an extended attribute section.

In step S40, cell "i" including the start point of an extended attribute section having the attribute "unviewed" and cell "j" including the end point of the extended attribute section are identified. Then, the processing moves to step S41. In step S41, a judgment is performed as to whether the cell "i" and the cell "j" match or not. The cell "i" and the cell "j" matching means that the unviewed section is included in one cell.

When the cell "i" and the cell "j" match, the extended attribute section having the attribute "unviewed" is played back from its start point to end point in the cell "i" in step S43. Here, it should be remembered that this unviewed section may be overlapping with a CM section. Step S42 is provided for judging whether extended attribute sections overlap or not. When the start point of a CM section is included in the unviewed section, playback of the unviewed section is exceptionally stopped at the start point of the CM section, and is resumed at the end point of the CM section. To be more specific, playback is performed from the location immediately following the start point of the extended attribute section having the attribute "unviewed", to the location immediately preceding the start point of the extended attribute section having the attribute "CM" in step S44. Then, in step S45, playback is performed from the location immediately following the end point of the extended attribute section having the attribute "CM" to the end point of the extended attribute section having the attribute "unviewed". When the playback control described above is completed, the processing in the flowchart ends.

On the other hand, when the cell "i" and the cell "j" do not match, playback is performed from the start point of the extended attribute section having the attribute "unviewed" within the cell "i" to the end point of the cell "i" in step S47. Then, in step S48, a cell that immediately follows the present cell in the sequence is set as the cell "i". It should be remembered here that these steps S47 and S48 also have exceptional processing to be performed when an unviewed section overlaps with a CM section. Step S46 is provided for judging whether such exception processing is to be performed or not. In step S46, a judgment is performed as to whether the cell "i" includes the start point of an extended attribute section having the attribute "CM". When the cell "i" includes the start point of the CM section, the exceptional processing is to be performed. This exceptional processing is mainly to play back parts of the cell "i" that precede and follow the CM section, and also is to skip playback of a part of the cell "i" that corresponds to the CM section.

To be more specific, after playback is performed from the location immediately following the start point of the unviewed section to the location immediately preceding the start point of the CM section in step S49, a cell including the end point of the CM section is identified in step S50. The cell including the end point of the CM section is to be identified here because the cell including the end point may not match the cell "i". Here, the cell including the endpoint of the CM section is set as the cell "k". In step S51, the cell set as the cell "k" is newly set as the cell "i". By setting the cell that has been set as the cell "k" newly as the cell "i" here, cells that exist between the cells "i" and "k" are skipped. Finally, in step S52, playback is performed from the location immediately following the end point of the CM section to the endpoint of the unviewed section, and the exceptional processing ends.

When the processing in steps S48 and S52 is completed, the processing moves to a loop process that is composed of steps S53 to S56 shown in FIG. 20. In this loop process, the variable "i" of the cell "i" serves as the control variable. A cell identified by the variable "i" (=cell "i") is played back in step S55. This loop process ends when a judgment result in step S53 becomes "Yes". In step S53, a judgment is performed as to whether the end point of an extended attribute section having the attribute "CM" is included in the cell "i" or not. When the judgment result in step S53 is "Yes", this loop process ends and the processing moves to step S57.

Step S54 is provided for switching from the normal processing to the exceptional processing when the start point of a CM section is included in the cell "i". When the exceptional processing is performed, the variable "i" is not incremented by one, but cells preceding a cell including the endpoint of the CM section are skipped. To be more specific, playback is performed from the start point of the cell "i" to the location immediately preceding the start point of the CM section in step S61. Then, in step S62, the cell "k" including the end point of the CM section is identified. In step S63, the cell that has been set as the cell "k" is newly set as the cell "i". There may be a case where the cell "i" includes the end point of the unviewed section when many cells are skipped. Step S64 is provided for judging whether the cell "i" is the cell including the end point of the unviewed section or not. To be more specific, a judgment is performed as to whether the cell "i" includes the end point of the extended attribute section having the attribute "unviewed" or not in step S64. The cell "i" being judged to include the end point means that the above loop process is to end. Therefore, without waiting until the judgment result in step S53 becomes "Yes", playback is performed from the location immediately following the end point of the CM section to the end point of the unviewed section in step S66, and then the processing ends.

When the cell "i" is judged not to include the end point, playback is performed from the location immediately following the end point of the CM section to the end point of the cell "i" in step S65, and then, the processing returns to the loop process that is composed of steps S53 to S56. By repeating this loop process, cells that do not include the end point of the CM section are played back one after another in the unviewed section.

When the loop process that is composed of steps S53 to S56 ends, the processing moves to step S57. Step S57 is provided for judging whether the cell including the end point of the unviewed section includes the start point of the extended attribute section having the attribute "CM" or not. When the cell including the end point of the unviewed section is judged not to include the start point of the CM section, playback is performed from the start point of the cell "i" to the end point of the unviewed section in step S58.

When the cell including the end point of the unviewed section is judged to include the start point of the CM section, playback is performed from the start point of the cell "i" to the location immediately following the end point of the CM section in step S59, and then, playback is performed from the location immediately following the end point of the CM section to the end point of the unviewed section in step S60.

According to the present embodiment as described above, extended control that satisfies viewing preference of each individual user and extended control that has universal values for a plurality of users can be combined favorably. Therefore, variations in playback control can be increased.

Fifth Embodiment

The present embodiment relates to improvements for responding to segmentation and elaboration of section markers. For playback paths, the reference used to recognize an attribute as an extended attribute greatly varies depending on considerations and commercial strategies of each maker of the recording apparatus 100. It is expected that further segmentation and elaboration occur to section markers specifying sections having such an extended attribute. The present embodiment discloses a DVD that can favorably manage such section markers that are segmented and elaborated.

Figure 21:
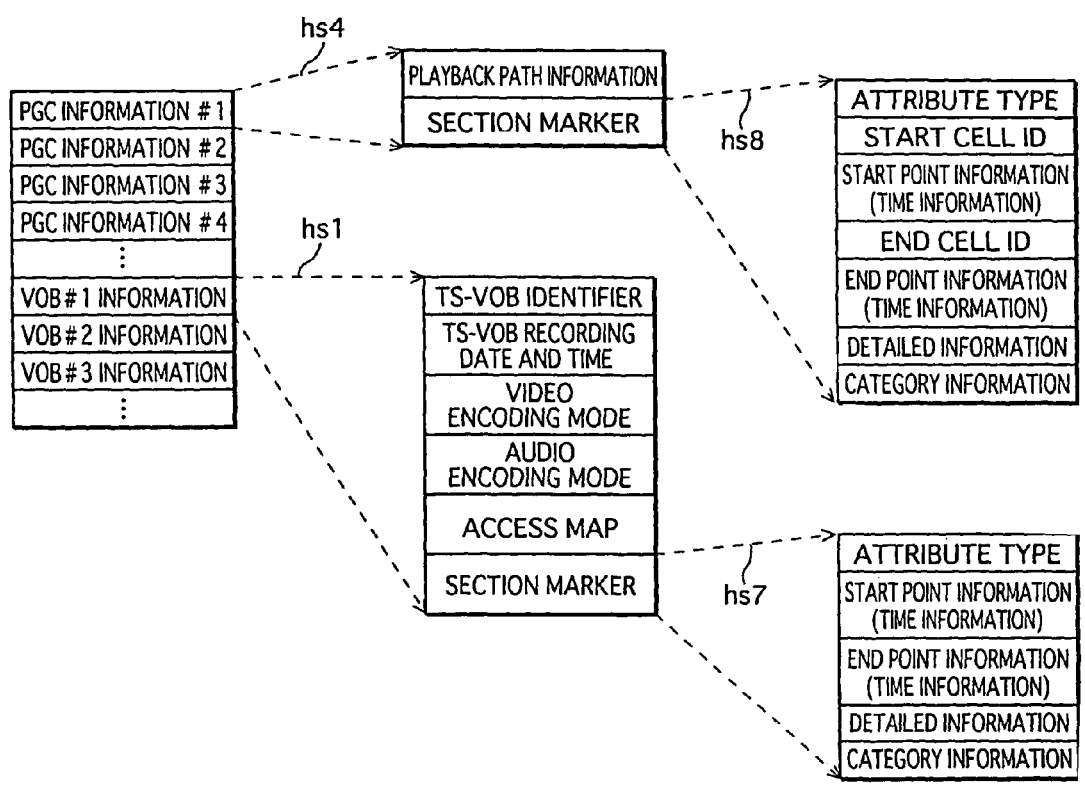
FIG. 21 shows an internal structure of PGC information and VOB information relating to the fourth embodiment.

FIG. 21 shows an internal structure of PGC information and VOB information relating to the present embodiment. Section markers in the figure differ from the section markers described in the first embodiment in that "category information" is additionally provided. The category information that is newly provided in the present embodiment indicates whether the section marker belongs to a category where the section marker is valid for a plurality of makers, or to a category where the section marker is valid only for one maker. FIG. 22 shows the contents of the category information. When the section marker belongs to a category where the section marker is valid for a plurality of makers, the category information shows a "code common to makers". When the section marker belongs to a category where the section marker is valid only for one maker, the category information shows a "code unique to a maker" and a "maker ID" for identifying the maker.

The section marker being valid for a plurality of makers means the following case. The reference used to recognize an extended attribute section corresponding to the section marker is agreed by the plurality of markers that participate in the disc standard. Also, it is agreed that recording apparatuses 100 manufactured by the makers that participate in the disc standard execute extended control common to the makers, in the extended attribute section specified by the section marker.

The section marker being valid only for one maker means the following case. The reference used to recognize an extended attribute section corresponding to the section marker is determined solely by one maker that participates in the disc standard. It is agreed that recording apparatuses 100 manufactured by other makers that participate in the disc standard are not required to execute extended control in the extended attribute section specified by the section marker. In the latter case, the maker of the recording apparatus 100 for which the section marker becomes valid needs to be identified, and therefore, the above-mentioned maker ID is provided in the category information.

At the time of playback, the recording apparatus 100 refers to the maker ID included in a section marker set in VOB information or in PGC information. When the section marker is valid only for one maker and the maker ID referred to matches the maker ID of the recording apparatus 100, the recording apparatus 100 executes extended control based on this section marker. When the section marker is valid only for one maker and the maker ID referred to does not match the maker ID of the recording apparatus 100, the recording apparatus 100 does not execute extended control based on this section marker.

Figure 23:
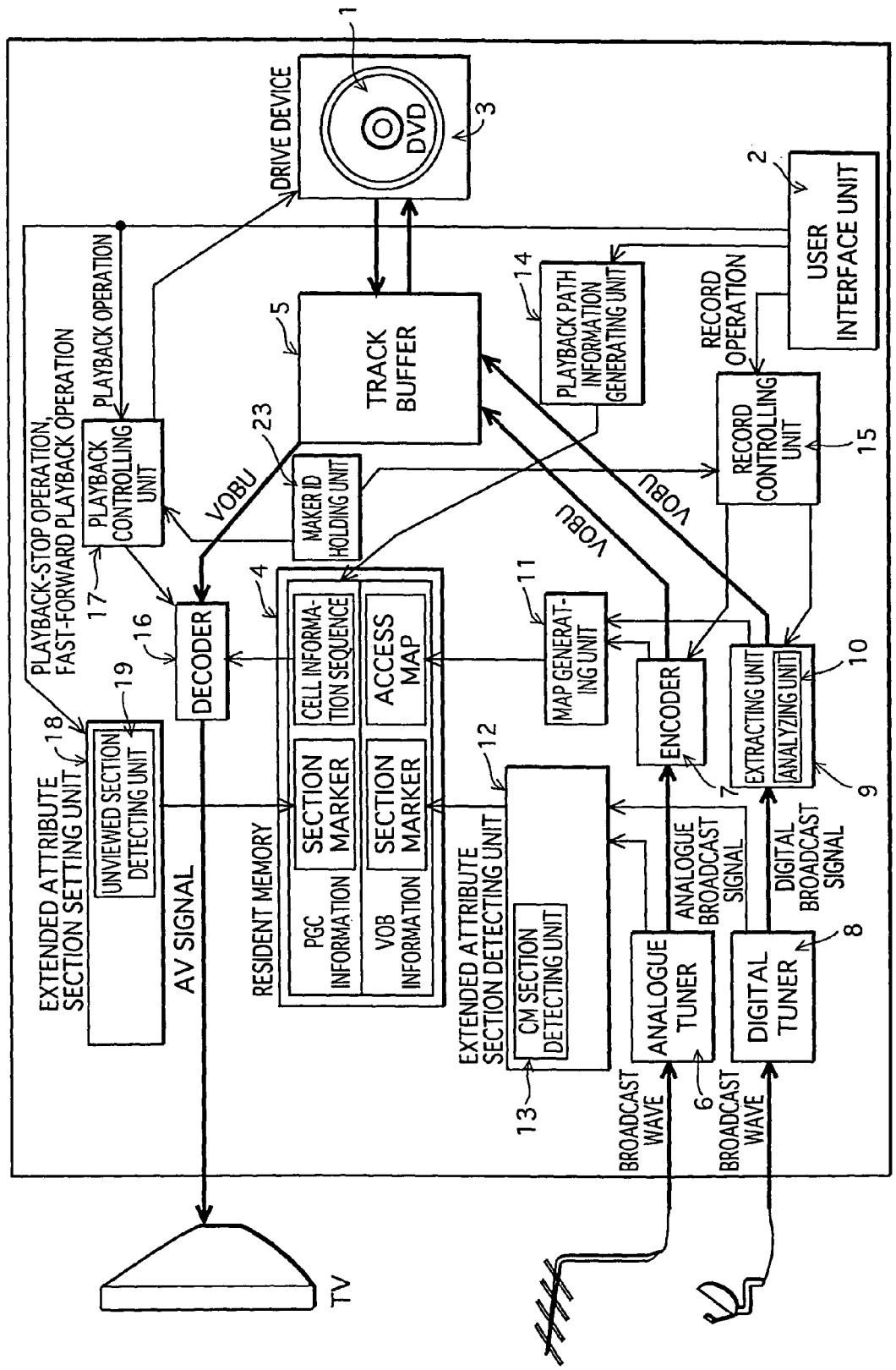
FIG. 23 shows an internal structure of a recording apparatus relating to a fifth embodiment of the present invention.

The following describes an internal structure of the recording apparatus 100 relating to the present embodiment. FIG. 23 shows the internal structure of the recording apparatus 100 relating to the present embodiment. The recording apparatus 100 relating to the present embodiment differs from the recording apparatus 100 relating to the above embodiments in that a maker ID holding unit 23 is additionally provided, and that the record controlling unit 15 and the playback controlling unit 17 perform processing unique to the present embodiment.

The maker ID holding unit 23 holds an identifier that is unique to the maker of the recording apparatus 100.

The record controlling unit 15 judges a type of an extended attribute of an extended attribute section specified by a section marker, when generating the section marker. The record controlling unit 15 then generates category information that shows the judgment result. To be more specific, the record controlling unit 15 judges whether the extended attribute section is valid for a plurality of makers or is valid only for one maker. When judging that the extended attribute section is valid only for one maker, the record controlling unit 15 sets the maker ID held by the maker ID holding unit 23 within the category information.

For executing extended control, the playback controlling unit 17 refers to the section marker that specifies the extended attribute section. When category information provided in the section marker shows that the section marker is valid for a plurality of makers, the playback controlling unit 17 executes the extended control unique to the extended attribute section specified by the section marker. When category information provided in the section marker shows that the section marker is valid only for one maker, the playback controlling unit 17 obtains a maker ID included in the section marker, and compares the obtained maker ID with the maker ID held by the maker ID holding unit 23. When the maker IDs match, the playback controlling unit 17 executes extended control in the extended attribute section specified by the section marker. When the maker IDs do not match, the playback controlling unit 17 does not execute the extended control.

According to the present embodiment as described above, for a section marker that is valid only for one maker, a maker ID of the maker is set in the section marker. By referring to a maker ID set in a section marker, therefore, the processing is enabled of ignoring section markers that are uniquely set by other makers at the time of playback. Due to this, an erroneous operation resulting from processing to be performed based on the reference uniquely set by other makers can be avoided.

Sixth Embodiment

The present embodiment relates to improvements on the case where recording data is performed for a long time period on a DVD whose one side has a recording capacity of 27 gigabytes or more. On such a large-capacity DVD, broadcast contents of 13 hours or more in the case of NTSC broadcasting can be recorded. With the advent of such a DVD, programs broadcasted on a certain channel in a half day or in one day may be recorded on one DVD in the form of one TS-VOB. Then, the multi-user compatible usage of such a DVD is expected, such that a large number of users including family members and friends enjoy viewing these programs by sharing the DVD. In such a case, however, each user is required to find programs that he or she wants to view by way of special play back such as fast-forward playback, out of the TS-VOB that corresponds to the programs broadcasted in a half day or in one day. This operation of finding the programs is still very troublesome for each user even considering the recent high speed processing for fast-forward playback of a DVD.

Figure 24:
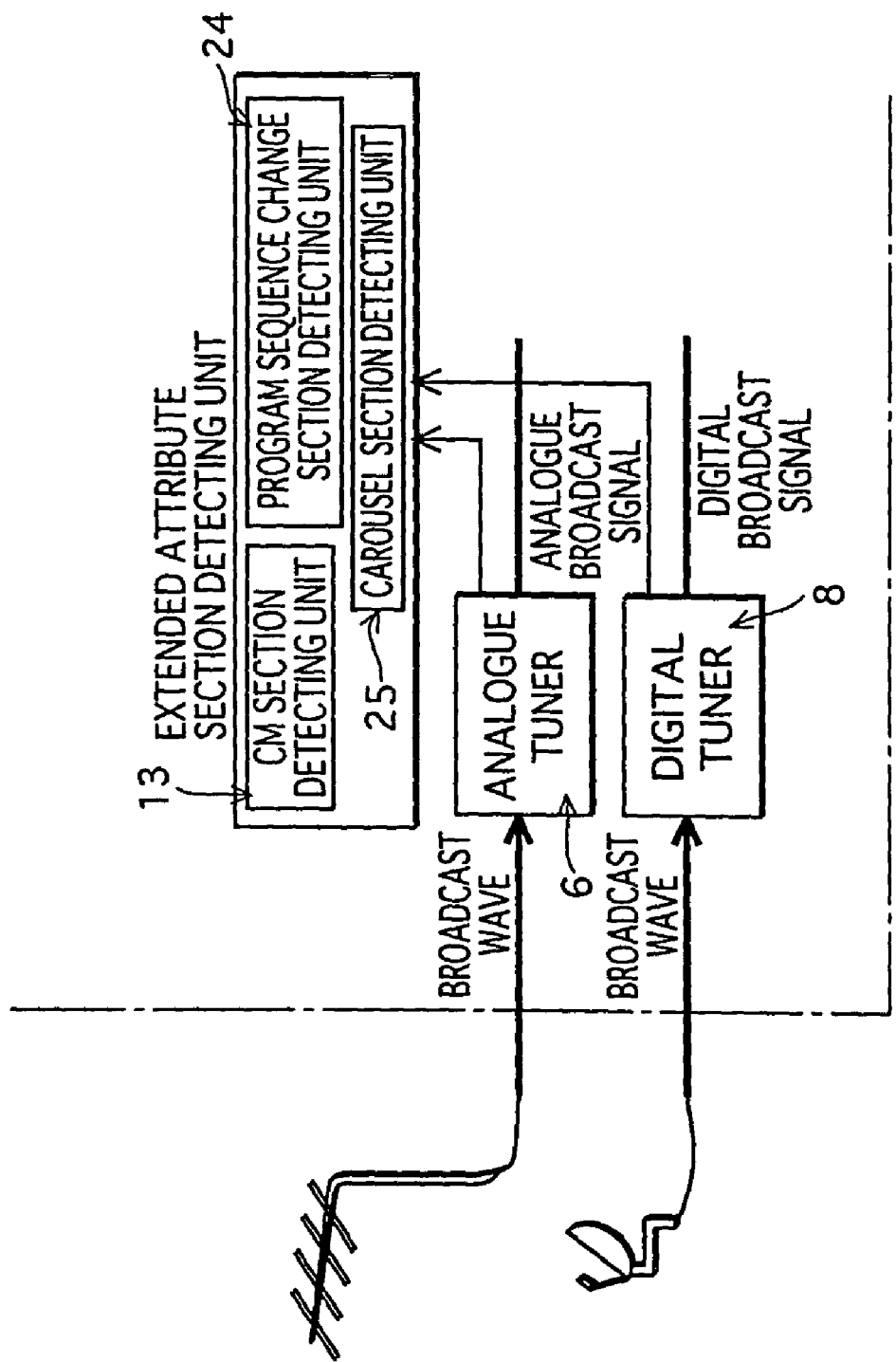
FIG. 24 shows an internal structure of an extended attribute section detecting unit relating to a sixth embodiment of the present invention.

In view of this, the extended attribute section detecting unit 12 relating to the present embodiment detects a part of a TS-VOB corresponding to one program as an extended attribute section, and generates a section marker specifying the detected extended attribute section within VOB information. FIG. 24 shows an internal structure of the extended attribute section detecting unit 12 relating to the sixth embodiment. As shown in the figure, the extended attribute section detecting unit 12 includes a program sequence change section detecting unit 24 and a carousel section detecting unit 25, in addition to the CM section detecting unit 13.

The program sequence change section detecting unit 24 detects a section, in a digital broadcast signal, in which program sequence information is changed to particular contents (such a section is referred to as a "program sequence change section"), as an extended attribute section. The detection of an extended attribute section by the program sequence change section detecting unit 24 is performed based on PSI (Program Specific Information: program sequence information defined by MPEG-2 standard) and SI (Service Information: program sequence information defined by ARIB-STD B-10). The PSI is information for defining a sequence of programs. Examples of PSI include PAT and PMT. The PMT is information for defining a stream structure of a broadcast program. To be more specific, the PMT indicates which video stream and audio stream constitute each broadcast program, among a plurality of streams multiplexed into a transport stream of multi-program type. FIG. 25A shows one example of PMT. In the figure, a broadcast program corresponding to the PMT#1 is composed of a video stream having PID=001 and an audio stream having PID=002. The PAT indicates which PMT to be referred to for obtaining each broadcast program transferred in the form of a transport stream of multi-program type. FIG. 25B shows one example of PAT. In the figure, the stream structure of the broadcast program #1 is defined by the PMT#1, and the stream structure of the broadcast program #2 is defined by the PMT#2. On a broadcast channel received via a tuner, IDs for these PMT and PAT are referred to, and IDs matching predetermined values, or IDs different from preceding IDs are detected. By doing so, a section corresponding to one broadcast program in the TS-VOB is recognized as an extended attribute section, a section marker specifying this extended attribute section is generated, and the generated section marker is set in PGC information. By specifying a section corresponding to one broadcast program in the TS-VOB as an extended attribute section, extended control to access the start of the broadcast program or to skip the broadcast program can be favorably executed.

The carousel section detecting unit 25 detects a section, in a digital broadcast signal, in which an interactive broadcast program is transmitted, as an extended attribute section. The detection of an extended attribute section by the carousel section detecting unit 25 is realized by detecting a section in which data is transmitted in the data carousel format. The data carousel is a broadcasting format in which the same contents are repeatedly transmitted for realizing interactive broadcasting. The same contents repeatedly broadcasted include BML documents written in BML (Broadcast Markup Language) and mono media data referred to by the BML documents. The data repeatedly transmitted in the data carousel format is divided into a plurality of parts, stored into blocks called "DDBs (Download Data Blocks)" and transmitted together with unique control information called "DII (Download Info Indication). The DII is transmitted prior to the DBB. Also, a data length of the DBB is written in the DII. Therefore, the carousel section detecting unit 25 recognizes an extended attribute section corresponding to a data carousel in a transport stream, based on the DII, generates a section marker specifying the extended attribute section, and sets the generated section marker within PGC information. By specifying a data block to be transmitted in the data carousel format as an extended attribute section, extended control to access the start of the data block or to skip the data block can be favorably executed.

According to the present embodiment as described above, the program sequence change section detecting unit 24 detects a change in program sequence information. When detecting a signal section having a particular program sequence attribute in a digital broadcast signal, the program sequence change section detecting unit 24 generates a section marker specifying an extended attribute section corresponding to this signal section in the TS-VOB. Due to this, in a TS-VOB having the time length of a half day or one day, the location of each program can be roughly expressed. Therefore, the location of each program stored in an AV file can be roughly identified. If the location of a program can be identified, accessing the start of the program next time can be favorably performed by generating a playback path including the section corresponding to the program. In this case, accessing the start of a program that each user wants to view does not take long time, and therefore, each user does not have to feel frustrated even when a plurality of users want to view the contents recorded on the DVD.

Although the present embodiment describes the case where the program sequence change section detecting unit 24 detects a location of a program by detecting a change in PSI and SI, the program sequence change section detecting unit 24 may regard a section of a pay program having a signal attribute of prohibiting playback, or a section having a signal attribute of limiting recording (only one copy etc.) in view of copyright protection, as an extended attribute section, and generate a section marker specifying the section.

Also, in the digital broadcast signal and analogue broadcast signal, a signal section including an EPG showing a particular genre, a cast, and a title may be regarded as an extended attribute section, and a section marker specifying the section may be generated within VOB information. At the time of playback, extended control to display such a genre, a cast, and a title may be executed in the extended attribute section.

Seventh Embodiment

The present embodiment discloses extended control to be executed in an extended attribute section, when a section in which program sequence information is changed or a section in which data is transmitted in the data carousel format is detected as the extended attribute section. In the present embodiment, improvements are given to the extended control executing unit 20 and the extended control adjusting unit 21. The following describes the extended control executing unit 20 and the extended control adjusting unit 21.

The extended control executing unit 20 executes extended control to perform a skip of playback to the start of an extended attribute section specified by a section marker, when the extended attribute section is a section in which program sequence information is changed (program sequence change section). There may be a case where program sequence information needs to be read in advance by the playback apparatus side. In this case, the extended control to perform a skip of playback to the start of the program sequence change section is executed, so as to ensure that the playback apparatus side reads such program sequence information in advance. When the extended attribute section is a section in which data is repeatedly transmitted in the data carousel format (carousel section), the extended control executing unit 20 executes extended control to play back only one of a plurality or pieces of data transmitted in the data carousel format. The description given so far is on the extended controls executed by the extended control executing unit 20. The following describes the extended control adjusting unit 21.

The extended control adjusting unit 21 performs an adjustment process to solve collision between extended controls to be executed in overlapping parts of extended attribute sections, when an extended attribute section that is a program sequence change section or a carousel section overlaps with an extended attribute section having the attribute "unviewed". The following describes extended control to be executed after the adjustment process is performed by the extended control adjusting unit 21.

Figure 26A:
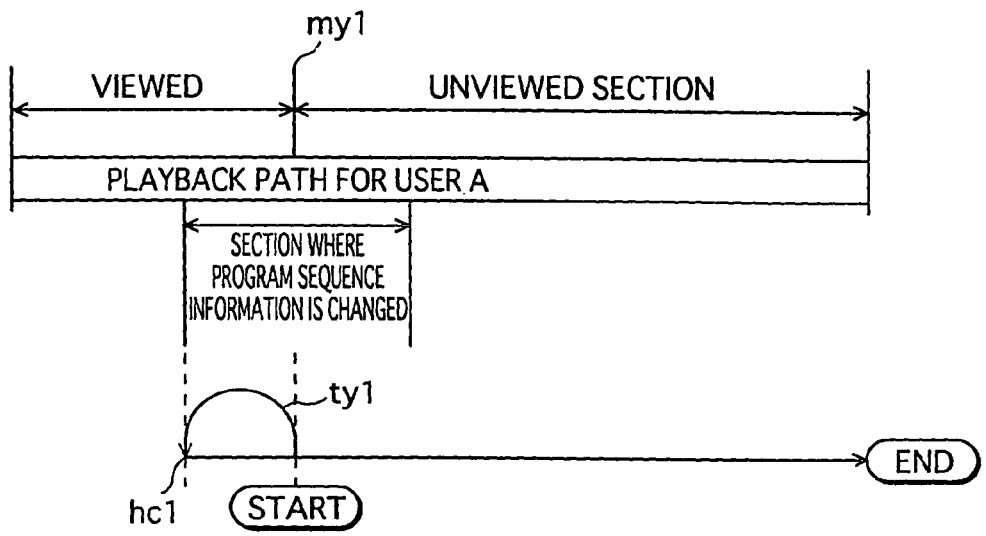
FIG. 26A shows a case where a section in which program sequence information is changed (a program sequence change section) and an unviewed section overlap with each other, and extended control unique to the unviewed section and extended control unique to the program sequence change section collide with each other.

FIG. 26A shows a case where a program sequence change section and an unviewed section overlap with each other, and extended control unique to the unviewed section and extended control unique to the program sequence change section collide with each other. In this case, the start point "my1" of the unviewed section is included in the program sequence change section. The extended control unique to the unviewed section is to perform playback from the start of the unviewed section, and so the playback is normally to be performed from the start of the unviewed section. However, the start point "my1" of the unviewed section is included in the program sequence change section. This means that the unviewed section overlaps with the program sequence change section. Therefore, the extended control unique to the unviewed section and the extended control unique to the program sequence change section collide with each other. Here, when the priority level set for the extended control unique to the unviewed section is higher than the priority level set for the extended control unique to the program sequence change section, the extended control unique to the program sequence change section is exceptionally executed instead of the extended control unique to the unviewed section. As indicated by the arrow "ty1" in FIG. 26A, the playback point is reversed to the start point of the program sequence change section, and playback is performed from the start point "hc1" of the program sequence change section.

Figure 26B:
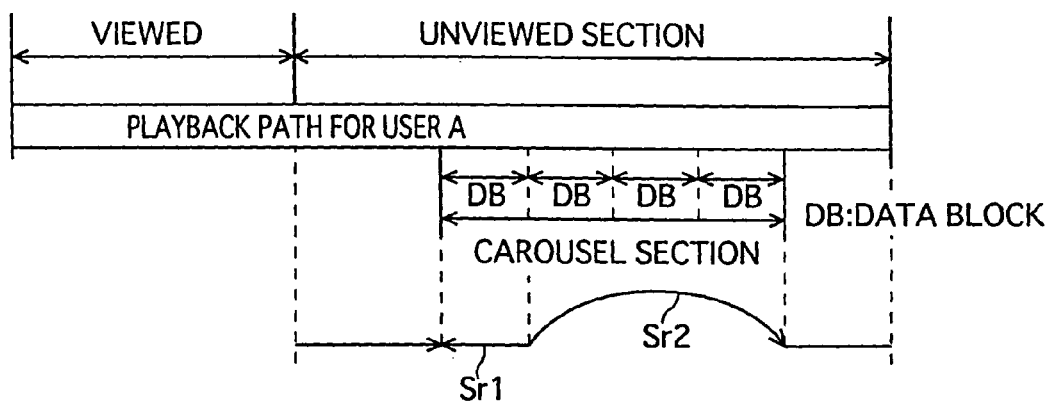
FIG. 26B shows a case where a section in which data is transmitted in the data carousel format (a carousel section) and an unviewed section overlap with each other, and extended control unique to the unviewed section and extended control unique to the carousel section collide with each other.

FIG. 26B shows a case where a carousel section and an unviewed section overlap with each other, and extended control unique to the unviewed section and extended control unique to the carousel section collide with each other. The extended control unique to the unviewed section is to perform playback from the start of the unviewed section. If this extended control is executed, the entire carousel section included in this unviewed section is played back. On the other hand, the extended control unique to the carousel section is to play back one of a plurality of data blocks. Therefore, the extended controls unique to these two sections collide with each other. Here, when the priority level set for the extended control unique to the carousel section is higher than the priority level set for the extended control unique to the unviewed section, the extended control unique to the carousel section is exceptionally executed in the overlapping parts of the two sections, instead of the extended control unique to the unviewed section. As indicated by the arrow "sr1", one of a plurality of data blocks is played back without the entire part of the unviewed section being played back, and the remaining data blocks are skipped as indicated by the arrow "sr2".

According to the present embodiment as described above, when an unviewed section set for a playback path for each user overlaps with a carousel section or with a program sequence change section, executed control based on the carousel section or on the program sequence change section is exceptionally executed. Therefore, processing based on control information transmitted by digital broadcasting can be executed faithfully.

Eighth Embodiment

Figure 27:
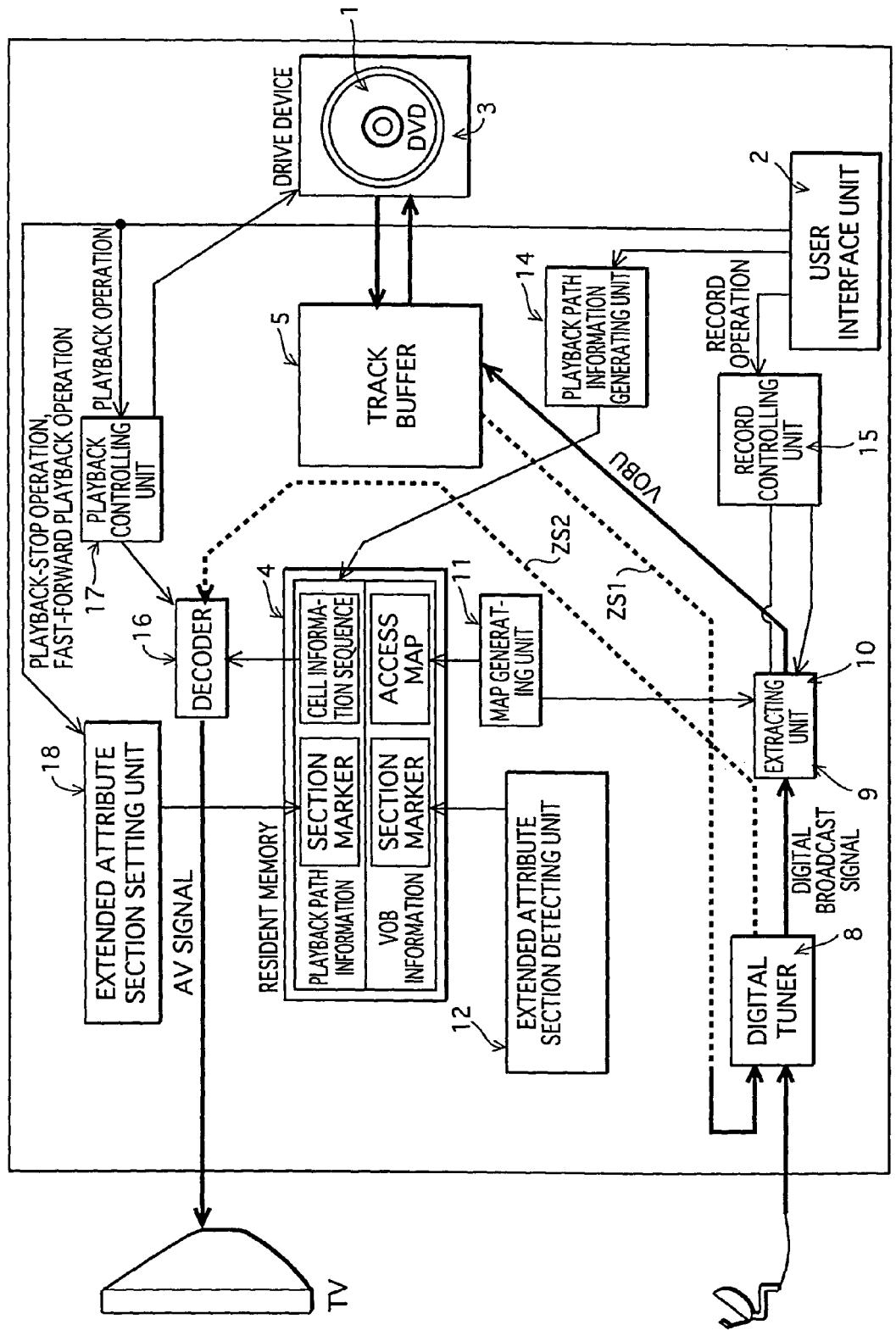
FIG. 27 shows an internal structure of a recording apparatus relating to an eighth embodiment of the present invention.

In the second embodiment, a digital broadcast signal that is obtained by modulating a broadcast wave and selecting a channel, i.e., a digital broadcast signal corresponding to a single program, is converted into a TS-VOB. The present embodiment relates to improvements on the case where a digital broadcast signal that is obtained by modulating a broadcast wave but without selecting a channel, i.e., a digital broadcast signal corresponding to a plurality of programs, is converted into a TS-VOB. Such a TS-VOB corresponding to a plurality of programs is referred to as a "multi-program TS-VOB", and the recording apparatus 100 relating to the present embodiment has such a structure that can realize record and playback of this multi-program TS-VOB. FIG. 27 shows an internal structure of the recording apparatus 100 relating to the present embodiment. In the figure, some of the components of the recording apparatus 100 are not shown. Instead, paths of the multi-program TS-VOB are expressed using the arrows "ZS1" and "ZS2" with broken lines. As indicated by the arrow "ZS1", the multi-program TS-VOB read from the DVD 1 to the track buffer 5 is outputted to the digital tuner 8, and then as indicated by the arrow "ZS2", outputted from the digital tuner 8 to the record controlling unit 15. To realize transfer of the multi-program TS-VOB on such paths, unique improvements are given to the map generating unit 11, the playback controlling unit 17, and the extended attribute section detecting unit 12 relating to the present embodiment.

The map generating unit 11 generates an access map without analyzing a TS header and an application field of a TS packet. To be more specific, the map generating unit 11 reads an ATS attached to a TS packet outputted from the digital tuner 8 to the extracting unit 9 at every predetermined time interval, and generates entry information that associates the ATS and the time interval. By repeatedly generating such entry information, the map generating unit 11 generates an access map.

The playback controlling unit 17 reads a multi-program TS-VOB recorded on the DVD, and outputs the read multi-program TS-VOB to the digital tuner 8 as indicated by the arrow "ZS1". When the digital tuner 8 selects a channel, and outputs a digital broadcast signal corresponding to a single program, the digital broadcast signal corresponding to the single program is outputted to the decoder 16 as indicated by the arrow "zs2". The single program being outputted to the decoder 16 results in the broadcast program whose channel has been selected by the digital tuner 8 being outputted and displayed.

Figure 28:
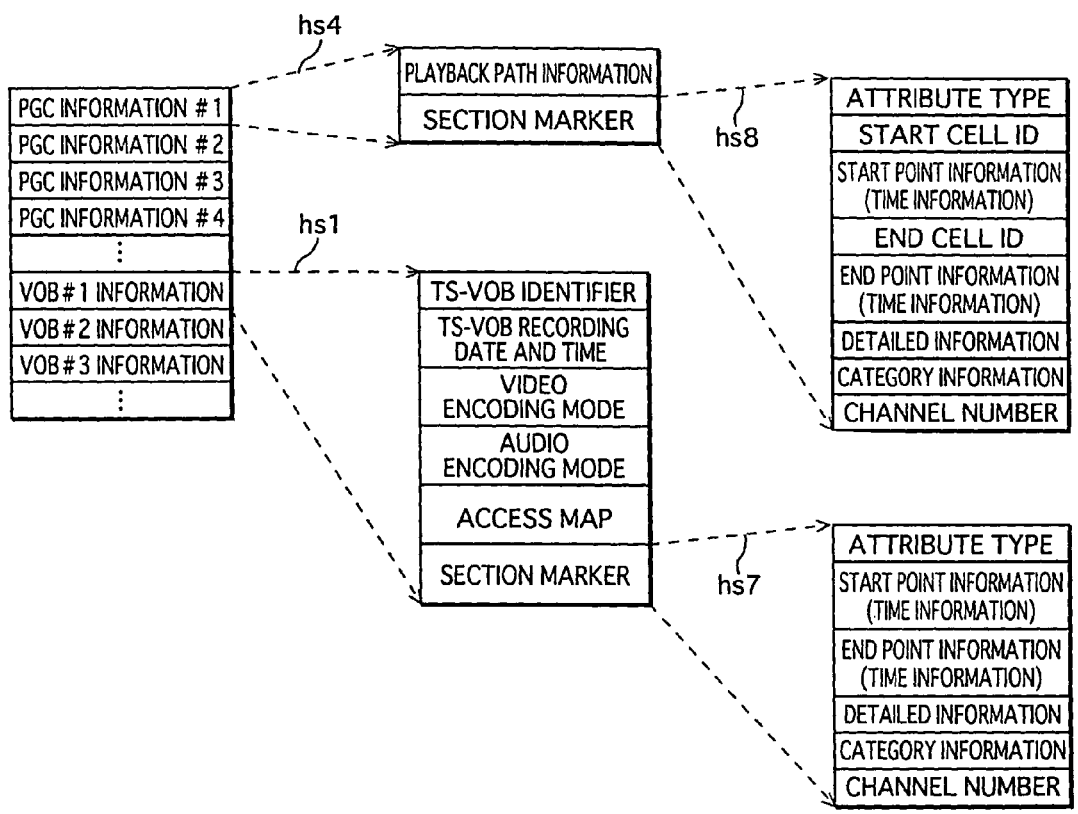
FIG. 28 shows a section marker in which a channel number is set by the extended attribute section detecting unit.

When a user operation to select a channel is given to the digital tuner 8, the extended attribute section detecting unit 12 obtains information showing the channel selected by the user, from the digital tuner 8. When a multi-program TS-VOB is outputted and displayed on the TV, and then, a user operation to stop playback is given, a section marker specifying the location of an extended attribute section that is an unviewed section is generated in the same manner as described in the second embodiment, and then, the channel number obtained from the user interface unit 2 is set in the section marker. As described above, a TS header and an application field of a TS packet are not analyzed when a multi-program TS-VOB is written or read. This means that the start and end points of an extended attribute section cannot be expressed using a PTS. Therefore, the extended attribute section detecting unit 12 expresses the start and end points of an extended attribute section each using an ATS instead of using a PTS. In this case, it is preferable to express each of the start and end points of an extended attribute section using, out of ATSs attached to a plurality of TS packets, an ATS that is the closest to the case using a PTS. One example of such an ATS is an ATS attached to a TS packet outputted to the decoder 16 at the time when a user operation to play back is given. FIG. 28 shows a section marker in which a channel number is set by the extended attribute section detecting unit 12.

With the processing described above, a section marker including a channel number is generated. With the processing of outputting the channel number included in the section marker to the digital tuner 8 at the time of next playback, the user is not required to perform an operation to select a channel to the digital tuner 8 at the time of next playback.

Ninth Embodiment

Figure 29:
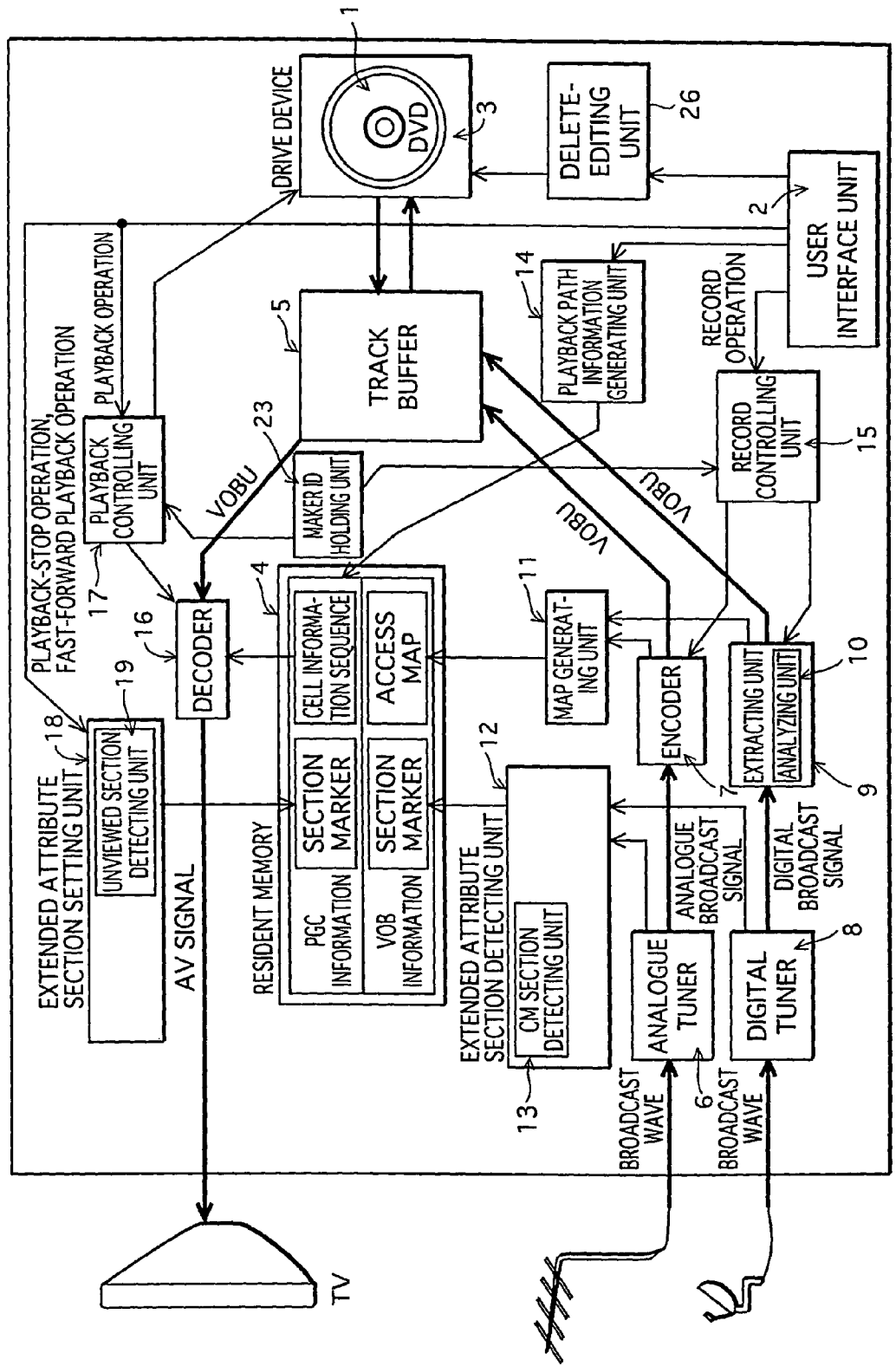
FIG. 29 shows an internal structure of a recording apparatus relating to a tenth embodiment of the present invention.

The present embodiment relates to editing involving deletion of an extended attribute section specified by a section marker set in PGC information. FIG. 29 shows an internal structure of the recording apparatus relating to the present embodiment. As shown in the figure, attentions are to be paid to a delete-editing unit 26 that is additionally provided as a component of the recording apparatus relating to the present embodiment. The delete-editing unit 26 performs a deletion process of deleting a part of an extended attribute section, a cell, and a VOB. The deletion process performed by the delete-editing unit 26 is realized by updating a section marker, cell information, and VOB information. The delete-editing unit 26 performs processing of updating cell information, a section marker, and VOB information along with the deletion process. As described in the first embodiment, an extended attribute section specified by a section marker set in PGC information is expressed by "indirect referencing to indirect referencing". An extended attribute section may be partially or entirely deleted not only when a cell or a TS-VOB referred to by the extended attribute section is edited, but also when a cell or a TS-VOB is not changed. Further, with expressing a range of an extended attribute section where extended control is valid not by a point but by a section having a temporal width, partial or entire deletion of an extended attribute section performed by the delete-editing unit 26 may be in the following cases 1 to 10.

<Case 1>

Figure 30A:
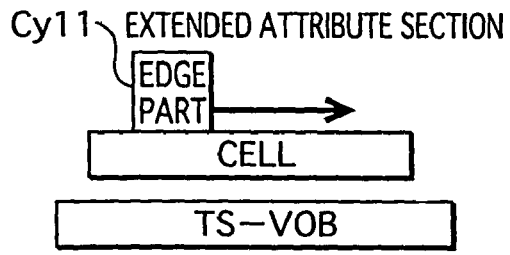
FIGS. 30A and 30B show the states of the TS-VOB, cell, and extended attribute section before and after partial deletion is performed in case 1.
Figure 30B:
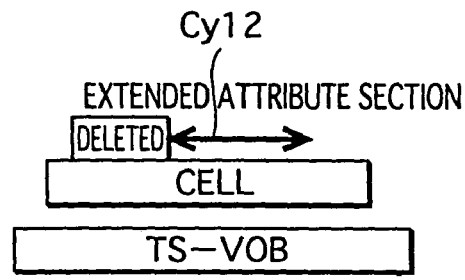

The case 1 is where an extended attribute section is entirely included in one cell and an edge part of the extended attribute section is deleted. In the case 1, the start point information and the endpoint information in the section marker are updated in such a manner that the start point and the end point of the extended attribute section are respectively the locations immediately preceding and following the edge part to be deleted. FIGS. 30A and 30B show the states of the TS-VOB, cell, and extended attribute section before and after the part is deleted in the case 1. FIG. 30A shows the state before the part is deleted, and FIG. 30B shows the state after the part is deleted. Also, in the figure, the top of the arrow pointing to left "←" symbolically indicates the start point of the extended attribute section, and the top of the arrow pointing to right "→" symbolically indicates the end point of the extended attribute section. In FIG. 30A, when the edge part "cy11" of the extended attribute section is to be deleted, the start point information is updated by the delete-editing unit 26 in such a manner that the start point of the extended attribute section is the location immediately following the deleted part as indicated by the arrow "cy12" in FIG. 30B.

<Case 2>

The case 2 is where an extended attribute section is entirely included in one cell and a middle part of the extended attribute section is deleted. In the case 2, the extended attribute section is divided. This division is realized by the following two processes performed by the delete-editing unit 26. The first process is to shorten the extended attribute section so as to fit into a part preceding the middle part. To realize this process, the end point information in the section marker is updated by the delete-editing unit 26 in such a manner that the end point of the extended attribute section is the location immediately preceding the middle part. The second process is to generate a new section marker that specifies a part following the middle part as one extended attribute section. The start point information of the newly generated section marker shows the start point as being the location immediately following the middle part. The end point information of the newly generated section marker shows the end point as being the end point of the original extended attribute section from which the middle part is yet to be deleted.

Figure 30C:
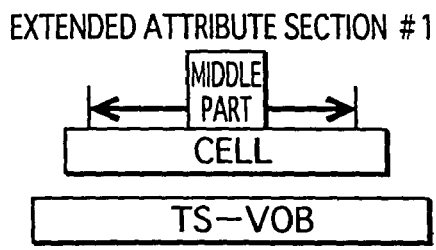
FIGS. 30C and 30D show the states of the TS-VOB, cell, and extended attribute section before and after partial deletion is performed in case 2.
Figure 30D:
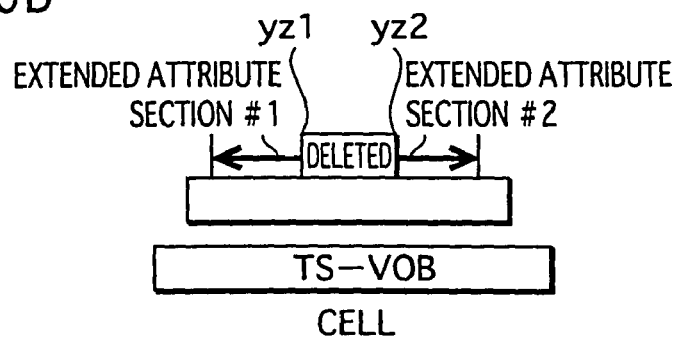

FIGS. 30C and 30D show the states of the TS-VOB, cell, and extended attribute section before and after the part is deleted in the case 2. In FIG. 30C, when the middle part of the extended attribute section #1 is to be deleted, the extended attribute section #1 in FIG. 30C is divided into two extended attribute sections, namely, the extended attribute section #1 and the extended attribute section #2, by the delete-editing unit 26. The start point information and the end point information in the section marker are updated by the delete-editing unit 26 in such a manner that the end point of the extended attribute section #1 is the location "yz1" immediately preceding the deleted part, and the start point of the extended attribute section #2 is the location "yz2" immediately following the deleted part.

<Case 3>

The case 3 is where an extended attribute section exists so as to cross over a boundary of two or more cells and an edge part of the extended attribute section is deleted. The processing to be performed in the case 3 is basically the same as the processing described in the case 1. In the case 3, however, the start point and the end point of an extended attribute section from which the edge part is deleted may belong to cells different from the cells including the start point and the end point of the original extended attribute section from which the edge part is yet to be deleted. In the case 3, therefore, the delete-editing unit 26 updates a start cell ID and an end cell ID of the section marker in such a manner that the "cell including the start point of the extended attribute section", and the "cell including the end point of the extended attribute section" are changed.

Figure 31A:
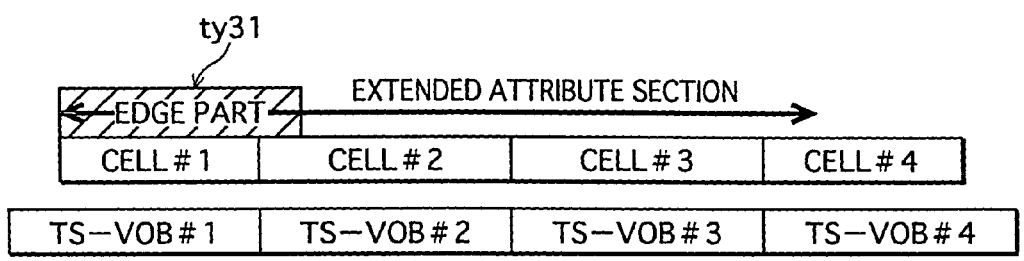
FIGS. 31A and 31B show the states of the TS-VOB, cell, and extended attribute section before and after partial deletion is performed in case 3.
Figure 31B:
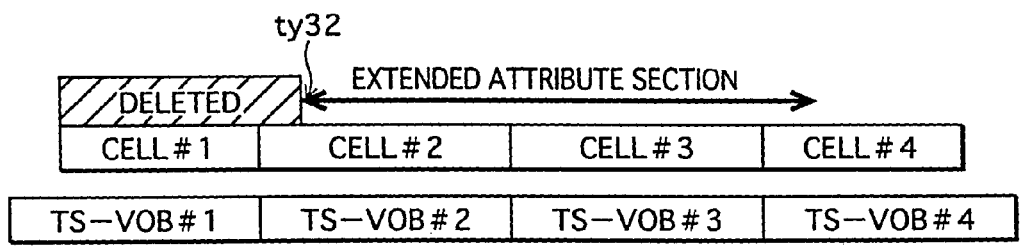

FIGS. 31A and 31B show the states of the TS-VOB, cell, and extended attribute section before and after the part is deleted in the case 3. FIG. 31A shows the state before the part is deleted, and FIG. 31B shows the state after the part is deleted. In FIG. 31A, when the edge part "ty31" of the extended attribute section is to be deleted, the start point information of the section marker is updated by the delete-editing unit 26 in such a manner that the start point of the extended attribute section is the location "ty32" immediately following the edge part as shown in FIG. 31B.

<Case 4>

The case 4 is where an extended attribute section exists so as to cross over a boundary of two or more cells and a middle part of the extended attribute section is deleted. The processing to be performed in the case 4 is basically the same as the processing described in the case 2. In the case 4, however, the endpoint of an extended attribute section from which the middle part is deleted and the start point of an extended attribute section newly obtained by deleting the middle part may belong to different cells. In the case 4, therefore, the delete-editing unit 26 updates an end cell ID of the section marker specifying the original extended attribute section from which the middle part is yet to be deleted, in such a manner that the "cell including the end point of the extended attribute section" is changed to a cell that immediately precedes the middle part.

Figure 32A:
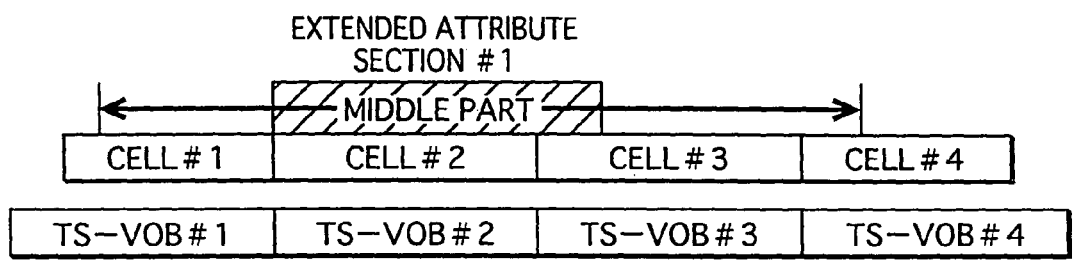
FIGS. 32A and 32B show the states of the TS-VOB, cell, and extended attribute section before and after partial deletion is performed in case 4.
Figure 32B:
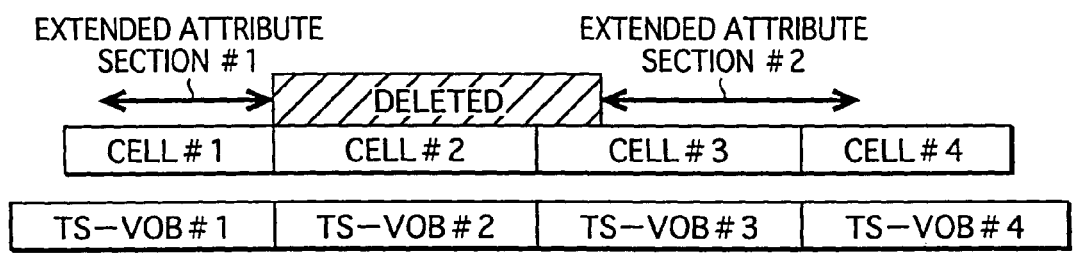

Also, the delete-editing unit 26 sets a start cell ID of a section marker specifying the extended attribute section to be newly obtained, in such a manner that the "cell including the start point of the extended attribute section" is changed to a cell that immediately follows the middle part. Then, the delete-editing unit 26 sets an end cell ID of the section marker specifying the extended attribute section to be newly obtained, in such a manner that the "cell including the end point of the extended attribute section" is changed to a cell that includes the end point of the original extended attribute section from which the middle part is yet to be deleted. FIGS. 32A and 32B show the states of the TS-VOB, cell, and extended attribute section before and after the part is deleted in the case 4. In FIG. 32A, when the middle part of the extended attribute section is to be deleted, the extended attribute section #1 in FIG. 32A is divided into two extended attribute sections #1 and #2 by the delete-editing unit 26 as shown in FIG. 32B. The end point information and the start point information in the section marker are updated by the delete-editing unit 26 in such a manner that the end point of the extended attribute section #1 is the location immediately preceding the deleted part, and the start point of the extended attribute section #2 is the location immediately following the deleted part.

The description given so far is on partial deletion of an extended attribute section itself. The following describes partial deletion of an extended attribute section along with editing performed on a playback path.

<Case 5>

Figure 33A:
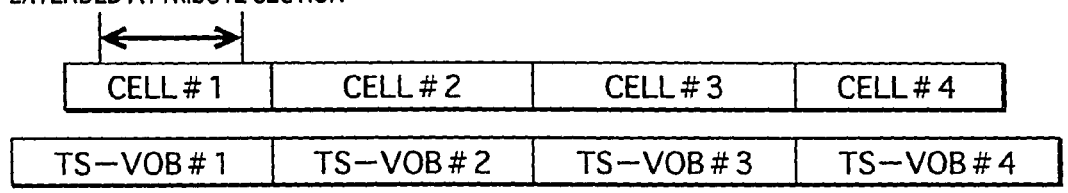
FIGS. 33A and 33B show the states of the TS-VOB, cell, and extended attribute section before and after partial deletion is performed in case 5-1.
Figure 33B:
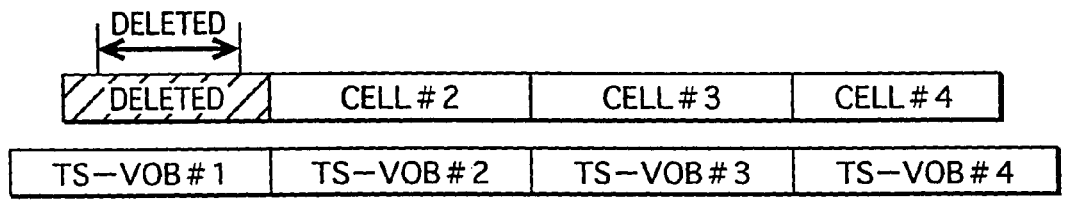

The case 5 is where one of cells that constitute a playback path is entirely deleted. When the cell to be deleted includes the entire part of an extended attribute section (case 5-1), the extended attribute section is entirely deleted. FIGS. 33A and 33B show the states of the TS-VOB, cell, and extended attribute section before and after the part is deleted in the case 5-1. FIG. 33A shows the state before the part is deleted, and FIG. 33B shows the state after the part is deleted. As shown in FIG. 33A, when one of cell#1 to cell#4 is to be deleted, an extended attribute section that is entirely included in the cell is also deleted by the delete-editing unit 26 as shown in FIG. 33B.

Figure 34A:
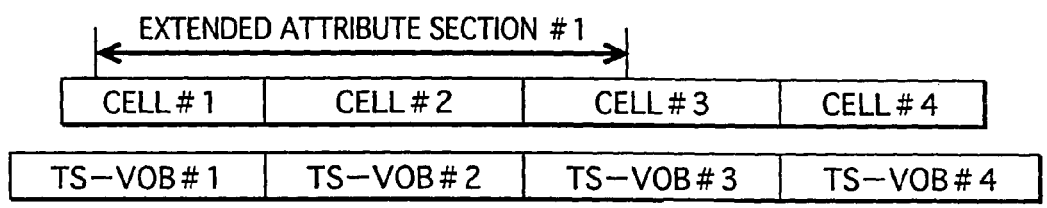
FIGS. 34A and 34B show the states of the TS-VOB, cell, and extended attribute section before and after partial deletion is performed in case 5-2.
Figure 34B:
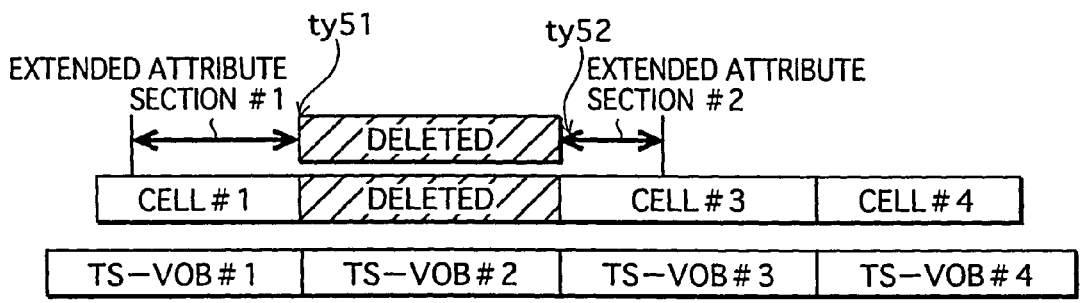

On the other hand, when the extended attribute section includes the entire part of the cell to be deleted (case 5-2), the cell to be deleted is considered to be a middle part of the extended attribute section to be deleted. Therefore, the delete-editing unit 26 performs the processing described in the case 4. To be more specific, the delete-editing unit 26 shortens the extended attribute section so as to fit into a part immediately preceding the cell to be deleted, and sets a part following the cell to be deleted as a new extended attribute section. In this case, one or more cells corresponding to the middle part of the extended attribute section are deleted. Therefore, the delete-editing unit 26 updates an end cell ID of the section marker in such a manner that the "cell including the endpoint of the extended attribute section" is changed to a preceding cell. FIGS. 34A and 34B show the states of the TS-VOB, cell, and extended attribute section before and after the part is deleted in the case 5-2. FIG. 34A shows the state before the part is deleted, and FIG. 34B shows the state after the part is deleted. As shown in FIG. 34A, when the cell#2, out of the cell#1 to cell#4, is to be deleted, a middle part of an extended attribute section corresponding to this cell is to be deleted. The extended attribute section #1 in FIG. 34A is divided into two extended attribute sections #1 and #2 shown in FIG. 34B. The endpoint information and the start point information of the section marker are updated by the delete-editing unit 26 in such a manner that the end point of the extended attribute section #1 is the location immediately preceding the middle part shown by the arrow "ty51", and the start point of the extended attribute section #2 is the location immediately following the middle part shown by the arrow "ty52".

Figure 35A:
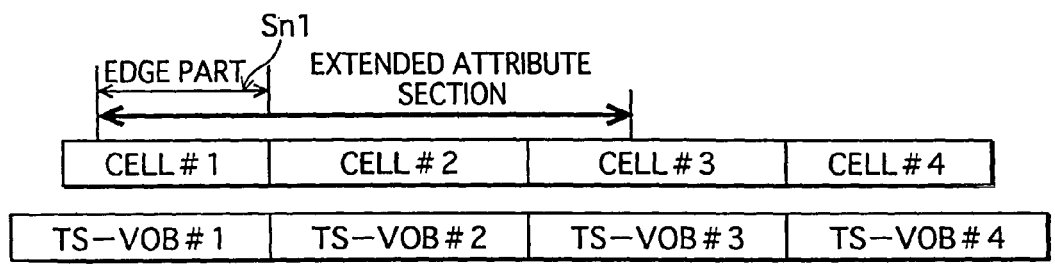
FIGS. 35A and 35B show the states of the TS-VOB, cell, and extended attribute section before and after partial deletion is performed in case 5-3.
Figure 35B:
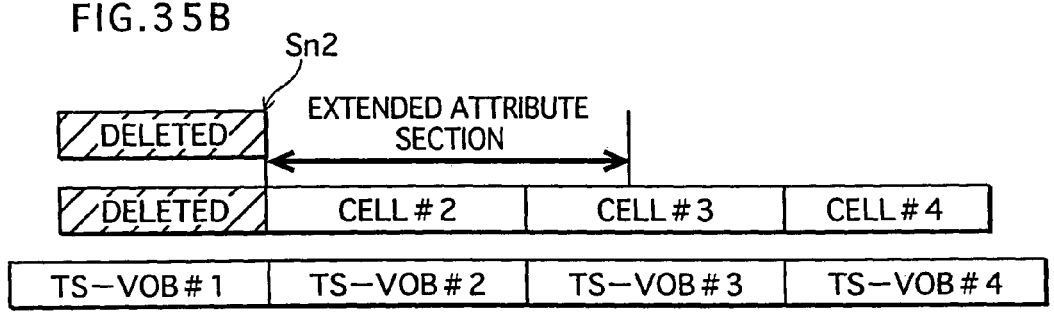

When the cell to be deleted includes the start point and the end point of the extended attribute section (case 5-3), the delete-editing unit 26 updates a start cell ID and an end cell ID of the section marker in such a manner that the "cell including the start point of the extended attribute section" and the "cell including the end point of the extended attribute section" are respectively the locations immediately preceding and immediately following the cell to be deleted. Then, the delete-editing unit 26 updates the end point information of the section marker so as to specify a piece of picture data that is located to immediately precede the cell to be deleted, as the end point of the extended attribute section, and updates the start point information of the section marker so as to specify a piece of picture data that is located to immediately follow the cell to be deleted, as the start point of the extended attribute section. FIGS. 35A and 35B show the states of the TS-VOB, cell, and extended attribute section before and after the part is deleted in the case 5-3. FIG. 35A shows the state before the part is deleted, and FIG. 35B shows the state after the part is deleted. In FIG. 35A, deleting the cell#1, out of the cell#1 to cell#4, is equivalent to deleting the edge part "sn1" of the extended attribute section that overlaps with the cell#1. As shown in FIG. 35B, the start point of the extended attribute section is the location immediately preceding the edge part "sn1". Therefore, the start point information is updated by the delete-editing unit 26, in such a manner that the start point of the preceding extended attribute section is the location immediately following the deleted part as indicated by the arrow "sn2".

<Case 6>

Figure 36A:
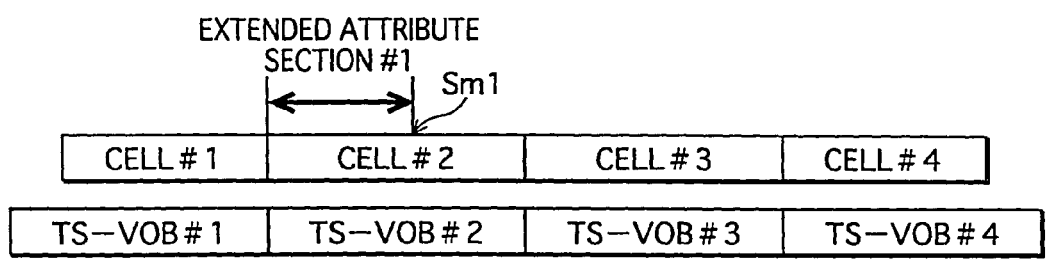
FIGS. 36A and 36B show the states of the TS-VOB, cell, and extended attribute section before and after partial deletion is performed in case 6-1.
Figure 36B:
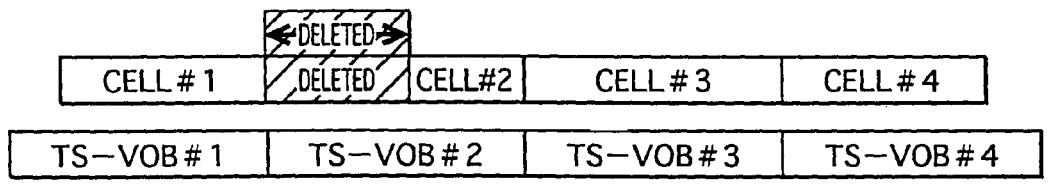

The case 6 is where an edge part of one of cells that constitute a playback path is deleted. In this case, the delete-editing unit 26 updates the start point information and the end point information of the cell information in such a manner that the start point and the end point of the cell are respectively the locations immediately preceding and following the edge part. When the edge part to be deleted includes the entire part of an extended attribute section (case 6-1), the extended attribute section is entirely deleted by the delete-editing unit 26. FIGS. 36A and 36B show the states of the TS-VOB, cell, and extended attribute section before and after the part is deleted in the case 6-1. FIG. 36A shows the state before the part is deleted, and FIG. 36B shows the state after the part is deleted. In FIG. 36A, when an edge part "sm1" of the cell#2, out of the cell#1 to cell#4, is to be deleted, the extended attribute section #1 that is entirely included in this edge part is also deleted by the delete-editing unit 26 as shown in FIG. 36B.

Figure 37A:
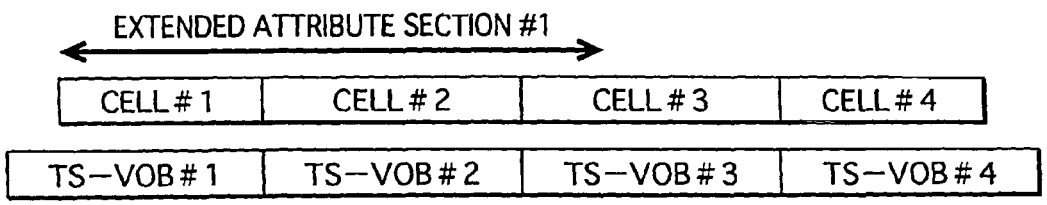
FIGS. 37A and 37B show the states of the TS-VOB, cell, and extended attribute section before and after partial deletion is performed in case 6-2.
Figure 37B:
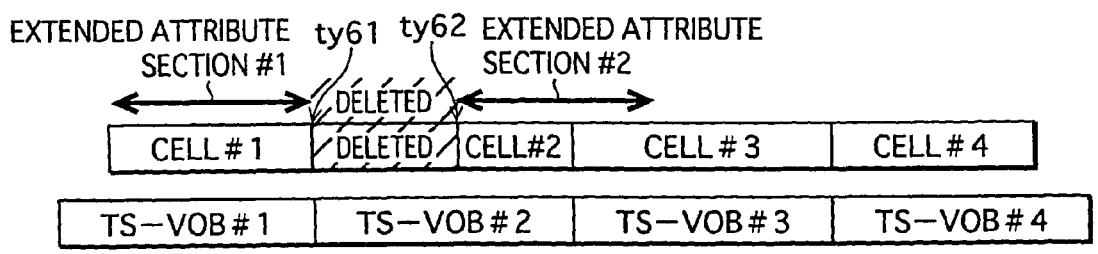

On the other hand, when the extended attribute section includes the entire edge part of the cell to be deleted (case 6-2), the delete-editing unit 26 performs the same updates as in the case 5-2, and sets a part preceding the edge part and a part following the edge part as separate extended attribute sections. FIGS. 37A and 37B show the states of the TS-VOB, cell, and extended attribute section before and after the part is deleted in the case 6-2. FIG. 37A shows the state before the part is deleted, and FIG. 37B shows the state after the part is deleted. As shown in FIG. 37A, when the edge part of the cell#2, out of the cell#1 to cell#4, is to be deleted, a middle part of an extended attribute section corresponding to this cell is to be deleted. The extended attribute section #1 is divided into two extended attribute sections #1 and #2 shown in FIG. 37B. The end point information and the start point information are updated by the delete-editing unit 26 in such a manner that the end point of the extended attribute section #1 is the location immediately preceding the middle part as indicated by the arrow "ty61", and the start point of the extended attribute section #2 is the location immediately following the middle part as indicated by the arrow "ty62".

Figure 38A:
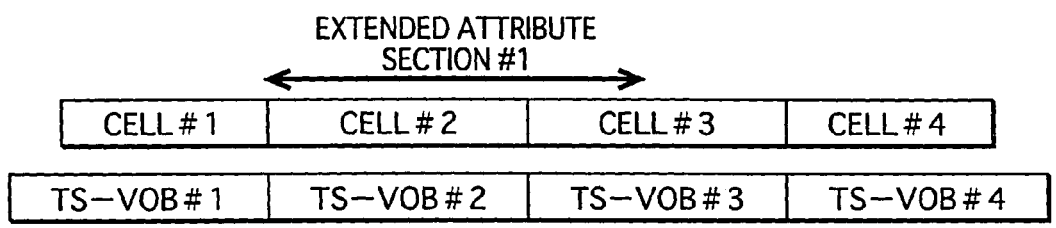
FIGS. 38A and 38B show the states of the TS-VOB, cell, and extended attribute section before and after partial deletion is performed in case 6-3.
Figure 38B:
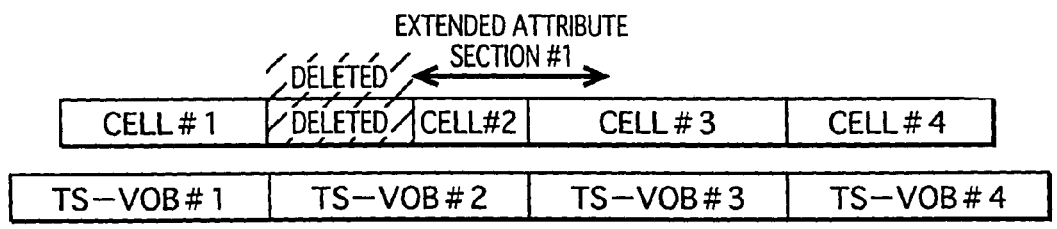

When the edge part of the cell to be deleted includes the start point and the end point of the extended attribute section (case 6-3), the delete-editing unit 26 performs the same processing as in the case 5-3. FIGS. 38A and 38B show the states of the TS-VOB, cell, and extended attribute section before and after the part is deleted in the case 6-3. FIG. 38A shows the state before the part is deleted, and FIG. 38B shows the state after the part is deleted. In FIG. 38A, deleting the edge part of the cell#2, out of the cell#1 to cell#4, is equivalent to deleting the edge part of the extended attribute section #1 that overlaps with the cell#1. The start point of the extended attribute section #1 in FIG. 38B is the location immediately following the edge part. Therefore, the start point information is updated by the delete-editing unit 26 in such a manner that the start point of the preceding extended attribute section is the location immediately following the deleted part.

<Case 7>

Figure 39A:
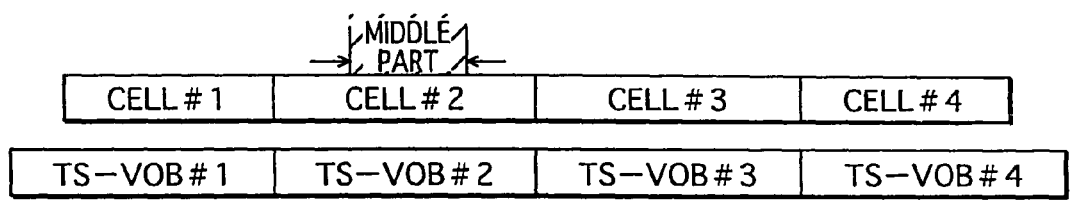
FIGS. 39A and 39B show the states of the TS-VOB, cell, and extended attribute section before and after a middle part is deleted in case 7.
Figure 39B:
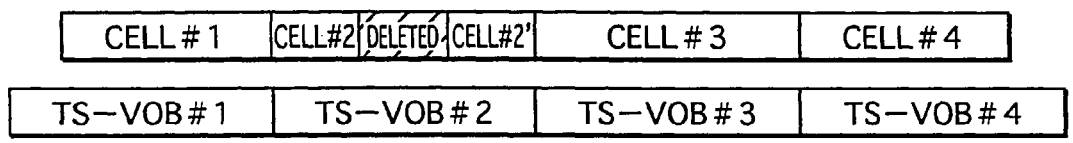

The case 7 is where a middle part of one of cells that constitute a playback path is deleted. In this case, the delete-editing unit 26 updates the end point information of the cell information in such a manner that the cell is fit into a part immediately preceding the middle part. New cell information is then added to immediately follow this cell information. The delete-editing unit 26 sets the start point information of the cell information to be newly added in such a manner that the start point of the new cell is the location immediately following the part to be deleted, and the end point information of the cell information to be newly added in such manner that the end point of the new cell is the end point of the original cell from which the part is yet to be deleted. FIGS. 39A and 39B show the states of the TS-VOB, cell, and extended attribute section before and after the middle part of the cell is deleted. FIG. 39A shows the state before the part is deleted, and FIG. 39B shows the state after the part is deleted. FIG. 39A shows the case where a middle part of the cell#2, out of the cell#1 to cell#4, is to be deleted. As shown in FIG. 39B, after the middle part of the cell#2 is deleted, the cell#2 is shortened so as to fit into a part immediately preceding the middle part. Then, the new cell#2' is added at the location immediately following the deleted part.

Figure 40A:
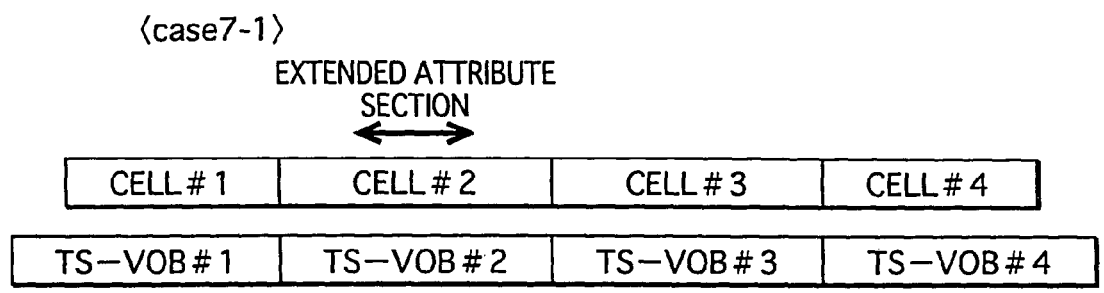
FIGS. 40A and 40B show the states of the TS-VOB, cell, and extended attribute section before and after partial deletion is performed in case 7-1.
Figure 40B:
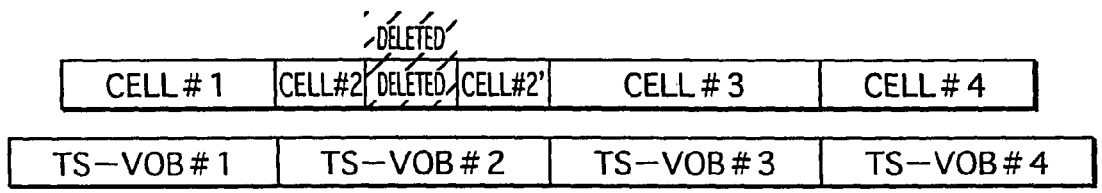

When the middle part to be deleted includes the entire part of the extended attribute section (case 7-1), the extended attribute section is entirely deleted. FIGS. 40A and 40B show the states of the TS-VOB, cell, and extended attribute section before and after the part is deleted in the case 7-1. FIG. 40A shows the state before the part is deleted, and FIG. 40B shows the state after the part is deleted. FIG. 40A shows the case where a middle part of the cell#2, out of cell#1 to cell#4, is to be deleted. After the middle part of the cell#2 is deleted, the extended attribute section entirely included in the middle part of the cell#2 is also deleted by the delete-editing unit 26 as shown in FIG. 40B.

Figure 41A:
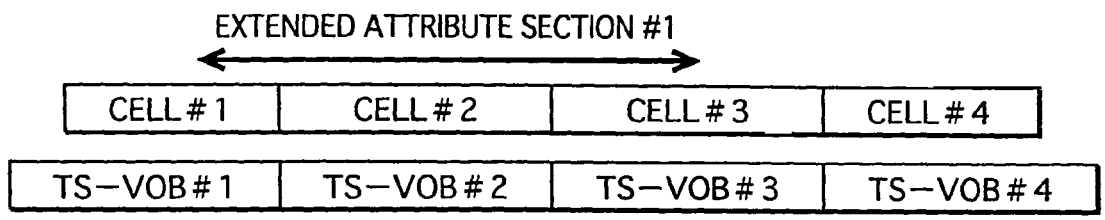
FIGS. 41A and 41B show the states of the TS-VOB, cell, and extended attribute section before and after partial deletion is performed in case 7-2.
Figure 41B:
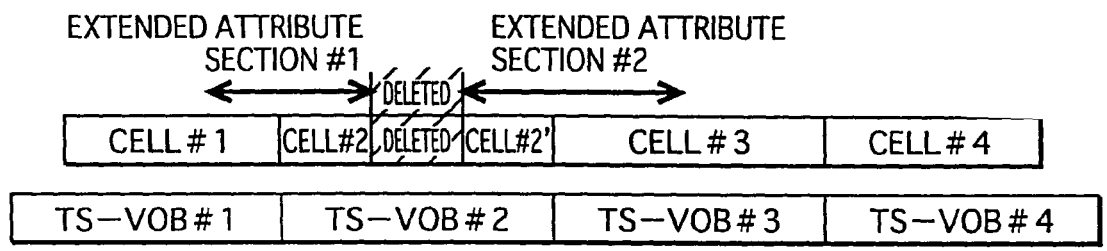

On the other hand, when the extended attribute section includes the entire middle part to be deleted (case 7-2), the delete-editing unit 26 performs the same updates as in the case 5-2, and sets a part preceding the edge part and a part following the edge part as separate extended attribute sections. FIGS. 41A and 41B show the states of the TS-VOB, cell, and extended attribute section before and after the part is deleted in the case 7-2. FIG. 41A shows the state before the part is deleted, and FIG. 41B shows the state after the part is deleted. When the middle part of the cell#2, out of the cell#1 to cell#4, is to be deleted, a middle part of the extended attribute section corresponding to this cell is also deleted by the delete-editing unit 26. The extended attribute section #1 in FIG. 41A is divided into two extended attribute sections #1 and #2 shown in FIG. 41B. The end point information and the start point information are updated by the delete-editing unit 26 in such a manner that the end point of the extended attribute section #1 is the location immediately preceding the middle part, and the start point of the extended attribute section #2 is the location immediately following the middle part.

When the middle part to be deleted includes the start point and the end point of the extended attribute section (case 7-3), the delete-editing unit 26 performs the same processing as in the case 5-3. The delete-editing unit 26 updates a start cell ID and an end cell ID of the section marker, in such a manner that the "cell including the start point of the extended attribute section" and the "cell including the end point of the extended attribute section" to a newly obtained cell. Also, the delete-editing unit 26 updates the start point information and the end point information of the section marker, in such manner that the start point and the end point of the extended attribute section are respectively where the first piece of picture data and the last piece of picture data are located within the newly obtained cell.

Figure 42A:
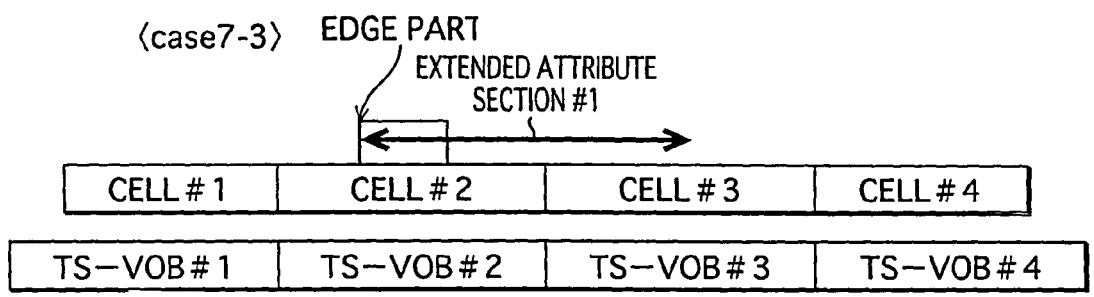
FIGS. 42A and 42B show the states of the TS-VOB, cell, and extended attribute section before and after partial deletion is performed in case 7-3.
Figure 42B:
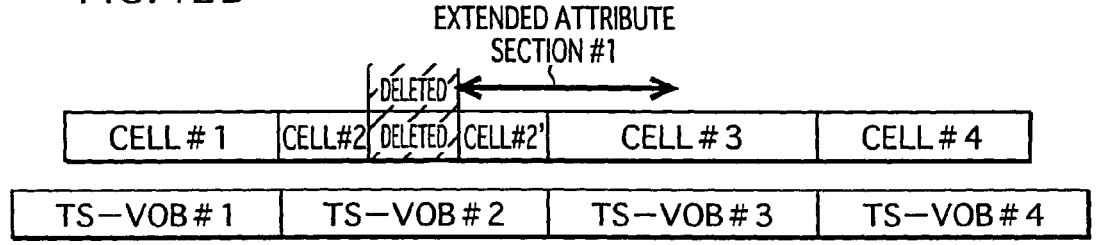

FIGS. 42A and 42B show the states of the TS-VOB, cell, and extended attribute section before and after the part is deleted in the case 7-3. FIG. 42A shows the state before the part is deleted, and FIG. 42B shows the state after the part is deleted. As shown in FIG. 42A, when the middle part of the cell#2, out of the cell#1 to cell#4, is to be deleted, the edge part of the extended attribute section #1 that is included in this cell is deleted by the delete-editing unit 26. Because the start point of the extended attribute section is the location immediately following this edge part as shown in FIG. 42B, the start point information is updated by the delete-editing unit 26 in such a manner that the start point of the extended attribute section #1 is the location immediately following the deleted part.

<Case 8>

Figure 43A:
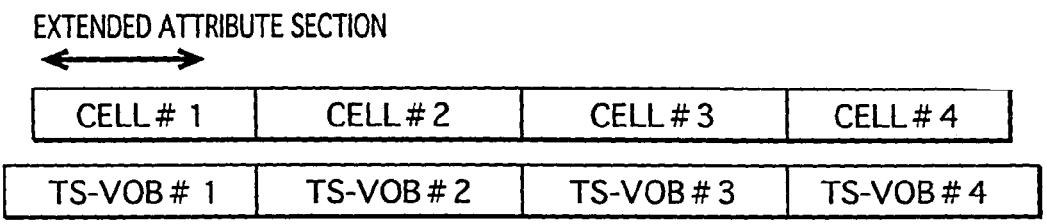
FIGS. 43A and 43B show the states of the TS-VOB, cell, and extended attribute section before and after deletion is performed in case 8.
Figure 43B:
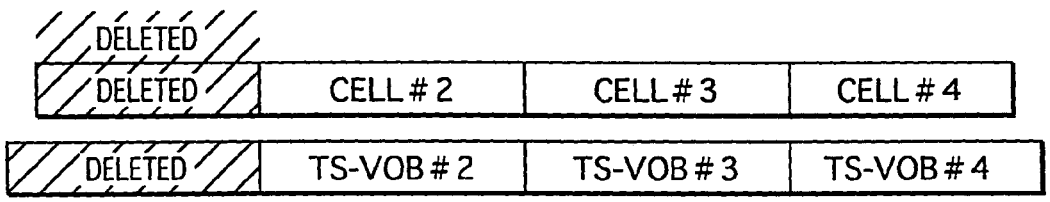

The case 8 is where one of TS-VOBs stored in an AV file is entirely deleted. Each cell that constitutes a playback path is entirely included in one of the TS-VOBs. In other words, such a cell that crosses over a boundary of TS-VOBs never exists. This makes a clear distinction from an extended attribute section crossing over boundaries of a plurality of cells. This is due to the following reason. The start and end points of a cell are defined by indirect referencing via an access map. Therefore, if the start and end points of a cell exist so as to cross over a boundary of TS-VOBs, a plurality of access maps need to be provided, thereby increasing the processing loads. Accordingly, the case where a TS-VOB is entirely deleted can be identified with the case where a cell entirely included in the TS-VOB is entirely deleted. When one of TS-VOBs is entirely deleted, a cell that is entirely included in the deleted TS-VOB is also entirely deleted by the delete-editing unit 26. In this case, therefore, the processing described in the case 5 is to be performed. FIGS. 43A and 43B show the states of the TS-VOB, cell, and extended attribute section before and after deletion is performed in the case 8. FIG. 43A shows the state before the deletion is performed, and FIG. 43B shows the state after the deletion is performed. As shown in FIG. 43A, when the VOB#1, out of the VOB#1 to VOB#4, is deleted, a cell and an extended attribute section entirely included in the VOB#1 are also entirely deleted as shown in FIG. 43B.

<Case 9>

Figure 44A:
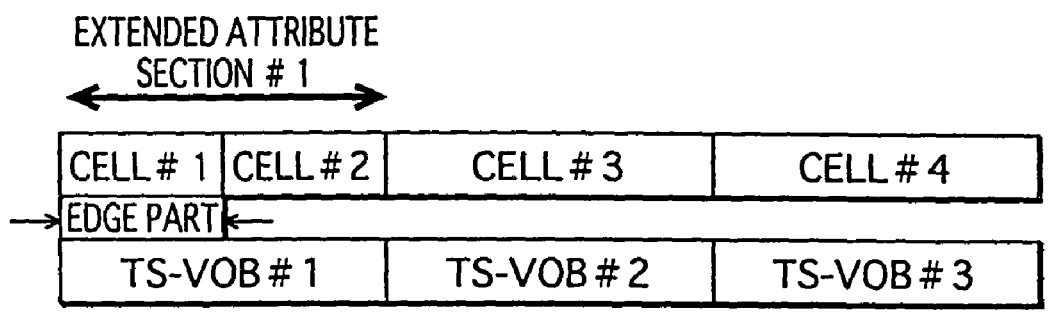
FIGS. 44A and 44B show the states of the TS-VOB, cell, and extended attribute section before and after partial deletion is performed in case 9-1.
Figure 44B:
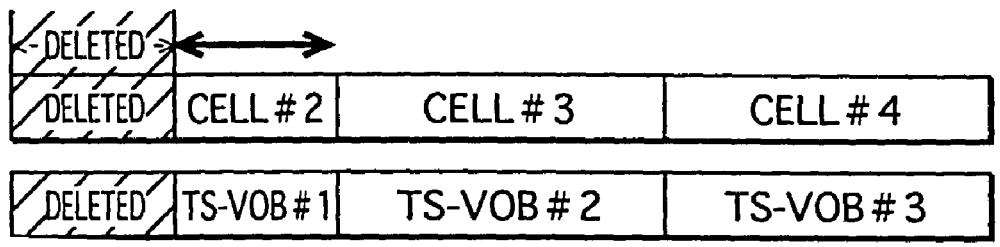
Figure 45A:
FIGS. 45A and 45B show the states of the TS-VOB, cell, and extended attribute section before and after partial deletion is performed in case 9-2.
Figure 45B:

The case 9 is where an edge part of one of TS-VOBs stored in an AV file is deleted. The edge part deletion requires processing of deleting entry information that corresponds to the edge part in the access map. The processing to be performed on an extended attribute section and a playback path depends upon whether the edge part to be deleted includes the entire part of a cell of not. The case where the part to be deleted includes the entire part of a cell (9-1) can be identified with the case where a cell is entirely to be deleted. Therefore, the processing described in the case 5 is to be performed. FIGS. 44A and 44B show the states of the TS-VOB, cell, and extended attribute section before and after deletion is performed in the case 9-1. FIG. 44A shows the state before the deletion is performed, and FIG. 44B shows the state after the deletion is performed. As shown in FIG. 44A, deleting an edge part of the VOB#1, out of the VOB#1 to VOB#3, is equivalent to deleting the cell#1 that is entirely included in the edge part and the extended attribute section #1 that is either partially or entirely included in the cell#1. In FIG. 44B, the cell#1 that is entirely included in the edge part of the TS-VOB and the extended attribute section #1 whose edge part is included in the cell#1 are deleted by the delete-editing unit 26. The case where the edge part to be deleted is an edge part of a cell (case 9-2) can be identified with the case 6. FIGS. 45A and 45B show the states of the TS-VOB, cell, and extended attribute section before and after the part is deleted in the case 9-2. FIG. 45A shows the state before the part is deleted, and FIG. 45B shows the state after the part is deleted. In FIG. 45A, deleting the edge part of the VOB#1 is equivalent to deleting the edge part of the cell#1 entirely included in the edge part of the VOB#1 and the extended attribute section that is partially included in the cell#1. In FIG. 45B, the cell#1 whose edge part is included in the edge part of the TS-VOB and the extended attribute section #1 whose edge part is included in the cell#1 are deleted by the delete-editing unit 26.

<Case 10>

The case 10 is where a middle part of a TS-VOB stored in an AV file is deleted. In this case, the TS-VOB is divided. This division is realized by the following two processes. The first process is to shorten the TS-VOB, so as to fit into a part preceding the middle part. The second process is to add a part following the middle part to the AV file, as a new TS-VOB. Along with the division of the TS-VOB into two TS-VOBs, VOB information is also to be divided. To be more specific, an access map is divided into two access maps, along with the division of the TS-VOB into two TS-VOBs. That is, two pieces of VOB information respectively including the two access maps are generated, and are associated with the two TS-VOBs.

When the middle part of the TS-VOB is deleted, the TS-VOB is divided. Here, VOB information is also to be divided. The division of the VOB information is described in detail in the U.S. Pat. No. 6,148,140. See this publication for further information. This publication describes how two TS-VOBs obtained by dividing a TS-VOB are played back seamlessly. It can be considered that the division of a VOB in the present embodiment is based upon the technique disclosed in this publication.

Further, when an edge part or a middle part of a TS-VOB is deleted, an access map needs to be updated along with the deletion. The update of the access map is disclosed in detail in the International Publication WO99/14754. See this publication for further information. In this publication, an access map is expressed as a "time map", but a "time map" referred to therein is substantially the same as an access map.

Figure 46A:
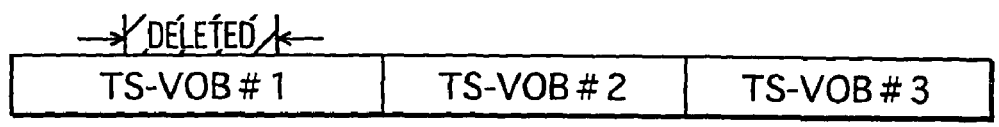
FIGS. 46A and 46B show the states of the TS-VOB and cell before and after a middle part of the TS-VOB is deleted in case 10.
Figure 46B:
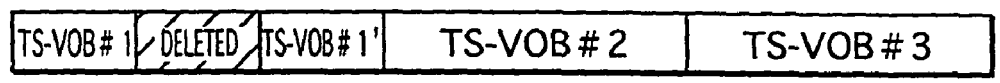

FIGS. 46A and 46B show the states of the TS-VOB, cell, and extended attribute section before and after the middle part of the TS-VOB is deleted. FIG. 46A shows the state before the part is deleted, and FIG. 46B shows the state after the part is deleted. After the middle part is deleted in FIG. 46A, the VOB#1 is shortened, together with the cell, so as to fit into a part immediately preceding the middle part. Also, the new TS-VOB#1' is added at the location immediately following the deleted part as shown in FIG. 46B.

Figure 47A:
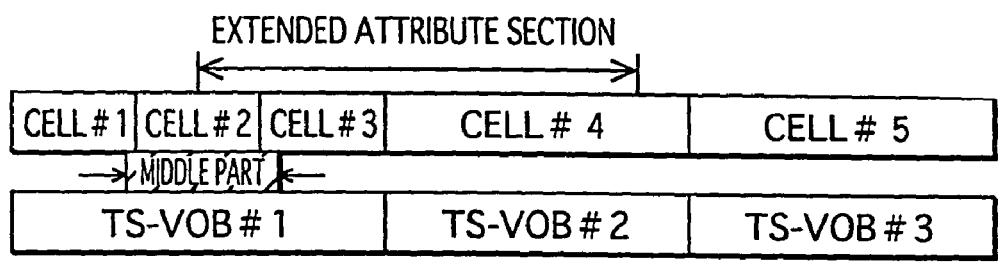
FIGS. 47A and 47B show the states of the TS-VOB, cell, and extended attribute section before and after partial deletion is performed in case 10-1.
Figure 47B:
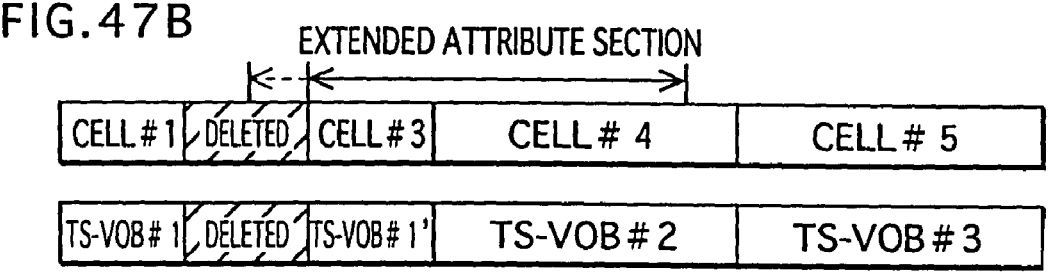

When the middle part to be deleted includes the entire part of a cell (case 10-1), the processing described in the case 5 is to be performed. FIGS. 47A and 47B show the states of the TS-VOB, cell, and extended attribute section before and after the part is deleted in the case 10-1. FIG. 47A shows the state before the part is deleted, and FIG. 47B shows the state after the part is deleted. In FIG. 47A, deleting the middle part of the VOB#1 is equivalent to deleting the cell#1 that is entirely included in the middle part and the edge part of the extended attribute section that is partially or entirely included in the cell#1. In FIG. 47B, the cell#2 that is entirely included in the middle part of the VOB#1 and the extended attribute section whose edge part is included in the cell#2 are deleted by the delete-editing unit 26.

Figure 48A:
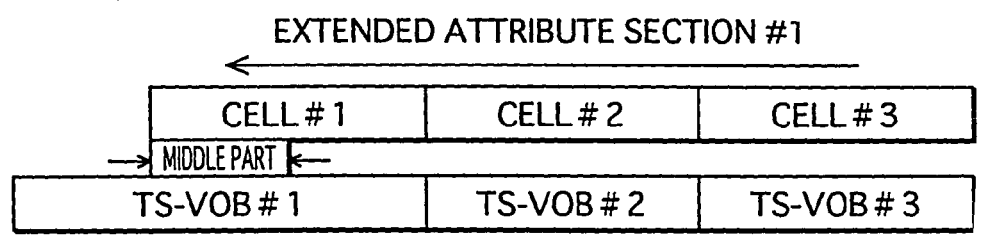
FIGS. 48A and 48B show the states of the TS-VOB, cell, and extended attribute section before and after partial deletion is performed in case 10-2.
Figure 48B:
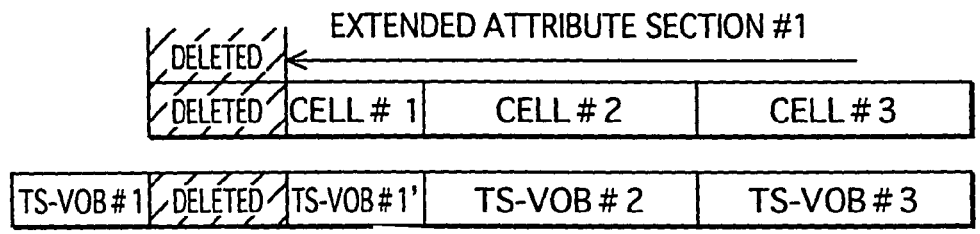
Figure 49A:
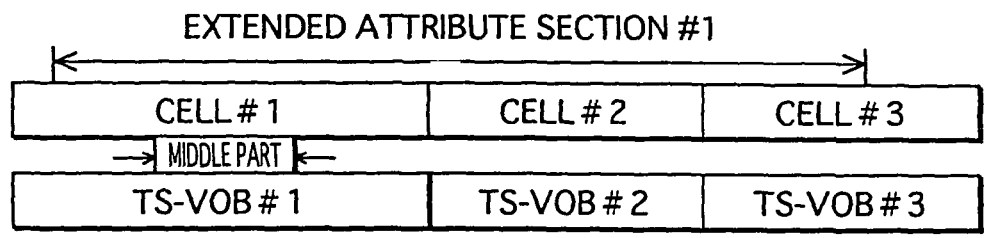
FIGS. 49A and 49B show the states of the TS-VOB, cell, and extended attribute section before and after partial deletion is performed in case 10-3.
Figure 49B:
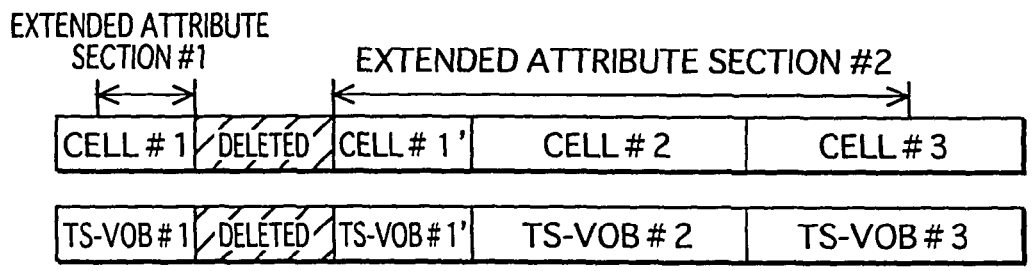

When the middle part to be deleted includes the entire edge part of a cell (case 10-2), the processing described in the case 6 is to be performed. FIGS. 48A and 48B show the states of the TS-VOB, cell, and extended attribute section before and after the part is deleted in the case 10-2. FIG. 48A shows the state before the part is deleted, and FIG. 48B shows the state after the part is deleted. In FIG. 48A, deleting the middle part of the TS-VOB is equivalent to deleting the edge part of the cell#1 that is included in the edge part and the edge part of the extended attribute section that is partially or entirely included in the cell#1. In FIG. 48B, the cell#1 whose edge part is included in the edge part of the TS-VOB and the extended attribute section #1 whose edge part is included in the cell#1 are deleted by the delete-editing unit 26. When the middle part to be deleted includes the entire middle part of a cell (case 10-3), the processing described in the case 7 is to be performed. FIGS. 49A and 49B show the states of the TS-VOB, cell, and extended attribute section before and after the part is deleted in the case 10-3. FIG. 49A shows the state before the part is deleted, and FIG. 49B shows the state after the part is deleted. In FIG. 49A, deleting the middle part of the VOB#1 is equivalent to deleting the middle part of the cell#1 and the extended attribute section #1 that is partially or entirely included in this middle part. In FIG. 49B, the cell#1 whose middle part is included in the middle part of the TS-VOB and the extended attribute section #1 whose middle part is included in the this middle part are deleted, and the cell#1 is divided into two cells#1 and #1', and the extended attribute section #1 is divided into two extended attribute sections #1 and #1'.

According to the present embodiment as described above, not only partial deletion of an extended attribute section can be realized by deleting a middle part or an edge part of the extended attribute section, but also partial deletion of an extended attribute section can be realized along with entire deletion or partial deletion of a cell or a TS-VOB. Therefore, an extended attribute section can be freely changed in accordance with various editing to be performed in the hierarchical structure of a TS-VOB, an access map, and a playback path described in the first embodiment.

Although the present embodiment only describes the case of a section marker set within PGC information, it is needless to say that the same deletion processing can be performed on a section marker set in VOB information. That is to say, an extended attribute section can be partially deleted along with entire deletion or partial deletion of a TS-VOB.

Tenth Embodiment

Figure 50:
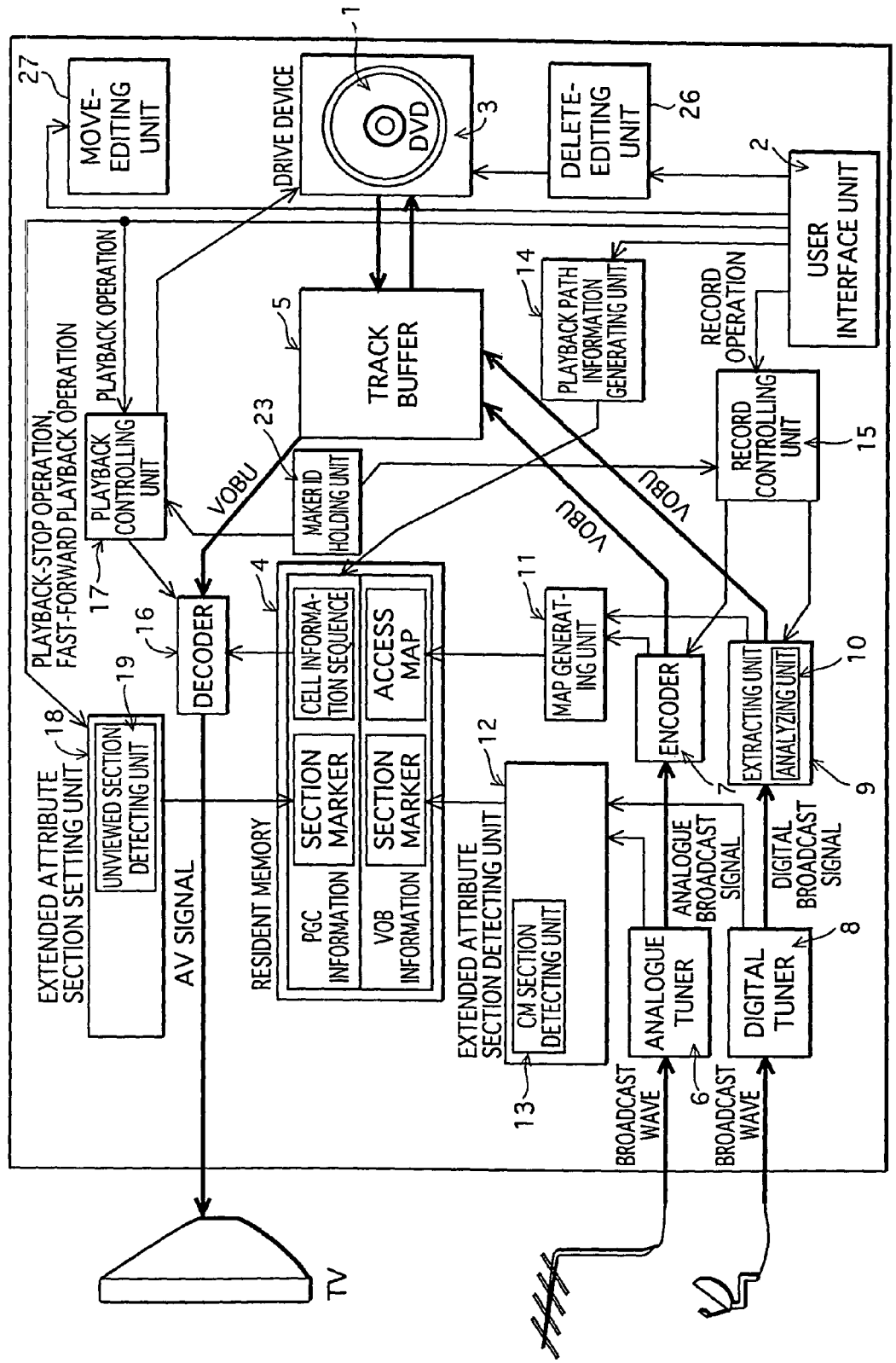
FIG. 50 shows an internal structure of a recording apparatus relating to a tenth embodiment of the present invention.

The present embodiment relates to improvements on the case where an extended attribute section is edited along with editing that involves movement of a cell constituting a playback path (referred to as "move-editing"), performed by the recording apparatus 100. FIG. 50 shows an internal structure of the recording apparatus relating to the present embodiment. As shown in the figure, attentions are to be paid to a move-editing unit 27 that is additionally provided as a component of the recording apparatus relating to the present embodiment. The move-editing unit 27 performs a movement process of moving a cell that constitutes a playback path. The movement process performed by the move-editing unit 27 is realized by updating a section marker, cell information, and the like.

Figure 51A:
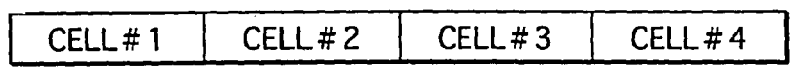
FIGS. 51A and 51B schematically show the move-editing of moving cell#1, out of cell#1 to cell#4 that constitute a playback path, to the location immediately following cell#3.
Figure 51B:
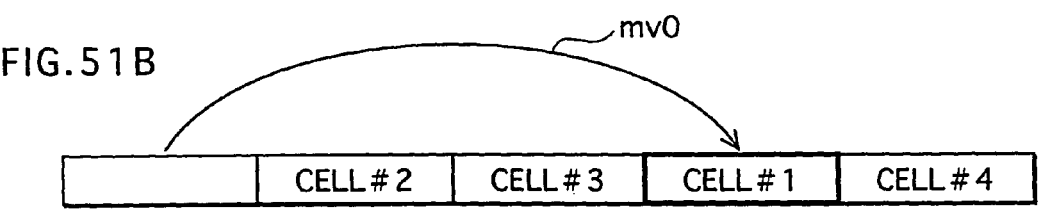

FIGS. 51A and 51B schematically show the move-editing of moving the cell#1, out of the four cell#1 to cell#4 that constitute a playback path, to the location immediately following the cell#3. As shown in FIG. 51A, the playback path shows a sequence of the cell#1, cell#2, cell#3, and cell#4 arranged in the stated order. By moving the cell#1 as indicated by the arrow "mv0", the sequence shown by the playback path is changed to be the cell#2, cell#3, cell#1, and cell#4 in the stated order. A playback path is composed of a sequence of a plurality of cells, and specifies the location of an extended attribute section by indirect referencing via one or more of the plurality of cells. Because the indirect referencing by a section marker takes the form that depends on the sequence of cells, the extended attribute section seems to be changed when the sequence of cells that are indirectly referenced is changed. However, the section marker only specifies the start and end points of the extended attribute section, and so a change in the sequence of cells often requires only a change in the sequence of the pieces of cell information.

To be more specific, the extended attribute section is defined by specifying its start and end points as being the locations in certain cells. Therefore, cells other than the certain cells including the start and endpoints of the extended attribute section can be freely moved without having any influence on the extended attribute section. For example, a cell that includes the entire part of the extended attribute section may be moved out of the extended attribute section, a cell that is out of the extended attribute section may be moved into the extended attribute section, or a cell that is in the extended attribute may be moved to a different location within the extended attribute section. However, the cell including the start point and the cell including the end point may not be freely moved, when such movement causes the end point of the extended attribute section to be located to precede the start point of the extended attribute section. The order of the end and start points being reversed represents failure in correctness of the extended attribute section. Therefore, when a cell is to be moved, a judgment is performed as to whether the cell movement causes the order of the end and start points of an extended attribute section to be reversed or not. When the order of the end and start points is judged to be reversed, the move-editing unit 27 updates a section marker specifying the extended attribute section, so as to prevent the above-described failure in correctness of the extended attribute section.

The following describes a process of updating the section marker for preventing the above-described failure in correctness of the extended attribute section. When the move-editing of a cell is to be performed, a judgment is first performed as to whether the cell to be moved includes the start point or the end point of an extended attribute section or not. When the cell to be moved includes the start point, a judgment is performed as to whether the cell movement causes the cell including the start point to be located to follow the cell including the end point or not. When this judgment result is affirmative, the move-editing unit 27 updates the start cell ID and the start point information of the section marker, in such a manner that the start point of the extended attribute section is the location immediately following the cell to be moved. By doing so, the edge part of the extended attribute section is shortened, but the failure in correctness of the extended attribute section where the start point is located to follow the end point can be avoided.

Figure 51C:
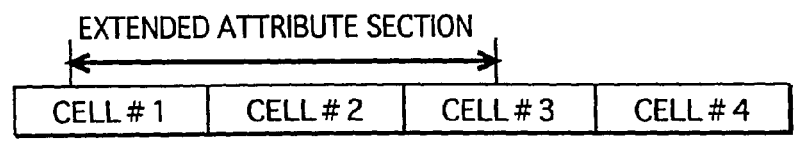
FIGS. 51C and 51D show a process of moving a cell including the start point of an extended attribute section.
Figure 51D:
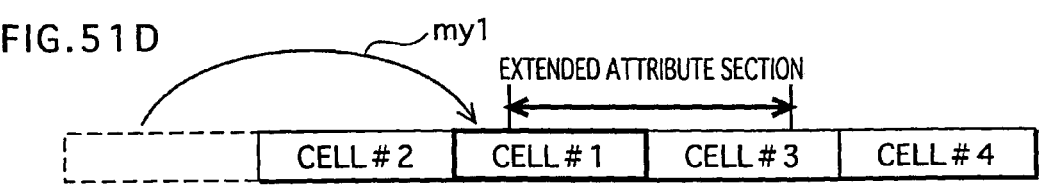

FIGS. 51C and 51D show a process of moving a cell including the start point of an extended attribute section. Among the cell#1 to cell#4 in the figure, the cell#1 includes the start point of the extended attribute section and the cell#3 includes the end point of the extended attribute section. Assume here that the cell#1 including the start point is to be moved to the location between the cell#2 and the cell#3 as indicated by the arrow "my1". In this case, because the cell#1 is located to precede the cell#3 that includes the endpoint of the extended attribute section, the move-editing unit 27 does not update the section marker.

Figure 52A:
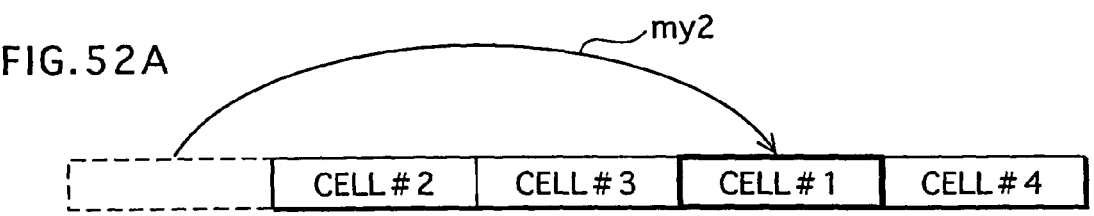
FIGS. 52A and 52B show a process of updating a section marker when a cell that includes the start point of an extended attribute section is moved.
Figure 52B:
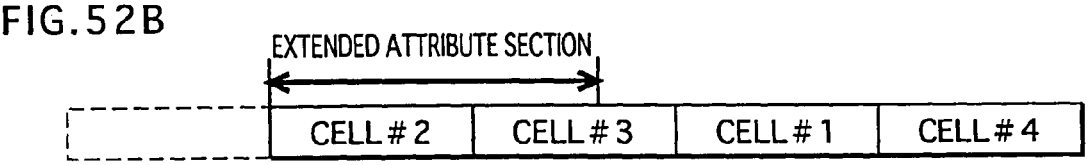

FIGS. 52A and 52B show a process of updating a section marker when a cell that includes the start point of an extended attribute section is moved.

Assume here that the cell#1 including the start point is to be moved to the location between the cell#3 and the cell#4 as indicated by the arrow "my2". In this case, because the cell#1 is located to follow the cell#3 that includes the end point of the extended attribute section, this movement is judged to cause failure in correctness of the extended attribute section. To avoid the failure, the move-editing unit 27 updates the section marker in such a manner that the start point of the extended attribute section is the start point of the cell#2 that immediately follows the cell#1.

When the cell to be moved includes the end point, a judgment is performed as to whether the cell movement causes the cell including the end point to be located to precede the cell including the start point. When this judgment result is affirmative, the move-editing unit 27 updates the entry information and the end cell ID, in such a manner that the end point of the extended attribute section is the location immediately preceding the cell to be moved. By doing so, the entry information for the extended attribute section is shortened, but the failure in correctness of the extended attribute section where the end point is located to precede the start point can be avoided.

Figure 53A:
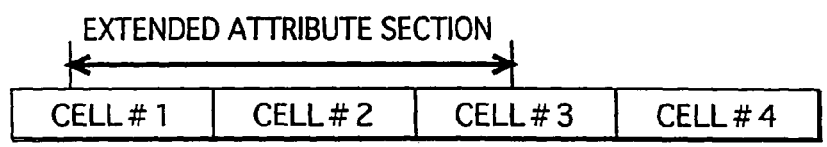
FIGS. 53A and 53B show a process of moving a cell that includes the end point of an extended attribute section.
Figure 53B:
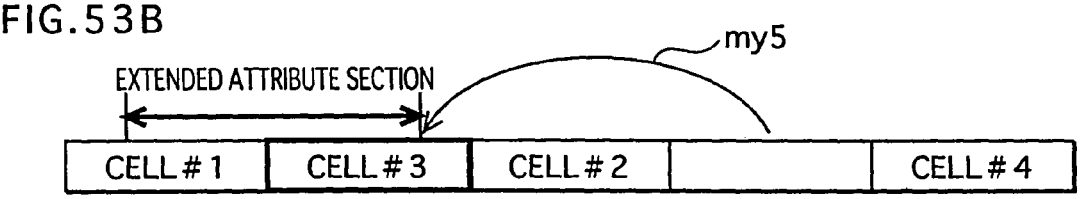

FIGS. 53A and 53B shows a process of moving a cell including the end point of an extended attribute section. Among the cell#1 to cell#4 in FIG. 53A, the cell#1 includes the start point of the extended attribute section and the cell#3 includes the endpoint of the extended attribute section. Assume here that the cell#3 including the end point is to be moved to the location between the cell#1 and the cell#2 as indicated by the arrow "my5". In this case, because the cell#3 is located to follow the cell#1 that includes the start point of the extended attribute section, the move-editing unit 27 does not update the section marker.

Figure 54A:
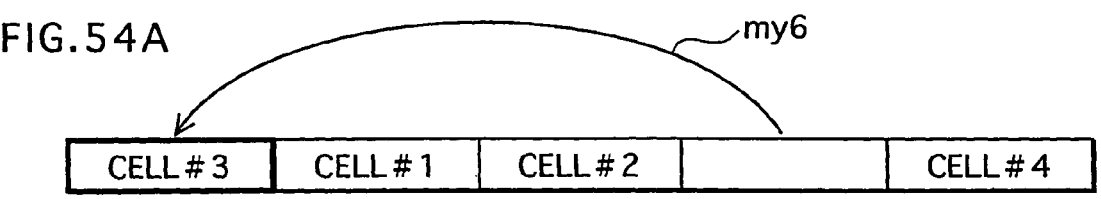
FIGS. 54A and 54B show a process of updating a section marker when the cell that includes the end point of the extended attribute section is moved.
Figure 54B:
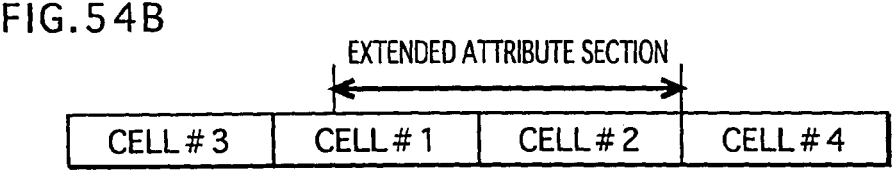

Assume here that the cell#3 including the end point is to be moved to the location preceding the cell#1 as indicated by the arrow "my5". FIGS. 54A and 54B show a process of updating a section marker when the cell that includes the end point of the extended attribute section is moved. In this case, because the cell#3 is located to precede the cell#1 that includes the start point of the extended attribute section, this movement causes failure in correctness of the extended attribute section. To avoid the failure, the move-editing unit 27 updates the section marker in such a manner that the end point of the extended attribute section is the end point of the cell#3 that immediately follows the cell#1 as shown in FIG. 54B.

According to the present embodiment as described above, the failure in correctness of an extended attribute section can be prevented from occurring even when a cell is freely moved by the user.

Although the present embodiment only describes the case of a section marker set within PGC information, it is needless to say that the same movement processing can be performed on a section marker set in VOB information.

Also, although the present embodiment only describes movement of a cell, it is needless to say that not a cell but an extended attribute section itself may be moved.

Eleventh Embodiment

The present embodiment realizes individual specification of an extended attribute section for one playback path and uniform specification of an extended attribute section for a plurality of playback paths via a user operation. To realize the individual specification and the uniform specification via a user operation, the user interface unit 2 provided in the recording apparatus relating to the present embodiment performs the following processing. First, the user interface unit 2 receives a user selection of one of individual specification and uniform specification of an extended attribute section. Upon receipt of the selection of individual specification, the user interface unit 2 performs a log-in operation relating to the user who intends to specify an extended attribute section, so as to identify the user. When the identifying the user is completed, the user interface unit 2 displays a playback path for the user, and performs an individual specification process of individually specifying an extended attribute section for the playback path for the user. In this case, a screen schematically showing a playback path for one user as in FIG. 9 or 10 is displayed. For the playback path on the screen, the user interface unit 2 receives a user operation to set the start and end points of the extended attribute section. Here, the user interface unit 2 displays a cursor on the playback path, and moves the cursor left or right in accordance with a user operation of the remote controller. Here, it is preferable to display locations of pieces of picture data indicated by the cursor by way of displaying their thumbnail images or the like. This aims at helping accurate setting of the extended attribute section. Then, when the user operates to enter the location of the cursor, the location is set as the start point or the end point. When the start and end points are set, a section marker having start point information and end point information respectively showing the set start and end points is generated and is set in PGC information stored in the resident memory 4.

When uniform specification of an extended attribute section is to be performed, a screen schematically showing playback paths for a plurality of users as in FIG. 11 is displayed. For the playback paths on the screen, the user interface unit 2 receives a user operation to set the start and end points of the extended attribute section. Here, the user interface unit 2 displays the cursor on the playback paths, and moves the cursor left or right in accordance with a user operation of the remote controller. Then, when the user operates to enter the location of the cursor, the location is set as the start point or the end point. When the start and end points are set, a section marker having start point information and end point information respectively showing the set start and end points is generated and is set in VOB information stored in the resident memory 4.

By the user interface unit 2 performing the above-described processing, an extended attribute section can be freely set by the user.

It should be noted here that the user interface unit 2 may receive specification of a part to be deleted or a part to be moved when the delete-editing or move-editing described in the ninth and tenth embodiments is performed. In this case, a screen schematically showing an extended attribute section, a cell, and a VOB as shown in FIGS. 30 to 49, is displayed, and specification of a part to be deleted, or a part to be moved, of the extended attribute section, of the cell, or of the VOB, can be performed based on a user operation relating to the extended attribute section, the cell, or the VOB on the screen.

Although the present invention is described based on the above embodiments, the above embodiments are mere examples of the system that is expected to produce the best effects under the existing circumstances. The present invention can be modified within a range that does not deviate from the technical concept of the present invention. For example, the following modifications (A), (B), (C), . . . are possible.

(A) Many of the characteristics of the recording apparatus 100 described in the first to eighth embodiments are realized by improvements on a computer-readable program, as shown in the flowcharts in FIGS. 14, 15, 19, and 20. Therefore, the program that realizes these characteristics may be executed separately from the apparatus described in each of these embodiments. The program may be recorded on a computer-readable recording medium. In this case, the program alone may be executed, with the recording medium being provided or rented. Also, the program may be distributed via a network. In this case, the program may be executed, with the program being transmitted via the network. Also, for the other characteristics of the recording apparatus 100 that are essentially to be executed by improvements on a program, the program that realizes these other characteristics may be recorded on a recording medium, or may be transmitted via a network.

(B) The first to tenth embodiments exemplify as a recording medium, a DVD, such as a DVD-RAM, on which moving picture data can be recorded in compliance with the DVD-Video recording standard. However, recording mediums having any physical structures on which moving picture data can be recorded can also be used. For example, instead of a DVD-RAM, other phase change optical discs, such as a DVD-RW, a PD, a DVD+RW, and a CD-RW, may be used. Also, other recording mediums may be used. Examples of the other recording mediums include (i) write-once optical discs such as a CD-R and a DVD-R, (ii) magneto-optical discs such as an MO (Magneto-optical disc), an MD-DAT (Mini disc-Data), and an iD format, (iii) removable hard disk drives such as an ORB, a Jaz, a SparQ, a SyJet, an EZFley, and a micro drive, (iv) magnetic recording discs such as a flexible disk, a Super Disk, a Zip, and a Clik!, and (v) flash memory cards such as an SD memory card, a compact flash card, a Smartmedia, a memory stick, a multimedia card, and a PCM-CIA card.

(C) The recording apparatus 100 may be a fixed-type DVD recorder for home use, such as Panasonic DVD recorder "DMR-E30", or may be a camcoder.

Also, the recording apparatus 100 may be a personal computer that has a digital video editing program such as "MotionDV STUDIO" and "DVD MovieAlbum" being installed therein, and that is connected to the drive device 3 via an interface complying with SCSI, IDE, and IEEE1394.

(D) Although the above embodiments describe the case where a TS-VOB includes a video stream and an audio stream being multiplexed therein, a TS-VOB may further include a sub video stream obtained by run-length compressing a subtitle character, and other control information being multiplexed therein.

(E) The above embodiments describe the case where a display period of one piece of picture data corresponds to one video frame. However, when 3:2 pull-down for use in compressing such video as having 24 frames/sec. is used, as is the case with a film material, one picture may correspond to 1.5 frames, instead of one picture corresponding to one frame.

(F) Although the above embodiments all describe the case where moving picture data is recorded on an optical disc in the format complying with the DVD-Video recording standard, moving picture data may be recorded thereon in compliance with other standards.

INDUSTRIAL APPLICATION

The present invention is suitable for recording moving picture data, based upon the premise that a playback apparatus executes extended control. The present invention therefore can be applied to a recording medium on which moving picture data is recorded, a recording apparatus, and a playback apparatus utilized by worldwide consumers. Therefore, the recording medium, recording apparatus, and playback apparatus to which the present invention is applied have high possibility of being utilized in the consumer electronics industry and the like.

The invention claimed is:

1. A recording apparatus for recording a digital stream and playback path information onto a recording medium, the digital stream being multiplexed with a video stream and an audio stream, and the playback path information indicating a plurality of playback paths of the digital stream, the recording apparatus comprising:
   an extension attribute section setting unit operable to, when a first extended control is valid only for a specific one of the playback paths, set first marker information indicative of a start location of the first extended control within the specific playback path, the first marker information being set in response to a user operation of interrupting playback;
   an extension attribute section detection unit operable to, when a second extended control is valid uniformly for a plurality of playback paths, uniformly set second marker information indicative of a start location of the second extended control within each of the plurality of playback paths; and
   a record controlling unit operable to record on the recording medium the digital stream and the playback path information, wherein
   the first extended control is a playback control to resume playback from a position where the user interrupted playback, and
   the second extended control is a playback control to start playback from a position in the digital stream where a predetermined scene is skipped.

2. A recording apparatus according to claim 1, wherein the first and second marker information each include category information, the category information being indicative of whether the corresponding marker belongs to a category where the marker is valid for a plurality of makers, or to a category where the marker is valid only for one maker.

3. A recording method for recording a digital stream and playback path information onto a recording medium, the digital stream being multiplexed with a video stream and an audio stream, and the playback path information indicating a plurality of playback paths of the digital stream, the recording method comprising:
   an extension attribute section setting step of, when a first extended control is valid only for a specific one of the playback paths, setting first marker information indicative of a start location of the first extended control within the specific playback path, the first marker information being set in response to a user operation of interrupting playback;
   an extension attribute section detection step of, when a second extended control is valid uniformly for a plurality of playback paths, uniformly setting second marker information indicative of a start location of the second extended control within each of the plurality of playback paths; and
   a record controlling step of recording on the recording medium the digital stream and the playback path information, wherein
   the first extended control is a playback control to resume playback from a position where the user interrupted playback, and
   the second extended control is a playback control to start playback from a position in the digital stream where a predetermined scene is skipped.

4. A recording method according to claim 3, wherein the first and second marker information each include category information, the category information being indicative of whether the corresponding marker belongs to a category where the marker is valid for a plurality of makers, or to a category where the marker is valid only for one maker.

5. A non-transitory recording medium on which a digital stream and playback path information is recorded, the digital stream being multiplexed with a video stream and an audio stream, and the playback path information indicating a plurality of playback paths of the digital stream, wherein,
   when a first extended control is valid only for a specific one of the playback paths, first marker information indicative of a start location of the first extended control is set within the specific playback path, the first marker information being set in response to a user operation of interrupting playback,
   when a second extended control is valid uniformly for a plurality of playback paths, second marker information indicative of a start location of the second extended control is uniformly set within each of the plurality of playback paths,
   the first extended control is a playback control to resume playback from a position where the user interrupted playback, and
   the second extended control is a playback control to start playback from a position in the digital stream where a predetermined scene is skipped.

6. A non-transitory recording medium according to claim 5, wherein the first and second marker information each include category information, the category information being indicative of whether the corresponding marker belongs to a category where the marker is valid for a plurality of makers, or to a category where the marker is valid only for one maker.

7. A playback apparatus for playing back a digital stream which is multiplexed with a video stream and an audio stream, the playback apparatus comprising:
   a read unit operable to read, from a recording medium, the digital stream and playback path information indicating a plurality of playback paths of the digital stream, wherein
   when a first extended control is valid only for a specific one of the playback paths, first marker information indicative of a start location of the first extended control is set within the specific playback path, the first marker information being set in response to a user operation of interrupting playback,
   when a second extended control is valid uniformly for a plurality of playback paths, second marker information indicative of a start location of the second extended control is uniformly set within each of the plurality of playback paths,
   the first extended control is a playback control to resume playback from a position where the user interrupted playback, and
   the second extended control is a playback control to start playback from a position in the digital stream where a predetermined scene is skipped.

8. A playback apparatus according to claim 7, wherein the first and second marker information each include category information, the category information being indicative of whether the corresponding marker belongs to a category where the marker is valid for a plurality of makers, or to a category where the marker is valid only for one maker.

9. A playback method for playing back a digital stream which is multiplexed with a video stream and an audio stream, the playback method comprising:
a reading step of reading, from a recording medium, the digital stream and playback path information indicating a plurality of playback paths of the digital stream, wherein
when a first extended control is valid only for a specific one of the playback paths, first marker information indicative of a start location of the first extended control is set within the specific playback path, the first marker information being set in response to a user operation of interrupting playback,
when a second extended control is valid uniformly for a plurality of playback paths, second marker information indicative of a start location of the second extended control is uniformly set within each of the plurality of playback paths,
the first extended control is a playback control to resume playback from a position where the user interrupted playback, and
the second extended control is a playback control to start playback from a position in the digital stream where a predetermined scene is skipped.

10. A playback method according to claim 9, wherein the first and second marker information each include category information, the category information being indicative of whether the corresponding marker belongs to a category where the marker is valid for a plurality of makers, or to a category where the marker is valid only for one maker.

* * * * *